United States Patent [19]
Hosokawa et al.

[11] Patent Number: 6,088,727
[45] Date of Patent: Jul. 11, 2000

[54] CLUSTER CONTROLLING SYSTEM OPERATING ON A PLURALITY OF COMPUTERS IN A CLUSTER SYSTEM

[75] Inventors: Takehiko Hosokawa; Kaoru Tsuru, both of Tokyo, Japan

[73] Assignee: Mitsubishi Denki Kabushiki Kaisha, Tokyo, Japan

[21] Appl. No.: 08/953,632

[22] Filed: Oct. 17, 1997

[30] Foreign Application Priority Data

Oct. 28, 1996 [JP] Japan .................................... 8-285398
Mar. 27, 1997 [JP] Japan .................................... 9-075254

[51] Int. Cl.[7] .................................................. G06F 13/00
[52] U.S. Cl. .......................................... 709/223; 709/225
[58] Field of Search ..................... 395/674, 676, 395/800.28, 200.31, 200.35, 200.43, 200.53, 200.73; 709/223, 201, 205, 213, 243, 225

[56] References Cited

U.S. PATENT DOCUMENTS 4,356,546 10/1982 Whiteside et al. .
5,129,080 7/1992 Smith .
5,598,529 1/1997 Garay et al. .
5,781,736 7/1998 Schmidt .............................. 395/200.54
5,787,249 7/1998 Badovinatz et al. ............... 395/200.31

*Primary Examiner*—Zarni Maung

[57] ABSTRACT

A cluster controlling system transfers packages which have been operating on one computer to another computer when a fault or failure has occurred by monitoring and controlling the packages in the entire system. When the respective packages are started-up, cluster daemons on the respective computers monitor and control resources on the operating computers. The monitored and controlled data are stored in the respective computers as local data. A manager communicates with cluster daemons on the respective computers, and stores data in a global data memory to monitor and control the entire system. The manager is actually one of the packages operating in the cluster system. If a fault or failure occurs in the manager or in the computer running the manager, the manager is re-started on another computer by a cluster daemon.

20 Claims, 47 Drawing Sheets

```
1: # RESOURCE NAME (EVENT NAME){
2: #               PROCESS
3: # }
4:
5: pkg1 (halt) {
6:         if (pkg2.state == down){
7:                 pkg2->startup
8:         }
9: }
10:
11: pkg1 (startup) {
12:        if (pkg2.state == up && pkg2.node == pkg1.node){
13:                pkg2->halt
14:        }
15: }
16:
17: pkg2 (startup){
18:        if (pkg1.state == up && pkg2.node == pkg1.node){
19:                pkg2->halt
20:        }
21: }
```

FIG. 17

```
1: # PACKAGE NAME : STATE
2: pkg1 : !pkg2
3: pkg2 : !pkg1
4: pkg3 : pkg1 | pkg2
```

FIG. 18

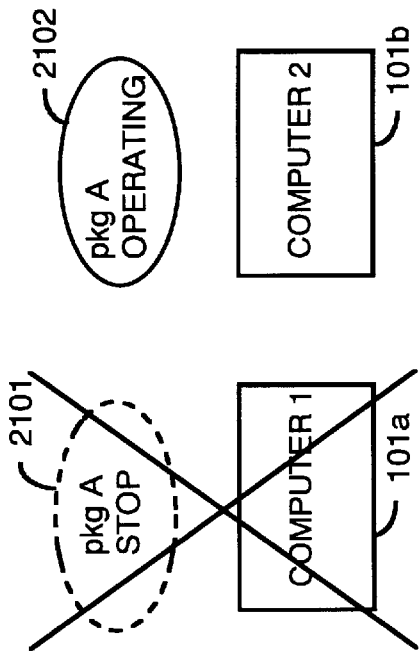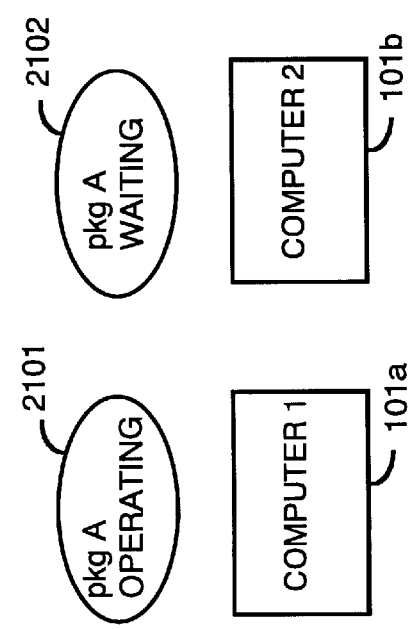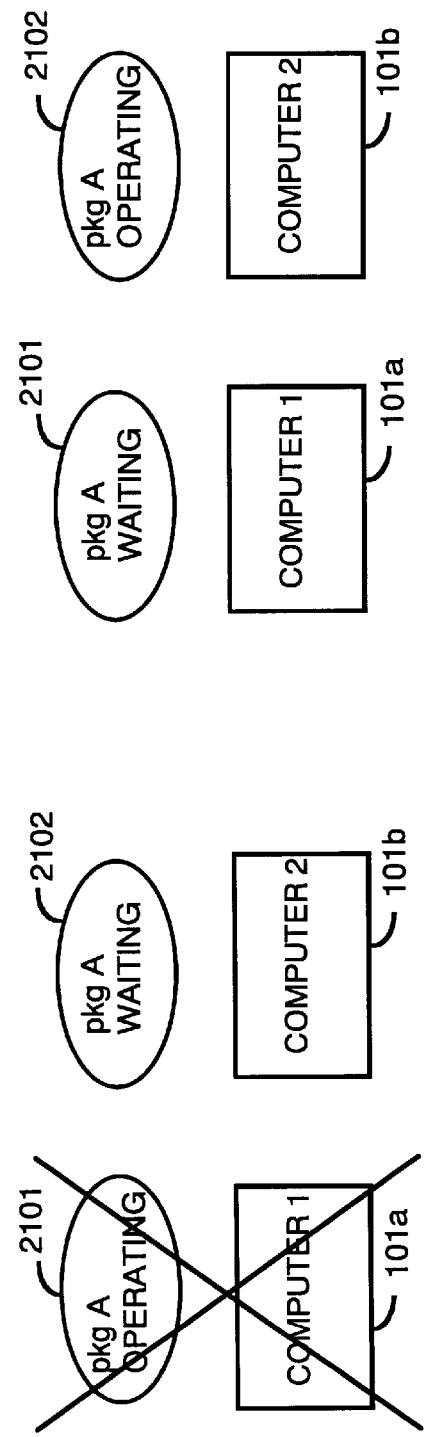

| PACKAGE NAME | MODE |
|---|---|
| pkg A | OPERATING |
| pkg B | WAITING |

| PACKAGE NAME | MODE |
|---|---|
| pkg A | RELEASE |
| pkg B | SUPPRESS |

FIG. 32A

| PACKAGE NAME | MODE | EXECUTING COMPUTER | GROUP NAME |
|---|---|---|---|
| pkg A | OPERATING | NODEn | group 1 |
| pkg B | WAITING | NODE2 | group 1 |
| pkg C | OPERATING | NODE3 | group 2 |
| pkg D | WAITING | NODE2 | group 2 |

FIG. 32B

| COMPUTER | CONDITION |
|---|---|
| NODE1 | STOP |
| NODE2 | OPERATING |
| NODE3 | OPERATING |
| NODE4 | OPERATING |
| NODEn | OPERATING |

| PACKAGE NAME | EXECUTING COMPUTER |
|---|---|
| pkg A | NODE 1 |
| pkg B | NODE 2 |
| ... | ... |
| pkg (n-1) | NODE(n-1) |
| VACANT | NODE n |

FIG. 35A

| COMPUTER | STATE |
|---|---|
| NODE 1 | STOP |
| NODE 2 | OPERATING |
| ... | ... |
| NODE n | OPERATING |

FIG. 35B

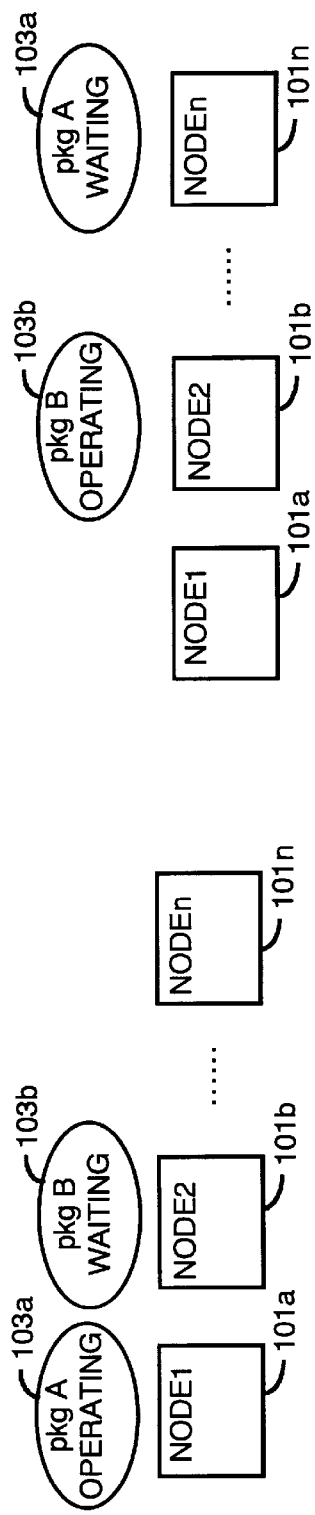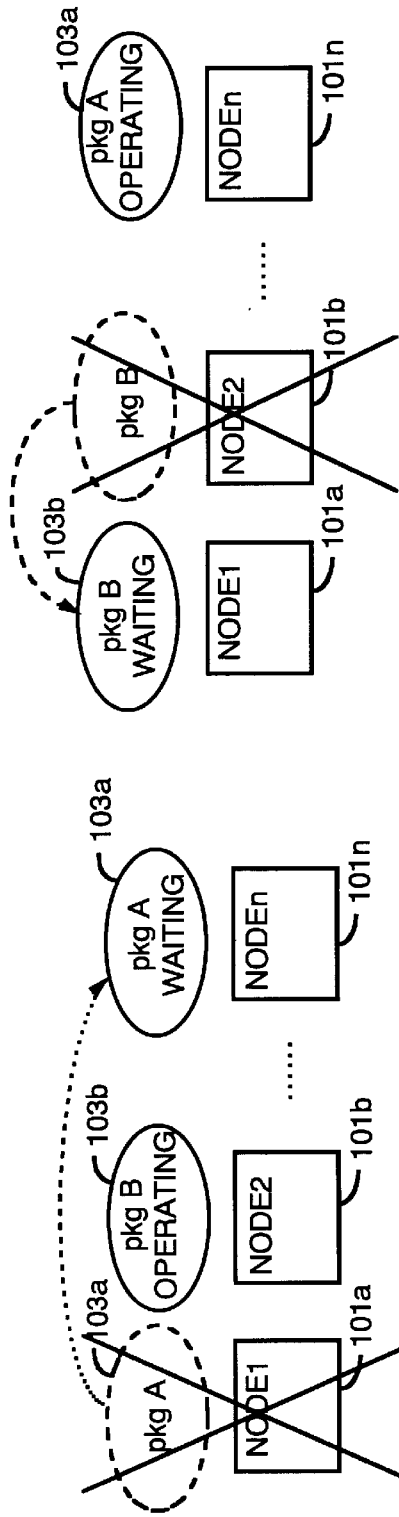

FIG. 38A

| PACKAGE NAME | EXECUTING COMPUTER | GROUP NAME |
|---|---|---|
| pkg A | NODE1 | group 1 |
| pkg B | NODE2 | group 1 |
| pkg B | NODE1 | group 2 |

FIG. 38B

| COMPUTER | STATE |
|---|---|
| NODE1 | OPERATING |
| NODE2 | OPERATING |
| NODEn | OPERATING |

| PACKAGE NAME | EXECUTING COMPUTER | PRIORITY ORDER |
|---|---|---|
| pkg A | NODE1 | 1 |
| pkg B | NODE2 | 2 |
| ... | ... | ... |
| pkg N | NODEn | n |

FIG. 40A

| COMPUTER | STATE |
|---|---|
| NODE1 | OPERATING |
| NODE2 | OPERATING |
| ... | ... |
| NODEn | OPERATING |

FIG. 40B

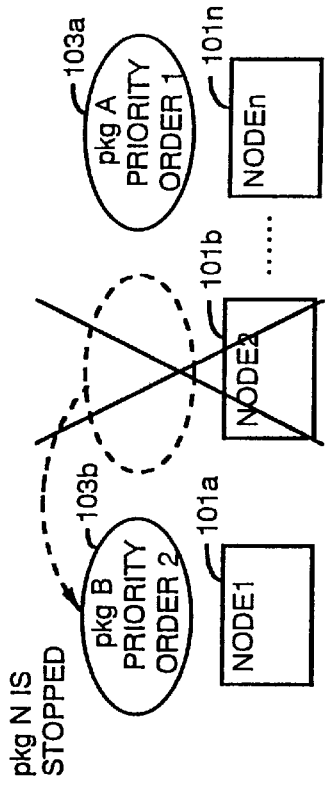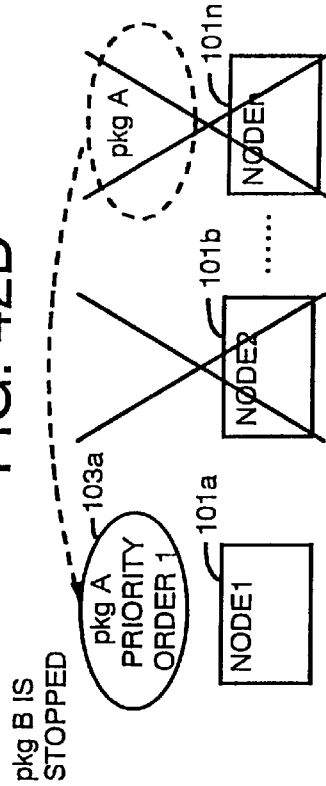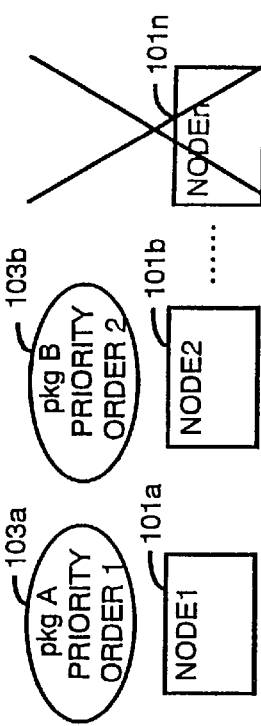
FIG. 42D  FIG. 42E  FIG. 42F
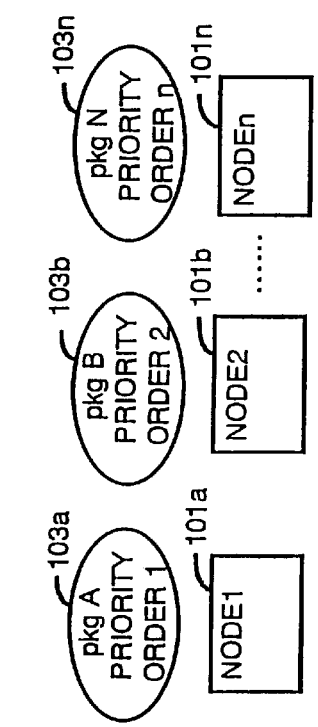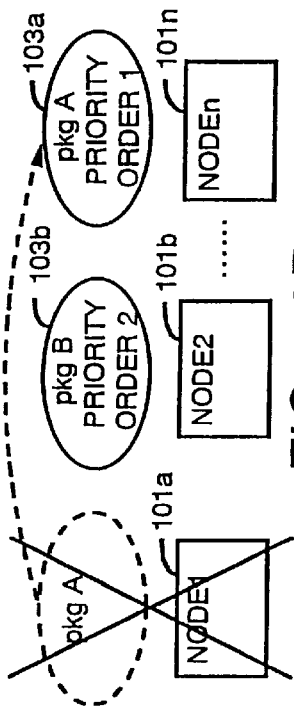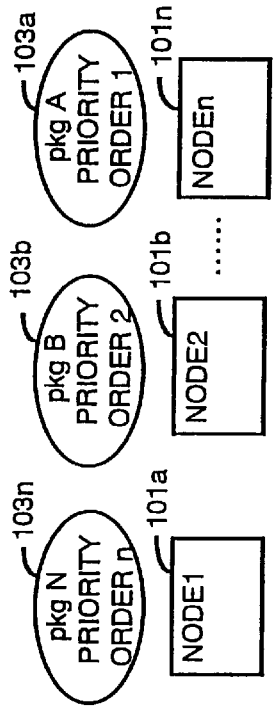
FIG. 42A  FIG. 42B  FIG. 42C

FIG. 43B

| COMPUTER | STATE | LOAD |
|---|---|---|
| NODE1 | OPERATING | 60 |
| NODE2 | OPERATING | 60 |
| ... | ... | ... |
| NODEn | OPERATING | 60 |

FIG. 43A

| PACKAGE NAME | EXECUTING COMPUTER | PRIORITY ORDER | LOAD |
|---|---|---|---|
| pkg A | NODE1 | 1 | 40 |
| pkg B | NODE2 | 2 | 40 |
| pkg C | NODE3 | 3 | 40 |
| pkg D | NODE1 | 4 | 20 |
| pkg E | NODE2 | 5 | 20 |
| pkg F | NODE3 | 6 | 20 |

| PACKAGE NAME | EXCECUTING COMPUTER | PRIORITY ORDER |
|---|---|---|
| pkg A | NODE1 | 1 |
| pkg B | NODE2 | 2 |
| pkg N | NODEn | n | and # 6,088,727

CLUSTER CONTROLLING SYSTEM OPERATING ON A PLURALITY OF COMPUTERS IN A CLUSTER SYSTEM

BACKGROUND OF THE INVENTION

1. Field of the Invention

The present invention relates to a cluster controlling system for monitoring and controlling a cluster system, and for transferring package programs which have been operating on a computer suffering from a failure to another computer which is within the cluster to execute the programs.

2. Description of the Prior Art

A "cluster" in the conventional art includes both a close-coupled cluster, whose main memory is shared by a CPU, and a loose-coupled cluster, whose data is shared by computers using a LAN or a common disk. The present invention is applied only to the latter type of cluster.

FIG. 50 shows an example of a conventional cluster system. In FIG. 50, a plurality of computers A–N (101a–101n) comprise a cluster. The respective computers are executing cluster daemon A–N (102a–102n), and the respective cluster daemons start-up corresponding package programs A1–N2 (103a1 103n2). The term "package program" is a general term referring to application and service programs.

The respective cluster daemons monitor and control resources (various services or network addresses provided by a CPU, LAN, disk and package programs) on the executing computers, and store the data on the respective computers as local data A–N (104a–104n).

The operation of the cluster system is explained using FIG. 51. When a resource A (2401a) required by computer A (101a) is lost, the cluster daemon A (102a) stops the computer A (101a). The cluster daemon N (102n) on another computer N (101n) detects the stop of the computer A (101a), and the computer N (101n) executes the package program A1 (103a), which had been executed by the computer A (101a).

Thus, the specific package program is executed on any one of the computers within the cluster. When a user utilizes services provided by the package program by assigning a network address for every package program, it is not necessary for the user to know exactly which computer in the cluster is executing the package program.

Exemplary systems for concentratedly monitoring and controlling distributed resources are disclosed in references such as Japanese Laid-open Patent publication No. 5-75628, "Network resource monitoring system", Japanese Laid open Patent publication No. 5-134902, "Information Managing System In A Distributed Computing System", and Japanese Laid-open Patent publication No. 6-223020, "Network Management System And Managing Method Of Objects".

These systems are achieved by using managing computers, or by incorporating a managing process (manager). However, none of the above references suggest a solution for when a failure occurs in the managing computers or the managing process.

Since conventional cluster systems are constructed in the manner explained above, when making a program for monitoring and controlling the entire system, it has been necessary to communicate with all computers in the cluster since the data is distributed to all computers. Therefore, there have been some difficulties in making such programs.

In addition, in systems which concentratedly monitor and control distributed resources, the monitoring function completely stops when a fault or failure occurs in either the computer itself or in the process for monitoring and controlling the entire system. Moreover, because the interrelationship, or priority order among various package programs could not be defined, it has been difficult to transfer the data from other multiplexed systems.

In addition, it takes a long time to restart and recover the package. Moreover, since switching and the processing of packages takes a long time after the system has been recovered, a package to be processed by a parallel operation cannot be processed well. Therefore, the performance of the system deteriorates after recovery.

SUMMARY OF THE INVENTION

It is an object of the present invention to solve the problems described above. The present invention provides a cluster controlling system which makes it easy to create programs for monitoring and controlling the entire system, which in turn makes the transfer from another system possible, at a high speed.

According to one aspect of the invention, a cluster controlling system "is provided which operates on a plurality of computers in a cluster system for moving package programs to other computers when a fault or failure occurs on one computer in the cluster. The cluster controlling system comprises cluster daemons for communicating with the computers and for monitoring and controlling resources; local data memories for storing the monitoring result as local data; and wherein one of the computers in the cluster system further comprises: global data memory for storing data collected from local data memories of the respective computers, and for being referred to from any of the other computers in the cluster; and a manager for communicating with the global data memory and the cluster daemons of the respective computers, and for monitoring and controlling the overall cluster system.

Preferably the manager in the cluster controlling system comprises a demand processing device for receiving demands from the user, and a resource controlling device which receives a demand from the demand processing device, refers to the resource state data base in the global data memory and then transmit the obtained resource state corresponding to the demand to the cluster daemon.

According to another aspect of the invention, the cluster controlling system further comprises agents for communicating with the manager and the cluster daemon on the computer.

Preferably, the agent in the cluster controlling system comprises a demand processing device for receiving resource control demands from the manager, and a resource controlling device which receives a demand from the demand processing device, refers to a resource state data base, and transmits the obtained resource state corresponding to the demand to the cluster daemon.

According to a further aspect of the invention, a cluster controlling system is provided which operates on a plurality of computers in a cluster system for moving packages to other computers when a fault or failure occurs on one computer in the cluster. The cluster controlling system comprises cluster daemons for communicating with packages and the computers and for monitoring and controlling resources; agents for communicating with a corresponding cluster daemon on the respective computers, with a global data memory and with the other agents; local data memories for storing the monitoring result as local data, and global data memory for storing data collected from the local data memories of the respective computers and for being referred to by any of the computers via the agents.

According to a still further aspect of the invention, the manager includes a mode managing device for managing operation control for a package, according to a respective operation mode representing "operating", "waiting" and "testing".

According to a still further aspect of the invention, the manager includes a log managing device for collecting logs regarding resource state changes which occur in the cluster system.

According to a still further aspect of the invention, the manager includes a notice processing means for receiving a monitored result such as a resource state change notice from the cluster daemons, and a mode controlling device for receiving a mode controlling demand from the notice processing means, and for transmitting it to the cluster daemons for operating a second package on a second computer by controlling the cluster daemons when a fault or failure has occurred in a first computer, and which forces a first package in the started-up state on a first computer to wait when the first computer has recovered from the fault or failure.

According to a still further aspect of the invention, the manager includes an output managing device for receiving a resource state change notice from the cluster daemons, and an output suppressing device which receives an output suppression/release demand from the output managing device, and which transmits it to the cluster daemon, wherein the manager manages the output of the second package instead of the first package by controlling the cluster daemons when a failure occurs in the first computer while the first package is outputting an output, and wherein the manager maintains an output from a second package until a failure occurs in a second computer, and wherein the manager manages the output of the first package instead of the second package by controlling the cluster daemons when a failure occurs in the second computer while the second package is outputting an output, and wherein the manager maintains an output from the first package until a failure occurs in the first computer.

According to a still further aspect of the invention, the manager includes a package managing device for receiving and determining a type of the resource state change notice from the cluster daemons, and a package controlling device for receiving a package controlling demand and for transmitting it to the cluster daemon, wherein the manager manages a second package on a second computer when a failure occurs in a first computer, and wherein the manager maintains the first package in a started-up state on a third computer within the plurality of computers.

According to a still further aspect of the invention, the manager includes a package managing device for receiving a monitored result from the cluster daemons of the respective computers, a package controlling device for receiving a package controlling demand and for transmitting it to the cluster daemons, and a managing table for storing the priority order of the packages which are to be started-up on the respective plurality of the computers; wherein the manager manages a second package on a second computer when a failure occurs in a first computer to retrieve a third package with lower priority than a package being operated on the first computer by using the managing table, and wherein the manager stops the operation of this retrieved third package, and starts-up the first package on a third computer in a waiting state.

According to a still further aspect of the invention, the manager includes a package managing device for receiving a monitored result from the cluster daemons of the respective computers, a package controlling device for receiving a package controlling demand and for transmitting it to the cluster daemon, a managing table for storing group names of the packages operating in parallel on the respective plurality of the computers, wherein the manager retrieves a third computer which is not operating the same first group of packages as in the plurality of computers by using the managing table when a failure occurs in a first computer, and wherein the manager stops operation of this retrieved third package and starts-up a first package on the third computer.

According to a still further aspect of the invention, the manager includes a package managing device for receiving a monitored result from the cluster daemons of the respective computers, a package controlling device for receiving a package controlling demand and for transmitting it to the cluster daemons, and a managing table for storing the priority order of the respective packages on the plurality of the computers, wherein the manager retrieves a third computer to stop a lower priority package operating on the third computer by using the managing table when a failure occurs in a first computer, and wherein the manager starts-up first priority package on the third computer and re-assigns resources to the respective packages which are being operated on the respective computers, based on priority orders of the packages.

According to a still further aspect of the invention, the manager includes a package controlling device for receiving a package controlling demand and for transmitting it to the cluster daemon, and a managing table for storing the priority order of the packages which are to be started-up on the respective plurality of the computers and load factors of the respective computers; wherein the manager retrieves a third computer to run a higher priority package operating on a first computer by checking whether the load factor of a first computer exceeds a predetermined load in the managing table, and wherein the manager stops operation of lower priority packages operating on a third computer and starts-up on the higher priority package which was operating on the first computer on the third computer.

According to a still further aspect of the invention, the manager includes a resource assigning managing device for receiving a resource state change notice, a resource assignment controlling device for receiving a package controlling demand for allocating resources to the packages based on a package priority from the resource assigning managing device and for transmitting it to the cluster daemon, and a managing table for storing the priority orders of the respective packages which are to be started-up on the respective plurality of the computers; wherein the manager selects a highest priority package by referring to the managing table and wherein the manager assigns resources to the corresponding package and repeats this process to all lower priority packages.

BRIEF DESCRIPTION OF THE DRAWINGS

FIG. 17 shows an example of a setting file according to the fifth embodiment of the present invention.

FIG. 18 shows an example of a setting file according to a sixth embodiment of the present invention.

FIGS. 21A–21D show operation examples in the seventh embodiment of the present invention.

FIGS. 32A and 32B show an example of contents of a managing table according to the eleventh embodiment of the present invention.

FIGS. 35A and 35B show an example of contents of a managing, table according to a twelfth embodiment of the present invention.

FIGS. 37A–37D show an example of system operations according to the twelfth embodiment of the present invention.

FIGS. 38A and 38B show an example of contents of a managing table according to a thirteenth embodiment of the present invention.

FIGS. 40A and 40B show an example of the memory content construction of the managing table according to a fourteenth embodiment of the present invention.

FIG. 42A–42F show an example of system operations according to the fourteenth embodiment of the present invention.

FIGS. 43A and 43B show an example of contents of a managing table according to a fifteenth embodiment of the present invention.

DETAILED DESCRIPTION OF PREFERRED EMBODIMENTS

Embodiment 1

Figure 1:
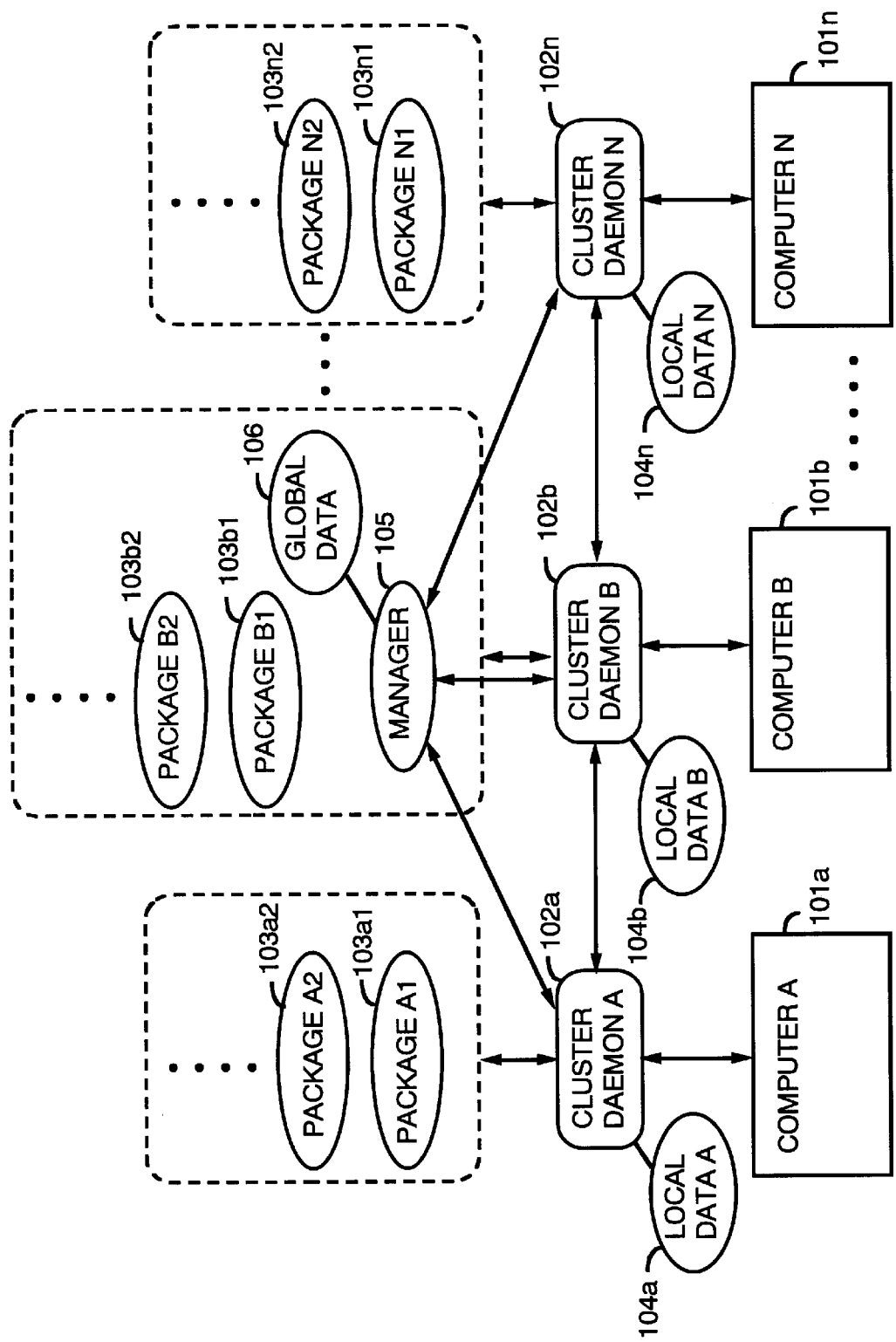
FIG. 1 shows a system configuration of the present invention according to a first embodiment.

A first embodiment of the present invention is explained using FIGS. 1–5. In FIG. 1, a plurality of computers A–N (100a–101n) are included in a cluster. The respective computers are executing cluster daemon A–N (102a–102n), and the respective cluster daemons start-up respective package programs A1–N2 (103a1–103n2).

In this specification, package program is a general term referring to application programs and to service programs. The respective cluster daemons monitor and control resources (CPU, LAN, Disk, package programs, network addresses and so on) on the computers being executed, and stores the data on the respective computers as local data A–N (104a–104n).

A manager 105 communicates with cluster daemons on the respective computers to monitor and control the entire cluster system, and stores global data 106.

The global data 106 is accessible from any computers in the cluster by using a common disk, a common memory, or by replicating the memories.

The manager 105 is one of the packages installed in the cluster system. The manager 105 is restarted in another computer by a cluster daemon when a fault or failure occurs in the manager, or in the computer operating the manager.

Figure 2:
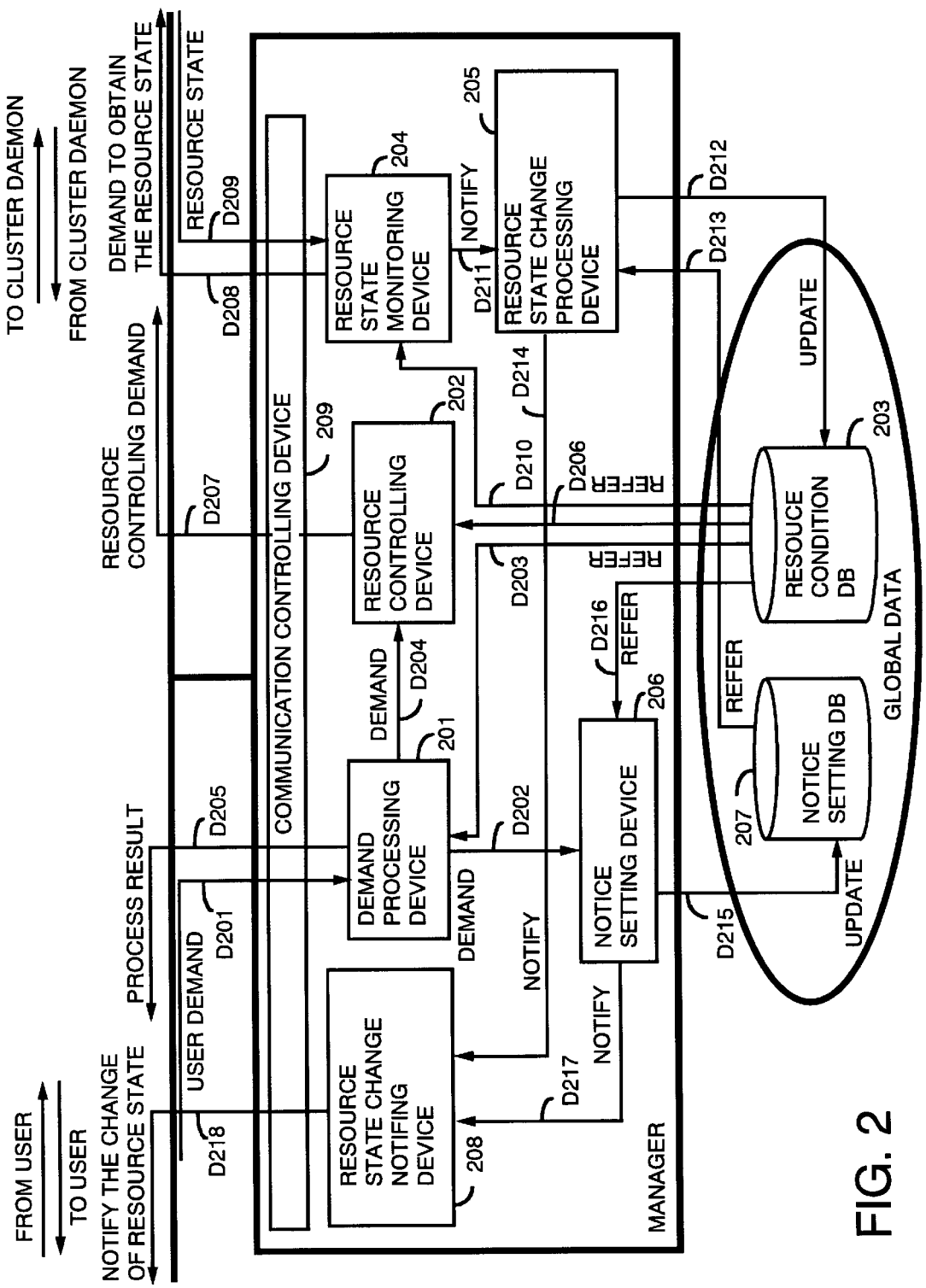
FIG. 2 shows a manager according to the first embodiment of the present invention.

The construction of the manager is explained using FIG. 2. In FIG. 2,.a demand processing device 201 receives demands (D201: a resource state obtaining demand, a resource controlling demand, and a notice setting demand) from the user, and perform processes (D202, D203 and D204) corresponding to the received demands, and transmits the process result (D205) to the user.

A resource controlling device 202 receives the demand (D204) from the demand processing device 201, determines referring (D206) the resource state data base (DB) 203 of the computer storing the resource corresponding to the received demand, and transmit a control demand (D207) to the corresponding computer.

A resource state monitoring device 204 periodically transmits a resource state obtaining demand (D208) to the computers storing resources in the cluster, receives the response of a resource state (D209), refers (D210) to the resource state data base 203, and notifies (D211) a resource state change processing device 205 when the resource state changes.

The resource state change processing device 205 updates (D212) the resource state data base 203 when receiving the notice (D211) from the resource state monitoring device 204, refers (D213) to a notice setting data base (207), and notifies (D214) the resource state change notifying device 208 if the notice setting data base is set.

A notice setting device 206 updates (D215) the notice setting data base 207, according to the demand (D202) received from the demand processing device 201, refers to the state (D216) of the resource state data base 203, and notifies the present state to the resource state change notifying device 208.

The resource state change notifying device 208 receives notices (D214, D217) from the resource state change processing device 205 or the notice setting device 206, and transmits a resource state change notice (D218) to the user.

A communication controlling device 209 controls transmission and reception between the user and the cluster daemons. The resource state data base 203 is a database for storing information such as names and states of resources, and computers storing the resources.

The notice setting data base 207 is a database for storing information to give the notices to the users connected to the manager, when the state of the resource changes.

Figure 3:
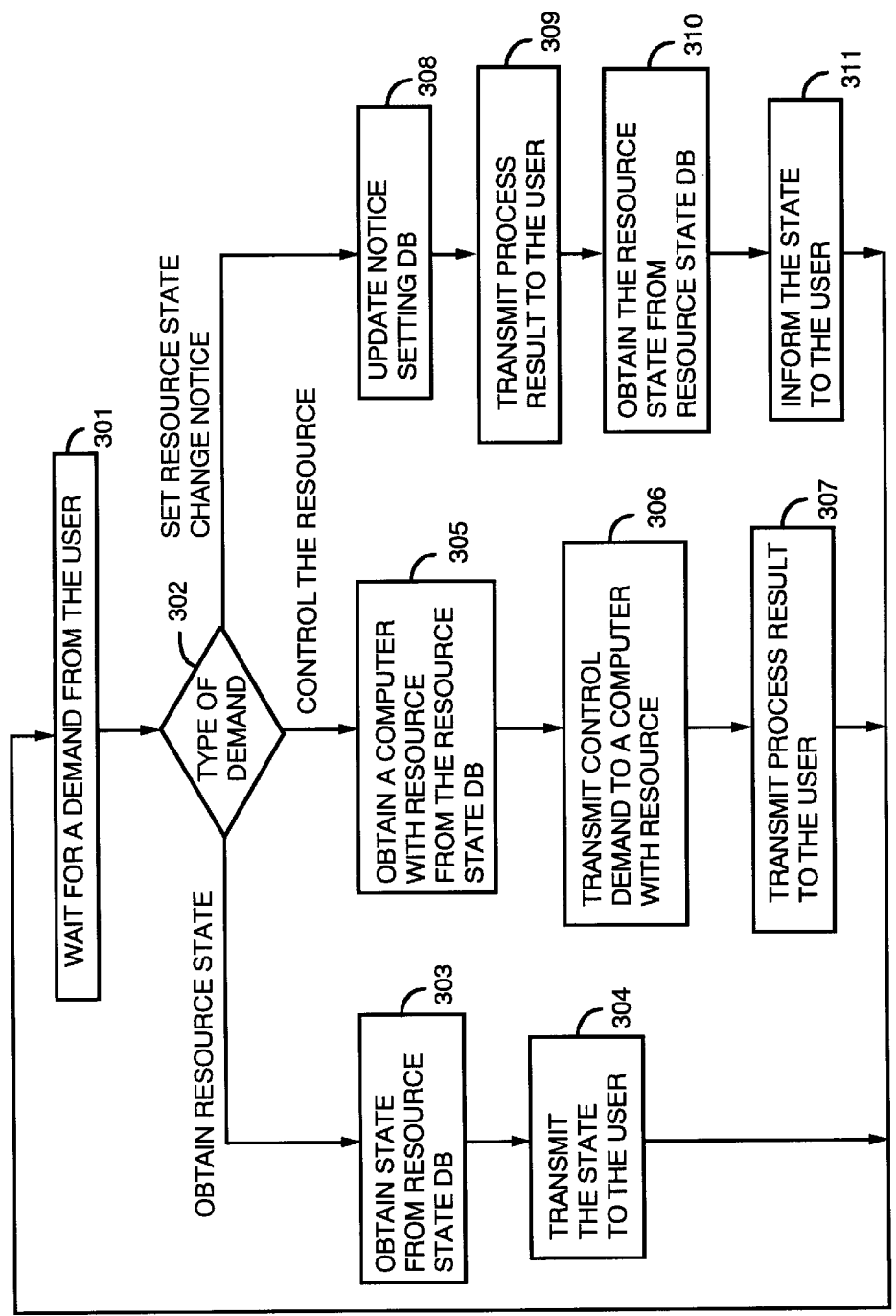
FIG. 3 is a flow chart illustrating processes performed by a manager in response to the demand by a user according to the first embodiment of the present invention.

The process operation of the manager when receiving a demand from the user is explained using FIG. 3. First of all, in a step 301, the manager waits for a demand (D201) from the user. In a step 302, the manager determines the type of the demand (D201) received from the user.

If the demand from the user is to obtain the resource state, the demand processing device 201 refers (D203) to the resource state data base, and obtains resource states corresponding to the received demand, in a step 303. In a step 304, the demand processing device 201 transmits (D205) the resource state to the user, and the process returns to the step 301.

If the demand from the user is to control the resource, the resource' controlling device 202 receives a demand (D204) from the demand processing device 201, refers (D206) to the resource state data base, and obtains the computer storing the resource state corresponding to the demand, in a step 305.

In a step 306, the resource controlling device 202 transmits a control demand (D207) to the computer obtained in the step 305. In a step 307, the demand processing device 201 transmits to the user the process result of the resource controlling device 202 in the step 306, and the process returns to the step 301.

If the demand from the user is to set the notice of the resource state change, the notice setting device 206 updates (D215) the notice setting data base in a step 308.

In a step 309, the demand processing device 201 starts-up (D204) the resource controlling device 202, and at the same time, transmits (D205) the process result to the user.

In a step 310, the notice setting device 206 obtains (D216) a current resource state from the resource state data base 203. In a step 311, the resource state change notice device 208 receives the notice (D217) from the notice setting device 206, and notifies to the user the resource state which has been obtained in the step 310, and the process returns to the step 301.

The user is notified in a step 311 in order to return the current resource state (which is, an initial value for the user).

Figure 4:
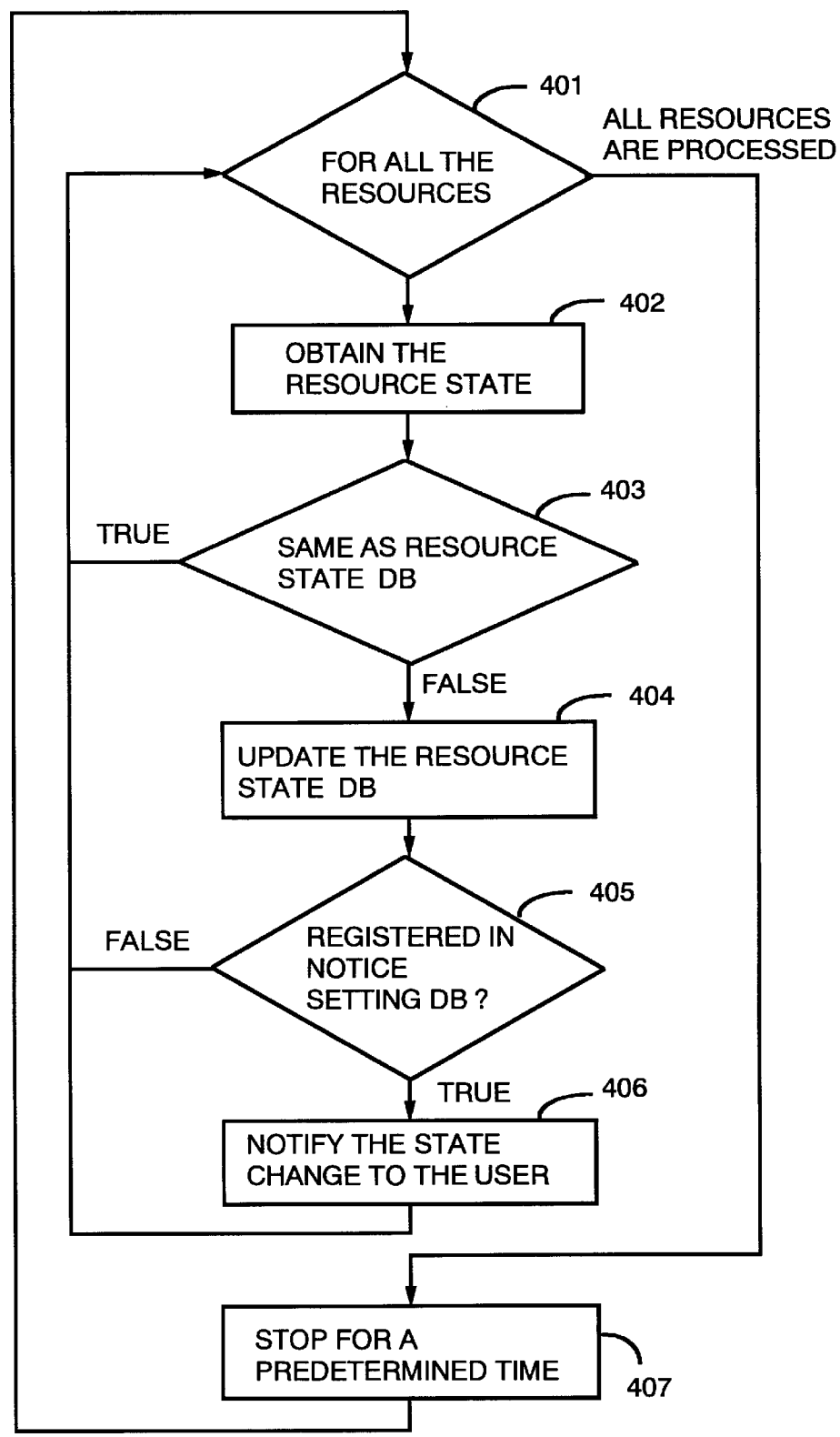
FIG. 4 is a flow chart illustrating the process of monitoring the resource state in a manager according to the first embodiment of the present invention.

Next, the monitoring process of the resources by the manager is explained using FIG. 4. Step 401, step 402 and succeeding steps are performed for all resources. In step 402, the resource state monitoring device 204 obtains the resource state (D208, D209) from the computer storing the resources.

In step 403, the resource state monitoring device 204 refers to a state (D210) of the resource state data base 203. If the state in the resource state data base matches that obtained in step 402, the process returns to step 401. If not, the step 404 and succeeding steps are performed.

In step 404, the resource state change processing device 205 receives a notice (D211) from the resource state monitoring device 204, and updates the resource state data base 203 to the resource state (D212).

In step 405, the resource state change processing device 205 refers (D213) to the notice setting data base. If the notice for the resource state change to the user is registered, the resource state change notice device 208 receives a notice (D214) from the resource state change processing device 205, and notifies (D218) the user (step 406). If not, the process returns to step 401.

In step 407, the process stops for a predetermined time.

Figure 5:
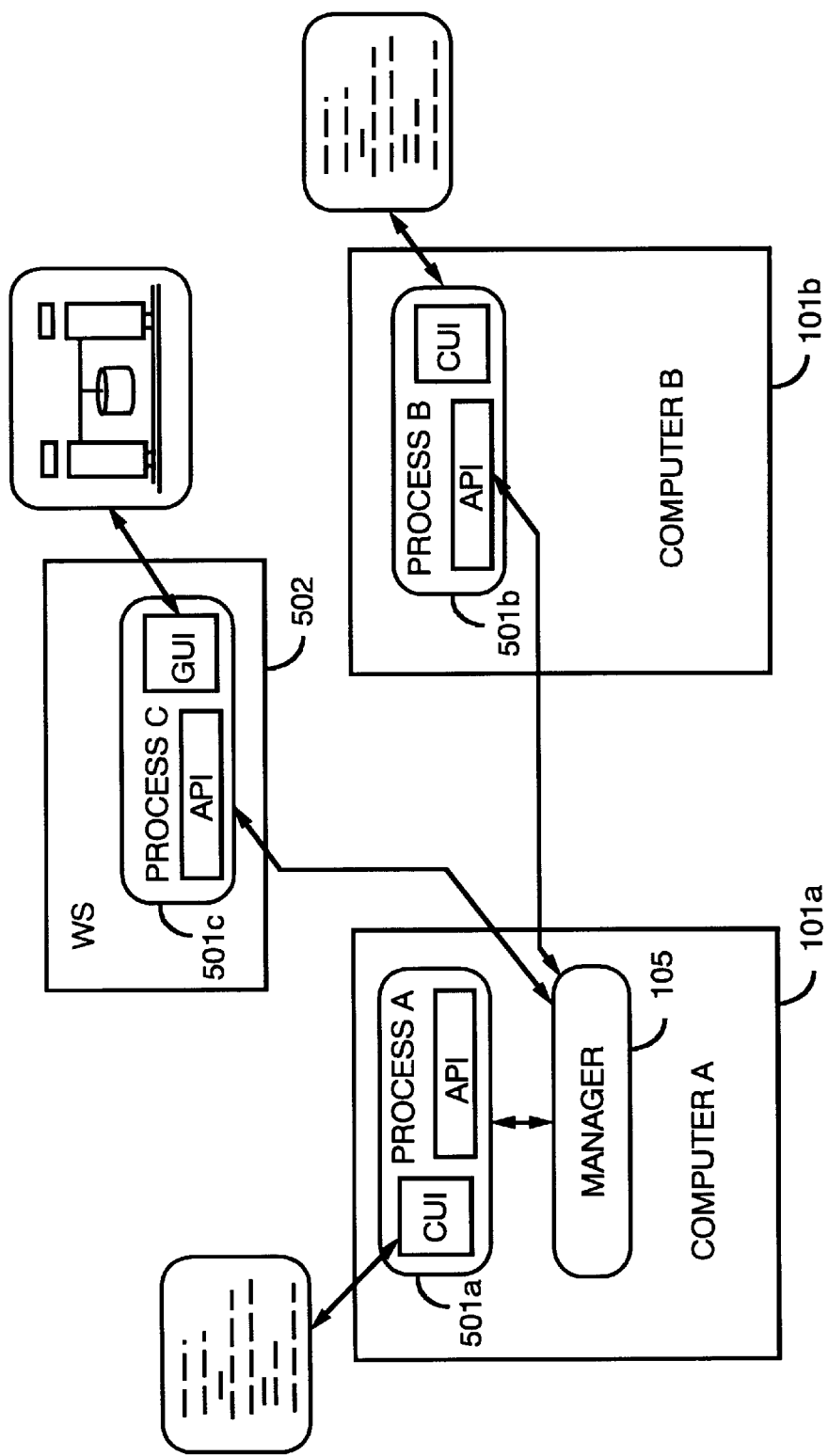
FIG. 5 shows the process for monitoring and controlling in the cluster system in the first embodiment of the present invention.

FIG. 5 shows a process for monitoring and controlling the cluster system. In FIG. 5, it is possible to monitor and control all the resources in the cluster from a process A (501a) on the same computer A (101a) in which the manager 105 is being executed, a process B (501-b) on another computer (101*b*) in the cluster, and a process C (501*c*) on the computer C (502) such as a work station (WS), which is not included in the cluster.

The respective package processes only have access to the manager 105. The package processes, monitors and controls the cluster without knowing the computer on which the manager 105 is operating.

Embodiment 2

A second embodiment of the present invention is explained using FIGS. 6–11. According to the second embodiment, the process of FIG. 1 is modified and used when a cluster daemon cannot be accessed from the other computers, or when it is desired to lighten the load of either the manager or the network.

Figure 6:
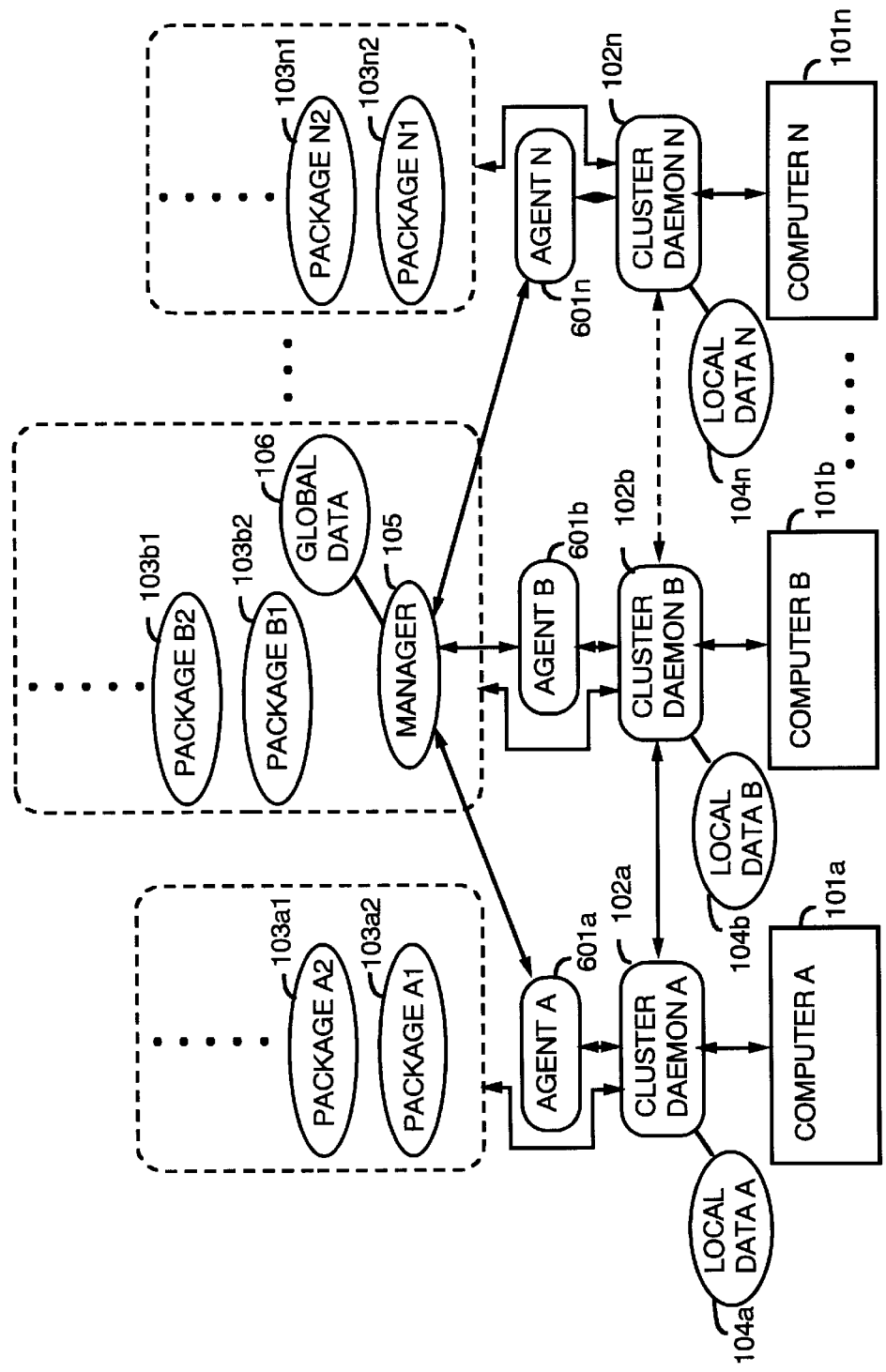
FIG. 6 shows a system configuration according to the second embodiment of the present invention.

FIG. 6 shows a process construction according to the second embodiment of the present invention.

Agents A–N (601*a*–601*n*) are executed on the respective corresponding computers, and communicate with the cluster daemons on the respective computers and the managers.

The rest of the elements are the same as the elements of the corresponding numbers in FIG. 1.

Figure 7:
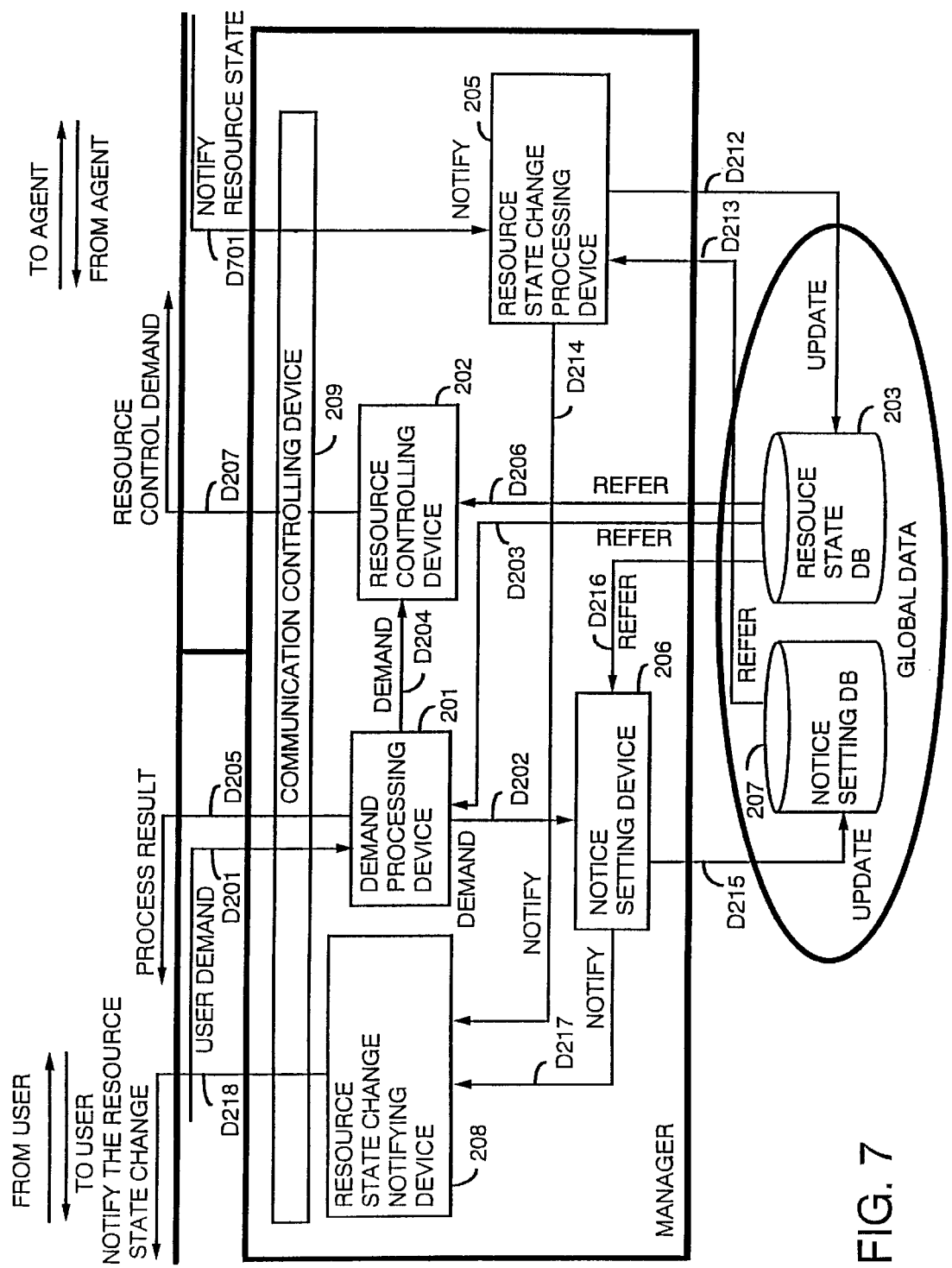
FIG. 7 shows a manager according to the second embodiment of the present invention.

FIG. 7 shows a manager according to the second embodiment of the present invention. FIG. 7 is different from FIG. 2 in that the resource state monitoring device 204 is removed, the resource state change processing device 205 receives a notice (D701) from the agents, and the resource controlling device 202 transmits the resource controlling demand (D 207) to the agents, instead of to the cluster daemons.

Figure 8:
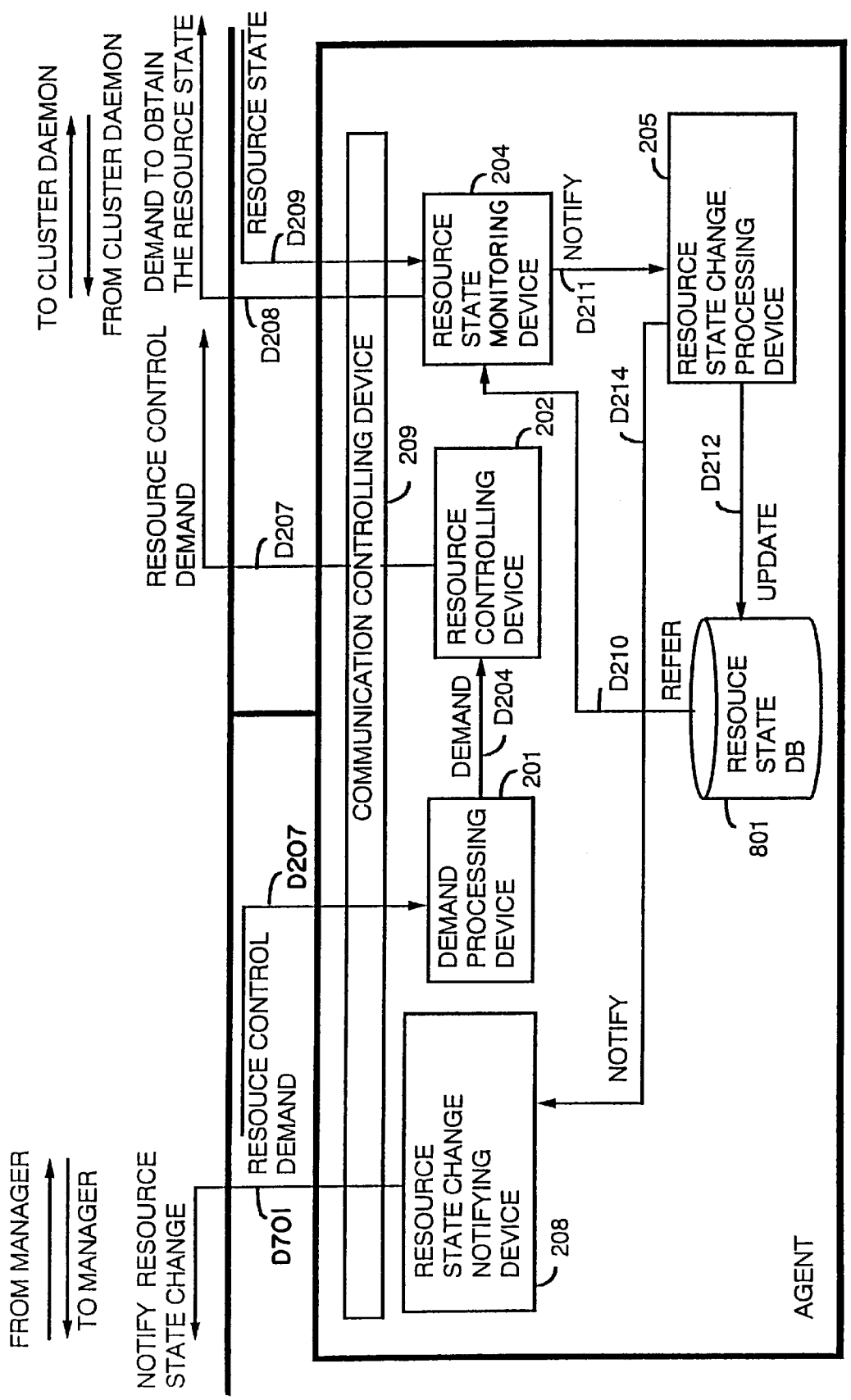
FIG. 8. shows agents according to the second embodiment of the present invention.

FIG. 8 shows an agent according to the second embodiment of the present invention. The operations of respective devices are similar-to those of FIG. 2, except for the following. The notice setting data base 207 and the notice setting device 206 are removed, and the processing device 201 only receives a resource controlling demand (D 207).

A resource controlling device 202 transmits the resource controlling demand (D207) to the cluster daemon on the computer being executed, without referring to a resource state data base 801.

A resource state change processing device 205 notifies (D214) all notices (D211) from the resource state monitoring device 204 to the resource state change notifying device 208, without referring to the notice setting data base 207.

The resource state change notifying device 208 notifies the resource state change (D 710) to the manager. The resource state data base 801 manages only the state of the local resources held by the computers on which the agents are being executed.

If a manager 105 is not present when the communication controlling device 209 notifies the resource state change (D 710) to the manager, the data is held in a cue. The manager 105 performs a process similar to that explained for FIG. 3.

Figure 10:
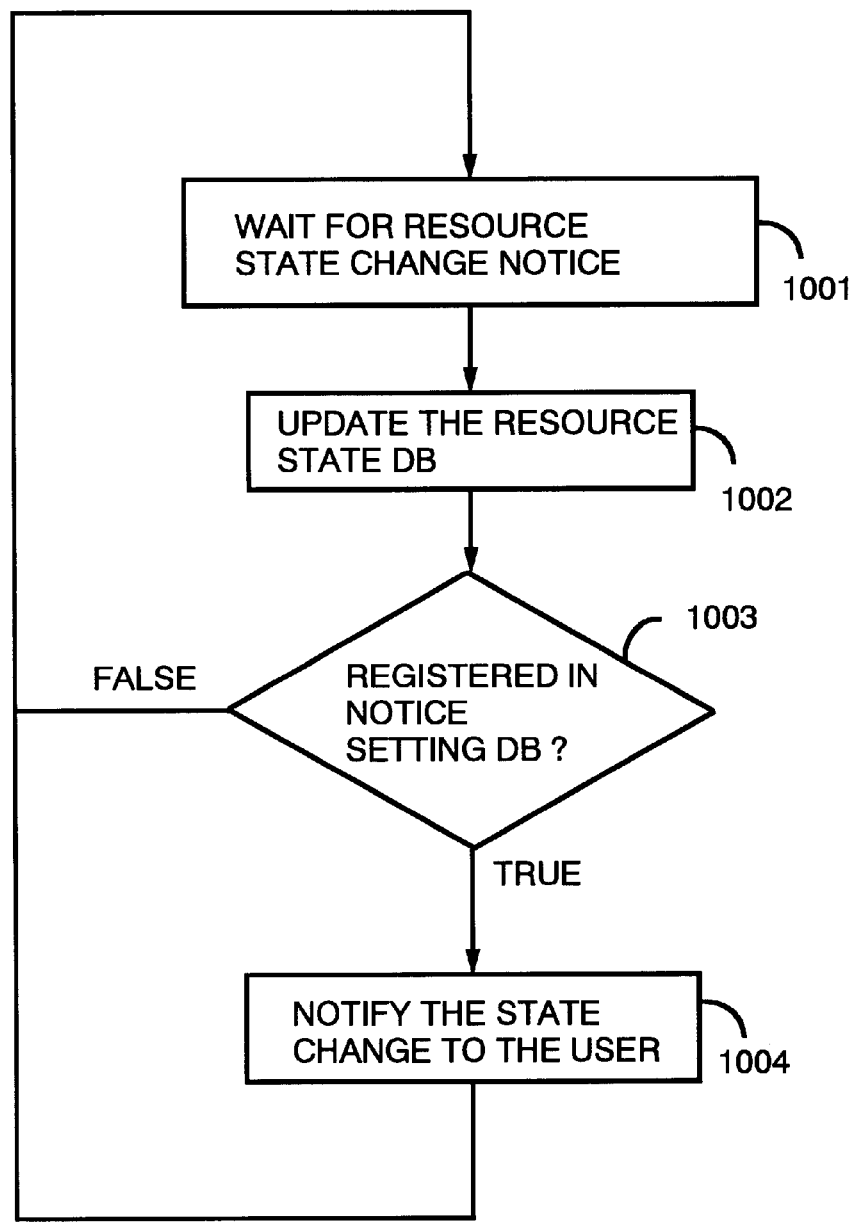
FIG. 10 is a flow chart illustrating the process of monitoring the resource state in a manager according to the second embodiment of the present invention.

The resource monitoring process by the manager 105 is explained using FIG. 7 and FIG. 10. FIG. 10 is a flow chart illustrating the process of monitoring the resource state in a manager according to the second embodiment of the present invention. In a step 1001, the resource state monitoring device 205 in the manager waits for a resource state change notice (D 710) from the agents. Steps 1002–1004 are the same as the steps 404–406 in FIG. 4.

Figure 11:
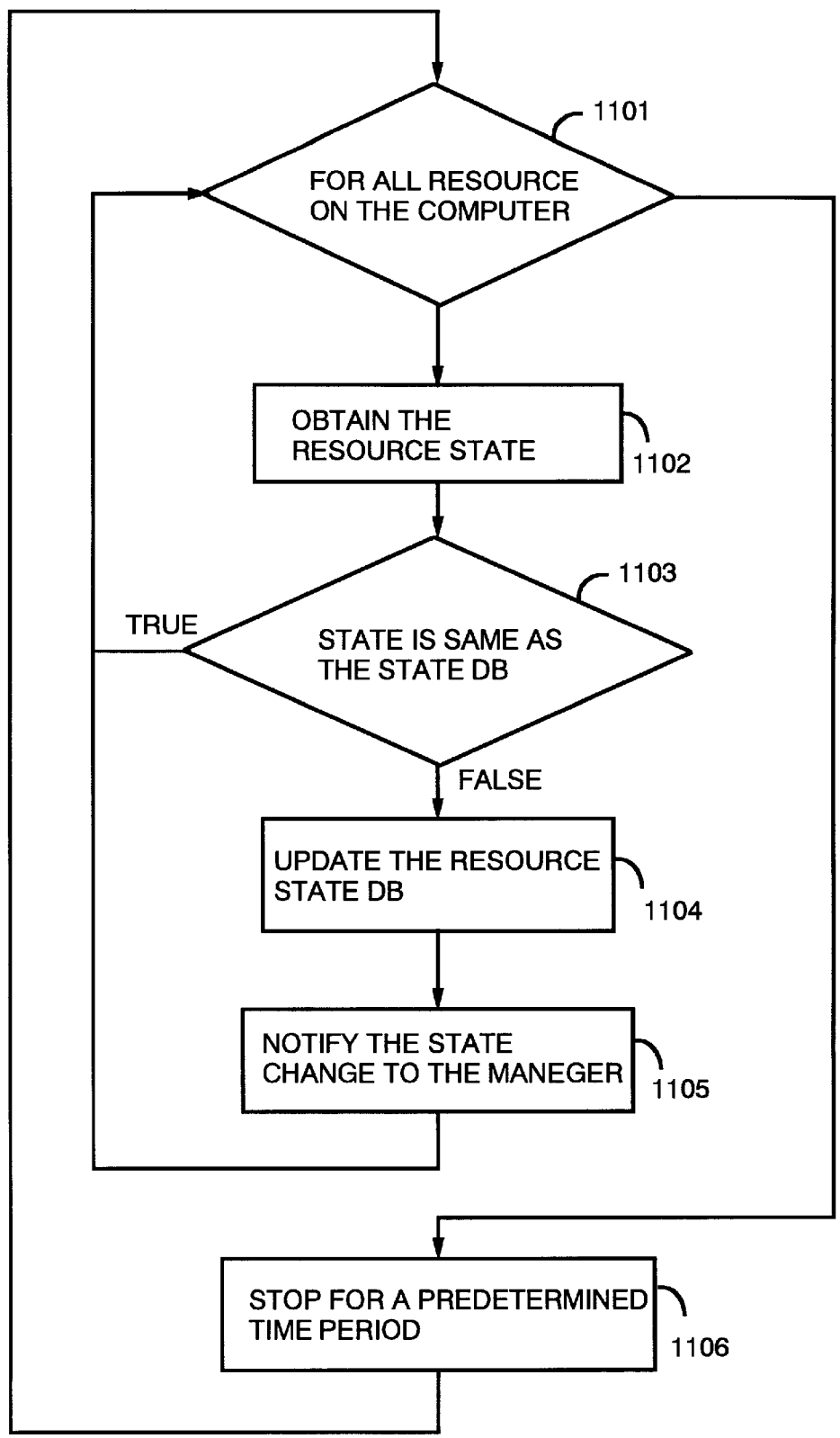
FIG. 11 is a flow chart illustrating the process of monitoring the resource state in the agents according to the second embodiment of the present invention.

The resource monitoring process performed by the agents is explained using FIG. 8 and FIG. 11. FIG. 11 is a flow chart illustrating the process of monitoring the resource state in the agents according to the second embodiment of the present invention. In step 1011, the process of step 1102 and succeeding steps are performed for all resources on the computers. In step 1102, the resource state monitoring device 204 obtains resource state (D209) from the cluster daemons.

In step 1103, the resource state monitoring device 204 refers to a state (D210) of the resource state data base 801. If the state of the resource state data base is the same as the state obtained in step 1102, the process returns to step 1101. If not, the process goes to step 1104.

In step 1104, the resource state change processing device 205 receives a notice (D211) from the resource state monitoring device 204, and updates the state of the resource state data base to the state obtained in step 1102.

In step 1105, the resource state change notifying device 208 receives a notice (D214) from the resource state change processing device 205, notifies the resource state (D 710) to the manager 105, and the process returns to the step 1101. In step 1106, the process stops for a predetermined time.

Figure 9:
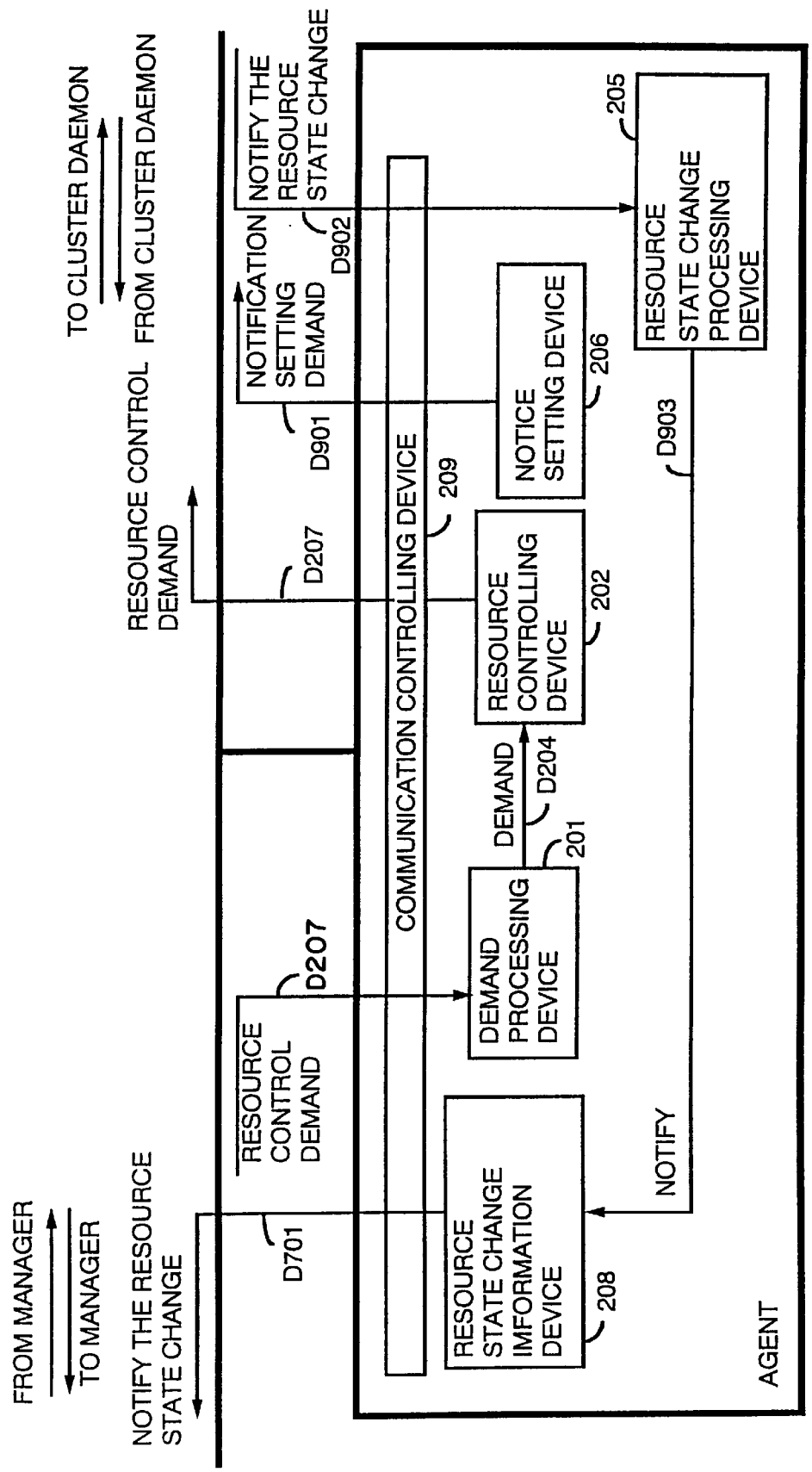
FIG. 9 shows the modification of the agents according to the second embodiment of the present invention.

FIG. 9 is a modification of FIG. 8. FIG. 9 illustrates an agent provided with a function to notify resource states to the cluster daemon. The basic operation of the respective devices are similar to those of FIG. 8. However, FIG. 9 is different from FIG. 8 in that the resource state monitoring device 204 and the resource state data base 801 are removed, and a notice setting device 206 is provided.

The notice setting device 206 transmits a notice setting demand (D901) to the cluster daemon in order to notify all resource changes at the time of start-up of the agent, or at the time of start-up of the cluster daemon.

The resource state change processing device 205 in the agent receives a notice (D902) from the cluster daemon, and notifies the state change (D903) to the resource state change notifying device 208.

The above-explained construction makes it possible for the manager to concentratedly monitor and control the cluster even when the cluster daemon only communicates with a process on the same computer, because the agent on the same computer communicates with the cluster daemon, and the manager communicates with the agent.

In addition, since the respective agents periodically obtain the resource state, the load can be distributed, the data flowing thought the network are reduced, and the loads of the manager and the network can be reduced.

Embodiment 3

Figure 12:
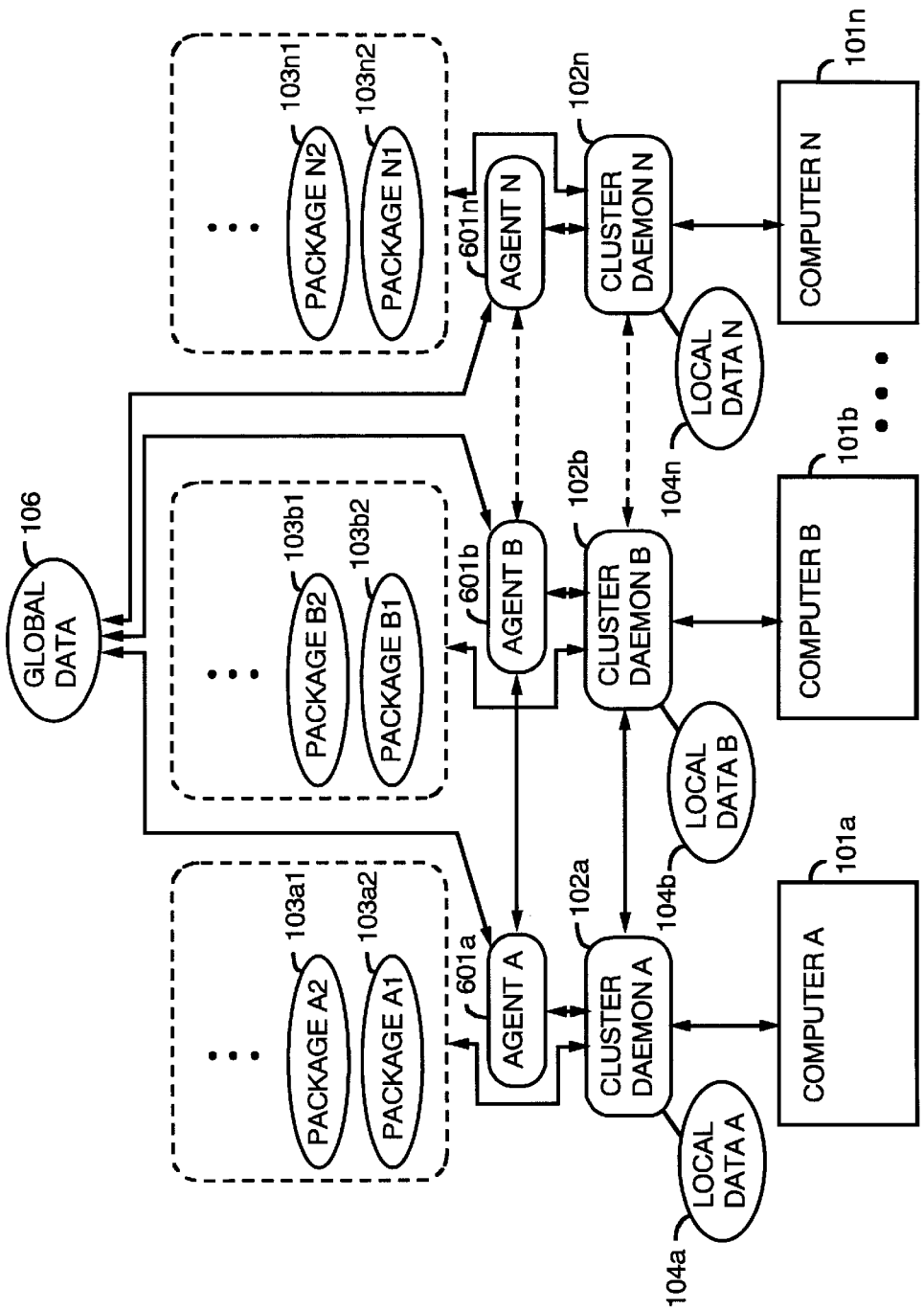
FIG. 12 shows a system configuration according to a third embodiment of the present invention.
Figure 13A:
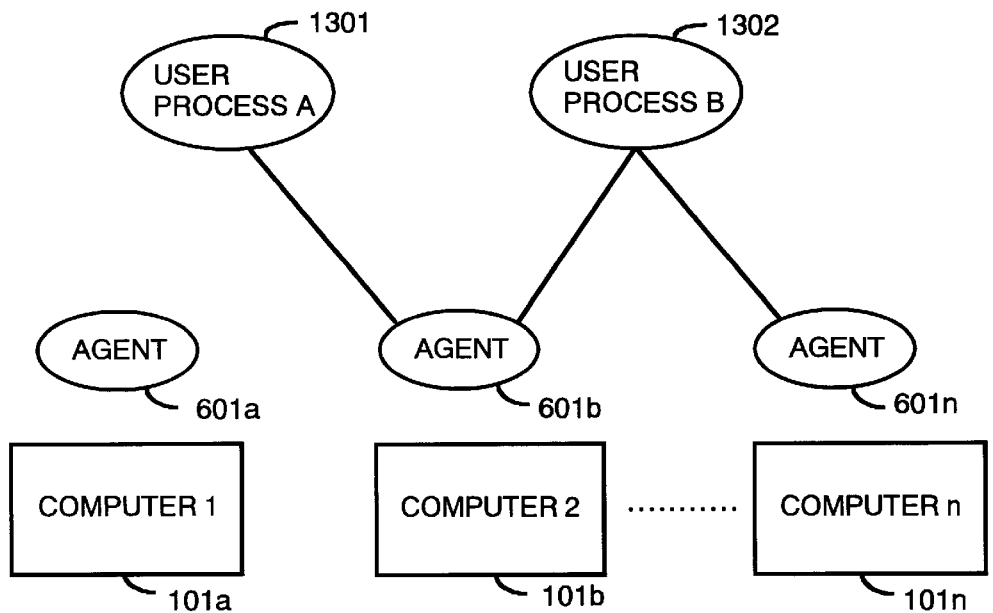
FIGS. 13A and 13B show an operating example in the third embodiment of the present invention.
Figure 13B:
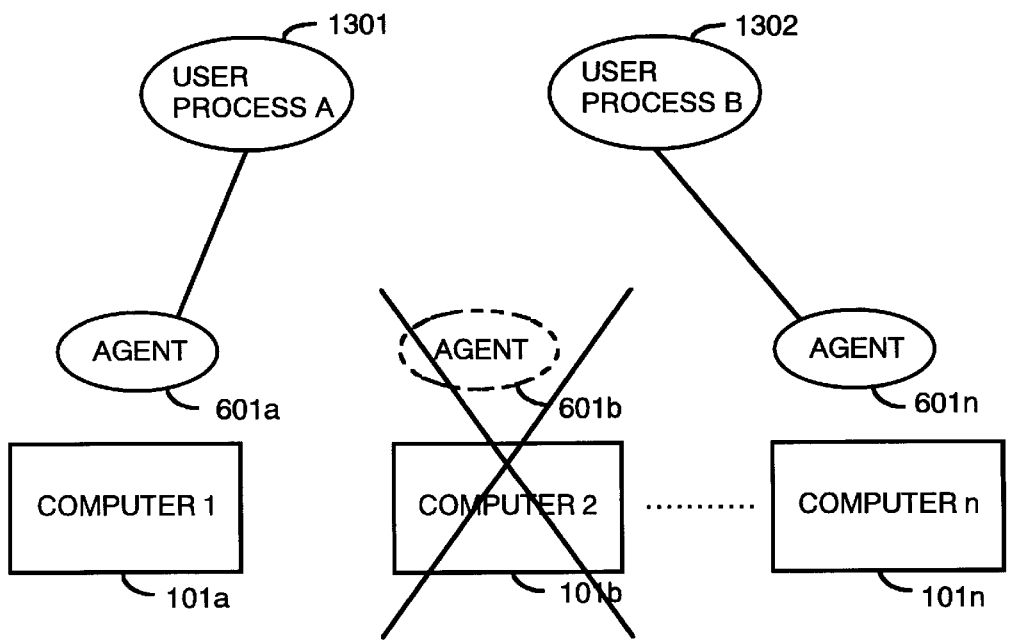

A third embodiment of the present invention is explained using FIG. 12 and FIGS. 13A and 13B. FIG. 12 shows a process construction according to a third embodiment of the present invention, which modifies the system construction of FIG. 6. In the third embodiment, the manager is removed, and the agents communicate with each other by referring to global data.

The system construction is explained using FIG. 12. Agents A–N (601*a*–601*n*) communicate with the cluster daemons, which are being executed on the computers with the respective agents A–N, with the agents on the other computers, and with the user.

Global data 106 are accessible from the respective computers, and are exclusively accessed from the respective computers. The construction of the agents are similar to the construction of the manager illustrated in FIG. 2, however, with the following differences.

Within the respective agents access to the resource state data base 203 and to the notice setting data base 207 is excluded; these accesses are performed automatically.

The resource state monitoring devices 204 in the respective agents only monitor the resources of those computers on which the respective agents are being operated.

If a controlling resource is present on a computer, the resource controlling device 202 transmits the resource to the cluster daemon on the same computer. If the resource is not present, the resource controlling device 202 refers to the resource state data base 203, and transmits the resource to the agents or the cluster daemon, on the computer storing the resource.

The communication controlling device 209 receives signals from the users and respective agents and transmits signals to the users and respective agents.

FIGS. 13A and 13B show user processes of the third embodiment. A user process A 1301 selects one of agents 601a–601n, and communicates with the selected agent. If a fault or failure occurs in the selected agent (see agent 601b in FIG. 13B), the user process A1301 selects another agent (6012 in FIG. 13B) and establishes a new connection.

A user process B 1302 selects any two of the agents 601a–601n, and communicates with the selected agents. Even if a fault or failure occurs in one of the selected agents, the user process B 1302 can continue its processing by maintaining the communication with the other agent.

In the construction described above, it is possible for the users to concentratedly monitor and control the cluster by communicating with one of the agents. It is also possible to shorten the disabled communication period caused by a fault or failure occurring at one agent, by communicating with two other agents.

Embodiment 4

Figure 14:
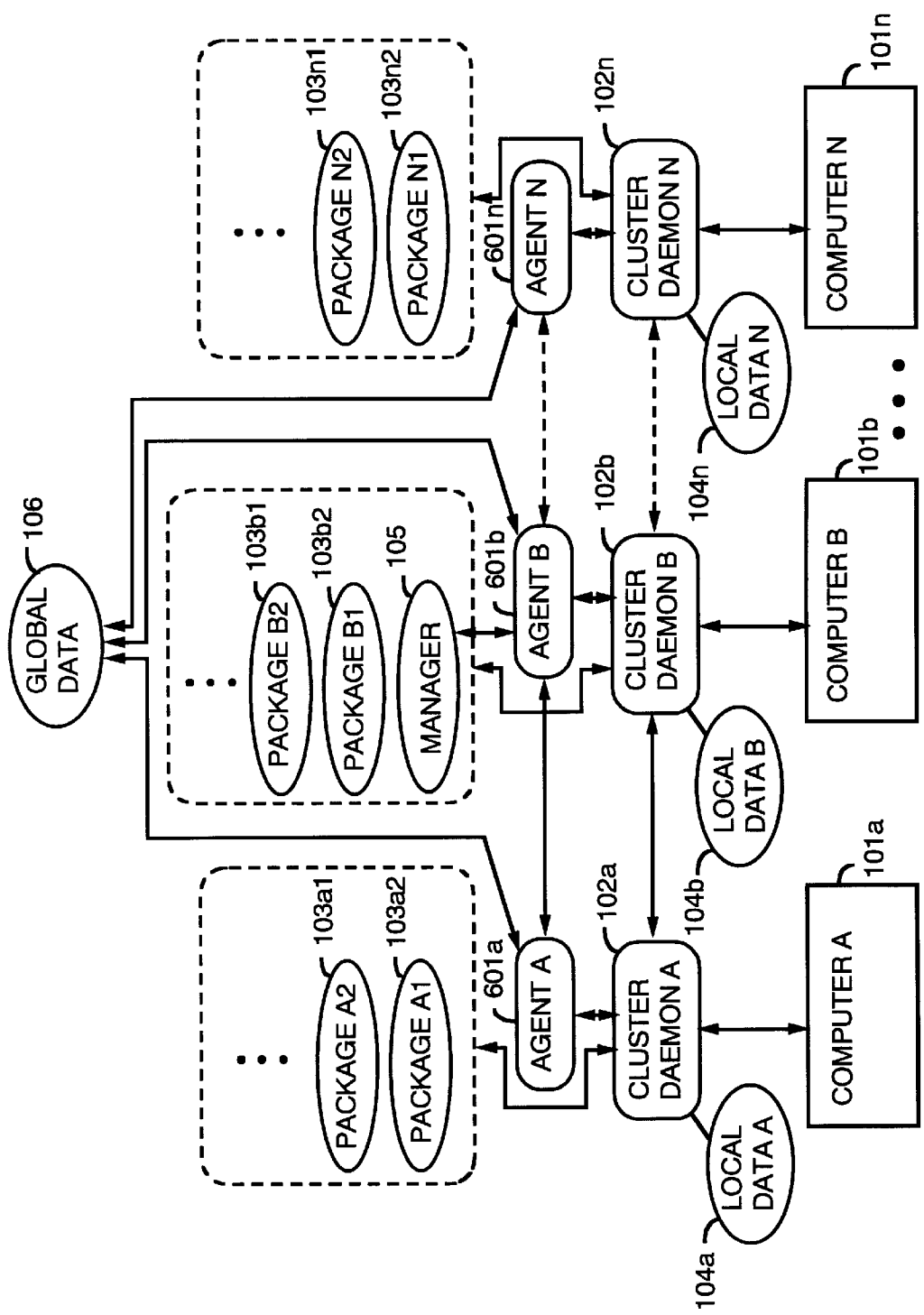
FIG. 14 shows a system configuration according to a fourth embodiment of the present invention.
Figure 15A:
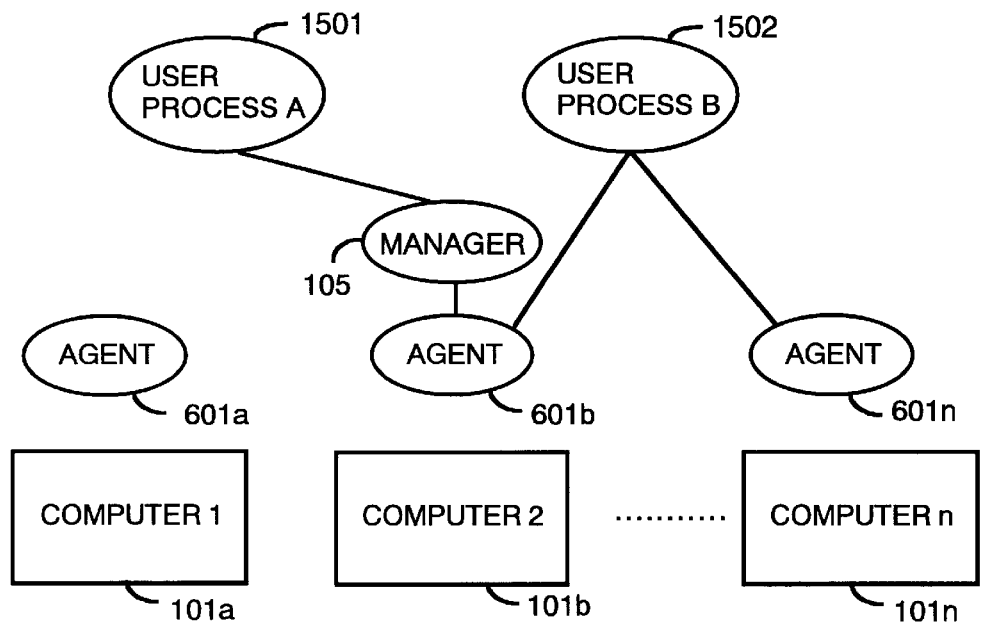
FIGS. 15A and 15B show operation examples in the fourth embodiment of the present invention.
Figure 15B:
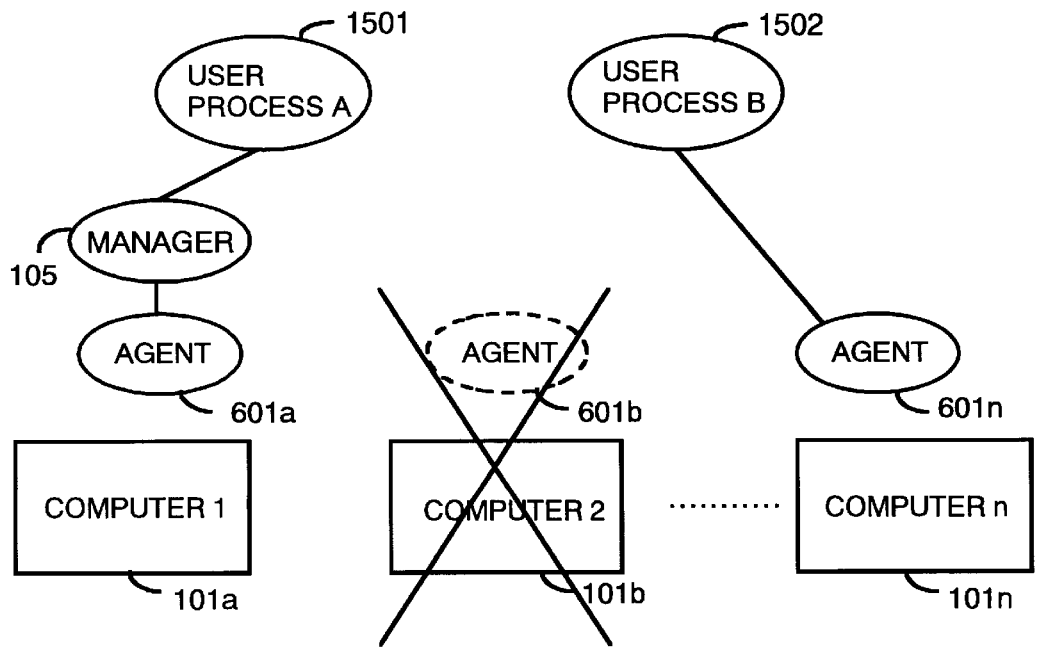

A fourth embodiment of the present invention is explained using FIGS. 14 and 15A and 15B. According to the fourth embodiment has additional manager 105 to the system of FIG. 12. The system construction according to the fourth embodiment is explained using FIG. 14. FIG. 14 shows a process construction according to a fourth embodiment of the present invention.

Agents A–N (601a–601n) are the same as those in FIG. 12. The manager 105 is a package program only having the network addresses. The user can access one of the agents in -the cluster by accessing to the manager 105.

FIGS. 15A and 15B show user processes according to the fourth embodiment. A user process A 1501 communicates with the manager 105. When a fault or failure occurs in the manager 105 as illustrated in FIG. 15B, the manager 105 is restarted on another computer, and the user process A 1501 re-establishes the connection with the manager 105.

A user process B 1502 selects and communicates with two out of the agents 601a–601n. Even when a fault or failure occurs in one of the communicating agents, the process can continue by maintaining the communication with the other agent.

The above-explained construction makes it possible to select a proper operation as in the first and second embodiments, where the user accesses only the manager, or as in the third embodiment where the user accesses one of the agents in the cluster.

When the user accesses only the manager, it is possible to switch the manager in a shorter time period, as compared with the first and the second embodiments, since the manager is a package program which only contains the network addresses. Therefore, it is possible to shorten the disabled communication period caused by a fault or failure occurring at the manager.

Embodiment 5

Figure 16:
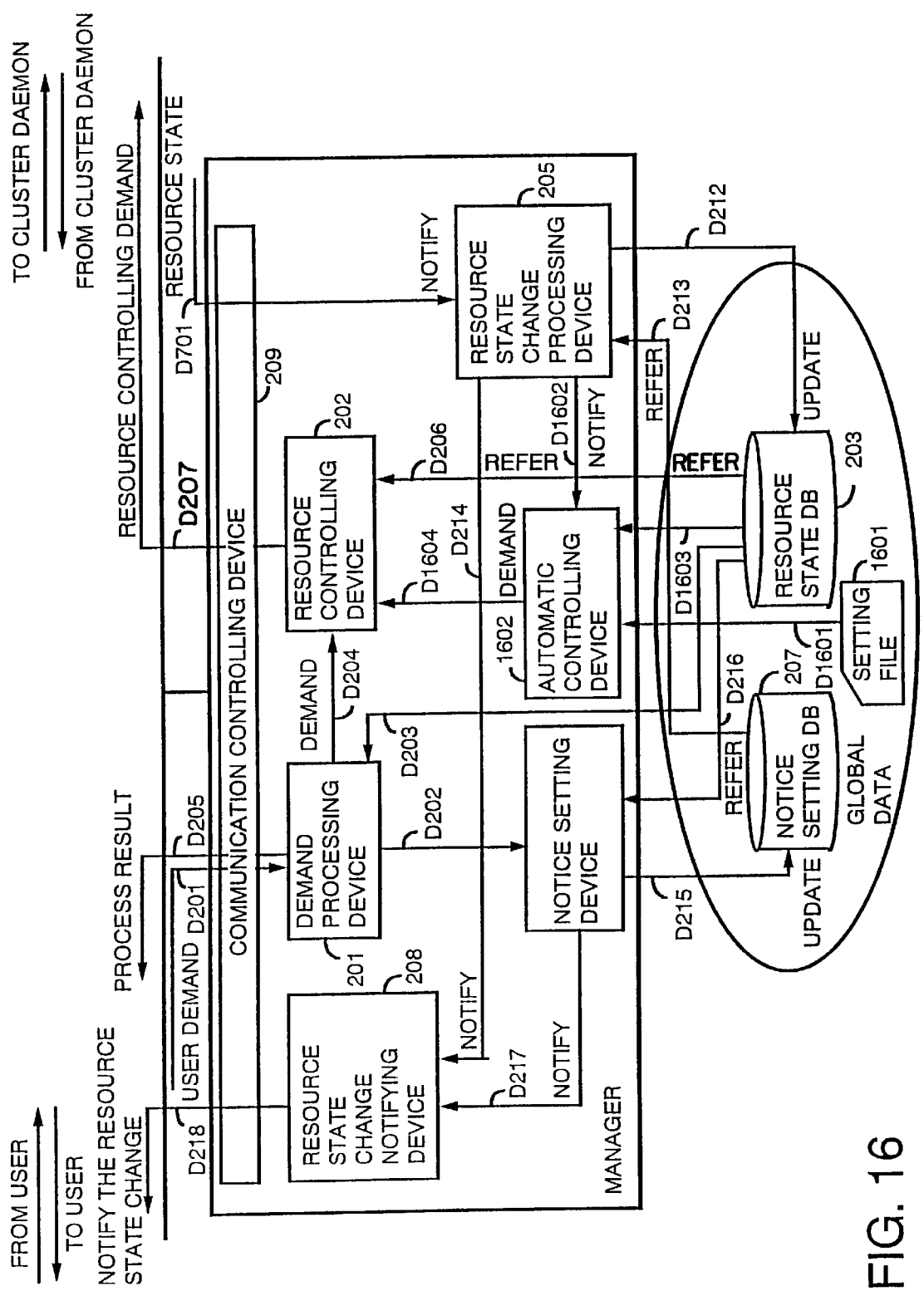
FIG. 16 shows a manager according to a fifth embodiment of the present invention.

A fifth embodiment is explained using FIGS. 16 and 17. The fifth embodiment has added a setting file 1601 and an automatic controlling device 1602 to the manager of FIG. 7.

FIG. 16 shows a manager according to the fifth embodiment of the present invention. In FIG. 16, the setting file 1601 is for automatically controlling the system according to the resource state change, and contains information such as resource names, event names, and a set of processes.

Event names, variable names (attributes) during a process, and command—names (methods) are determined according to the types of resources. The variable names are represented as "a resource name. variable name", and command names are represented as "resource name→command name".

The automatic controlling device 1602 reads the setting file 1601 (D1601), refers to the state (D1603) from the resource state data base 203 when receiving the notice (D1602) from the resource state change processing device 205, and transmits a resource controlling demand (D1604) to the resource controlling device 202 according to the definition of the setting file 1601.

FIG. 17 illustrates an example of the setting file. In FIG. 17, "pkg1" and "pkg2" represent resource names, and types of the resources are packages. The first to the third lines represent comments. Fifth to ninth lines represent the definition for starting-up the pkg2 when the pkg1 stops.

Eleventh to fifteenth lines represent a definition for stopping pkg2 when both of the pkg1 and pkg2 are operating on the same computer at the time of the pkg1 start-up. Seventeenth to twenty first lines represent a definition for stopping the pkg2 (or releasing the start-up of pkg2) when both of the pkg1 and pkg2 are operating on the same computer at start-up of pkg2.

According to the above-explained definitions, pkg1 and pkg2 are prevented from operating on a same computer, and pkg1 has a priority over pkg2 if both packages are to operate on the same computer.

The packages are controlled according to the setting file of this example. However, other resources may be controlled in the same manner. The manager according to the second embodiment is used for the explanation of the fifth embodiment, however, the managers of the first and fourth embodiments may also be used.

Embodiment 6

A sixth embodiment is explained using FIG. 18. The sixth embodiment modifies the setting file of FIG. 17, so that it becomes possible to set correlation-ship and priorities of the packages.

The setting file of FIG. 17 is modified by adding pairs of package names and execution enable conditions which enable the execution of the packages. According to the sixth embodiment, it is possible for an automatic controlling device 1602 to control the resources with a resource controlling device, according to the description of the setting file.

The execution enable condition of the packages is represented by a row of "package name, |, &, and!". The package name is required to satisfy the condition that the package is operating on the same computer. The symbols |, &, and ! show a logical addition, a logical product, and a logical negation of the conditions, respectively. The package priority is defined according to the description order of the packages.

FIG. 18 illustrate an example of the setting file. The first line represents a comment. The second line defines that pkg1 is prohibited to operate with pkg2 on the same computer. The third line defines that pkg2 is prohibited to operate with pkg1 on the same computer.

The fourth line defines that a pkg3 must operate with pkg1 or pkg2 on the same computer. According to the above-explained definitions, pkg3 is executed on the computer under the condition that pkg1 or pkg2 is operating.

Embodiment 7

A seventh embodiment is explained using FIGS. 19–21D. The seventh embodiment adds a mode managing device 1901 to the manager of the second embodiment in FIG. 7.

In the seventh embodiment, when the same package programs can be executed on multiple computers, the respective package programs are assigned with mode information such as "operating", "waiting", and "testing", and the operations of the package programs are changed based on this mode information.

Figure 19:
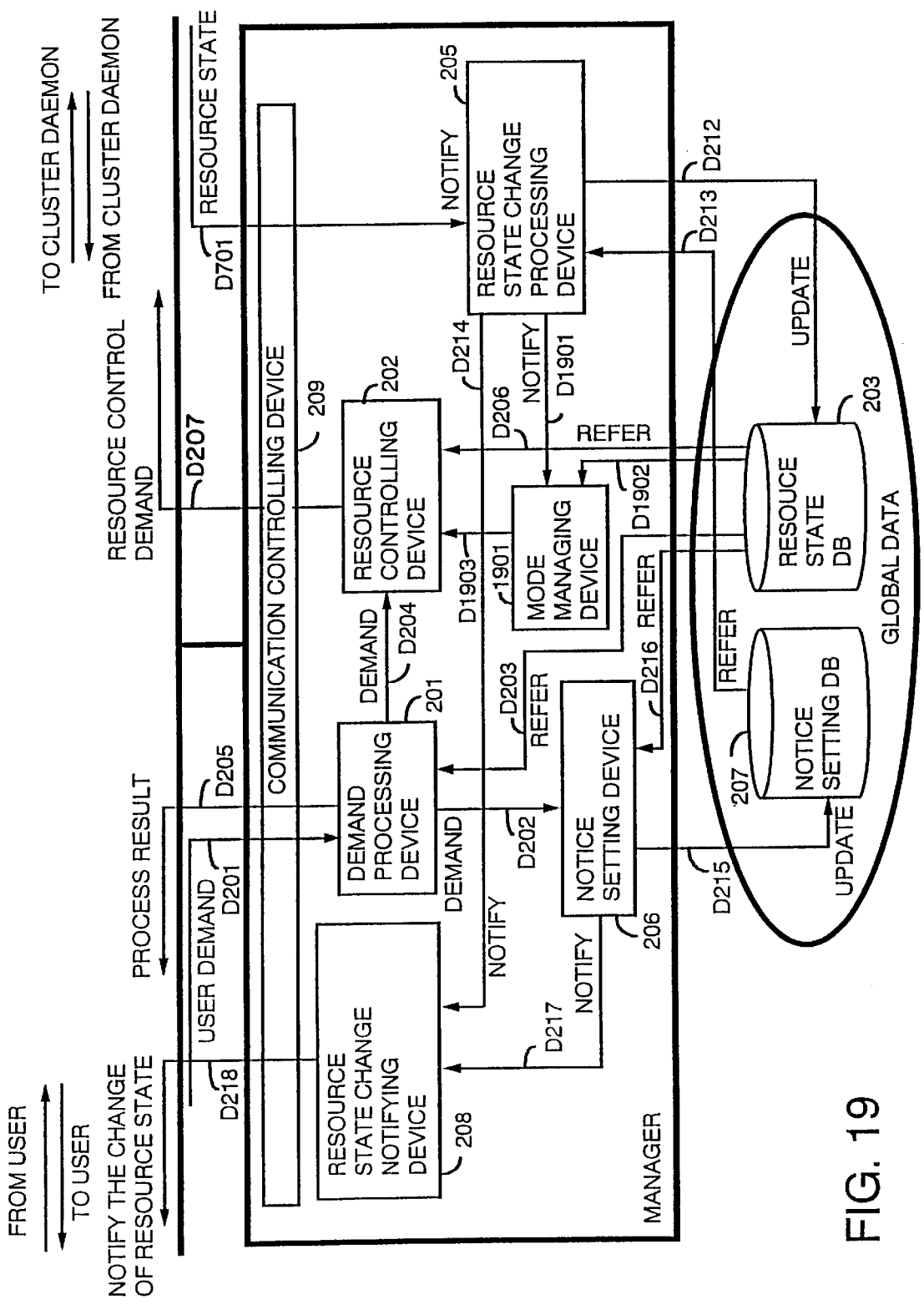
FIG. 19 shows a manager according to a seventh embodiment of the present invention.

FIG. 19 illustrates a manager according to the seventh embodiment. A mode managing device 1901 receives a notice (D1901) from the resource state change processing device 205, refers to the state (D1902) from the resource state data base 203, and transmits a resource controlling demand (D1903) to the resource controlling device 202 so that the operation illustrated in FIG. 20 is performed.

Figure 20:
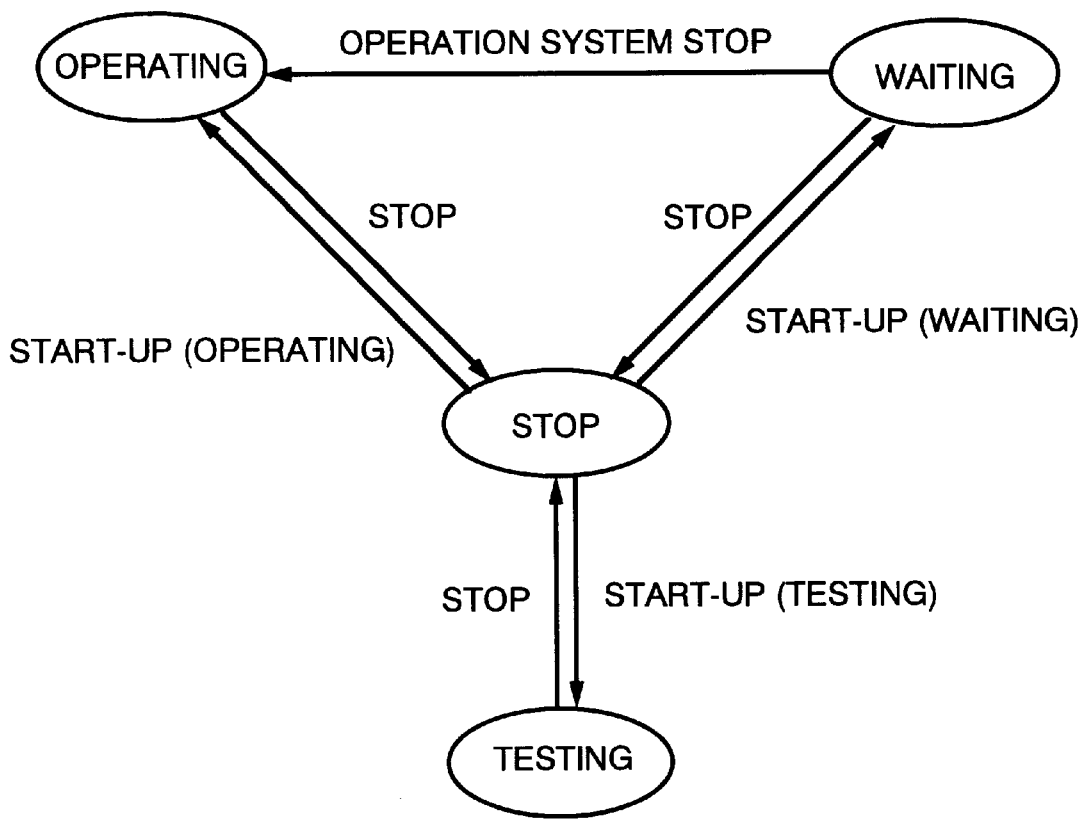
FIG. 20 illustrates the transition of mode states according to the seventh embodiment of the present invention.

FIG. 20 illustrates the transition of mode states according to the seventh embodiment of the present invention. The package program in the mode "stop" is started-up by assigning one of the mode's "operating, waiting", and "testing", and transfers to other respective states. The programs in the respective modes "operating", "waiting", and "testing" transfer to the mode "stop" when a fault or failure occurs in the programs.

The package program in the mode "waiting" transfers to the mode "operating" when the other package program in the mode "operating" stops.

The packages are controlled so that only one package in the mode "operating" exists in the cluster.

FIGS. 21A–21D show operation examples when there are two computers which can operate. In FIGS. 21A–21D, packages A (2101, 2102) are the same packages, and are being executed on the respective computers. In this example, the package A 2101 on the computer 1 is in a mode "operating", and the package A 2102 on the computer 2 is in a mode "waiting". When a fault or failure has occurred in computer 1, the mode of package A 2102 on computer 2 is changed to a mode "operating" and the process continues as shown in FIG. 21C.

When computer 1 is restarted after being repaired, since package A 2102 is operating in the cluster, package A 2101 on computer 1 is restarted with a mode "waiting" as shown in FIG. 21D.

According to the above-explained construction, it possible to switch the operation of the package in a shorter time, in comparison with the restart of the package itself.

In the seventh embodiment, the mode states of "operating", "waiting", and "testing" are defined, but, other states may also be defined. In the seventh embodiment, the manager of the second embodiment is used, but, the manager of the first, fourth, and fifth embodiments may also be used.

Embodiment 8

Figure 22:
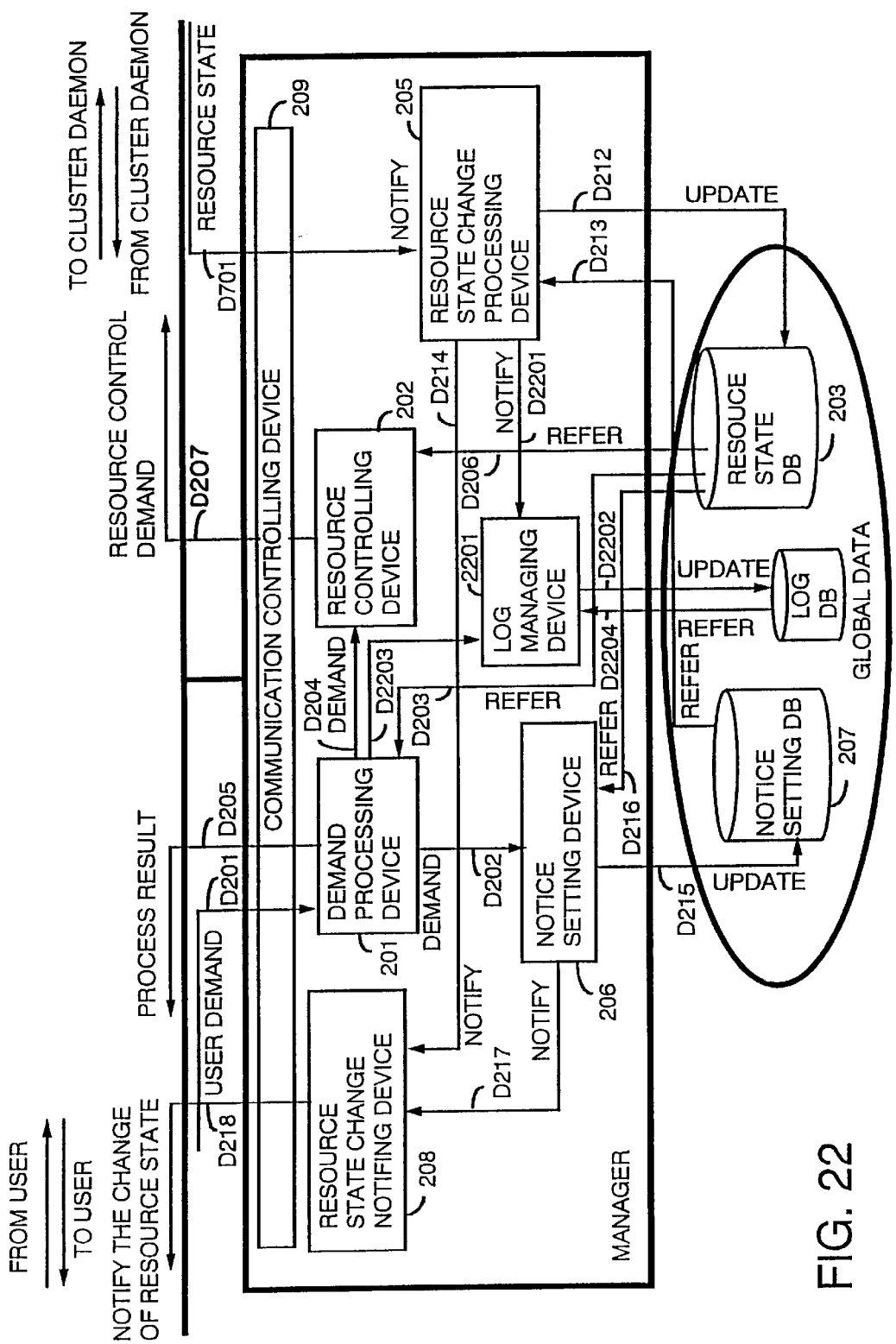
FIG. 22 shows a manager according to an eighth embodiment of the present invention.

An eighth embodiment is explained using FIG. 22. According to the eighth embodiment, a log managing device 2201 and a log data base 2202 are added to the manager of FIG. 7 in the second embodiment.

The manager according to the eighth embodiment is illustrated in FIG. 22. In FIG. 22, the log managing device 2201 receives a notice (D2201) of the resource state change from the resource state change processing device 205, and updates (D2202) the log data base 2202. At this time, the log data are controlled in the order of time sequence.

The log managing device 2201 receives the demand (D2203) from the demand processing device 201, refers to the log data base 2202, and obtains the log data from the log data base 2202.

The log data base 2202 stores all events for all resources in the cluster, and the time of their generation. According to the above-explained construction, the user can obtain information regarding all events occurring in the cluster, simply by accessing the manager. According to the eighth embodiment, the manager of the second embodiment is used, but, the manager of the first, fourth, fifth, and seventh embodiments may also be used.

Embodiment 9

A ninth embodiment is explained using FIGS. 23–26. According to the ninth embodiment, a manager is used instead of the manager 105 of FIG. 1, and it manages the respective packages by modes. In the following description, if the computer is not specified, a computer 101 is used as a representative among the computers A 101a–N 101n, if the cluster daemon is not specified, a cluster daemon 102 is used as a representative among the cluster daemons A102a–N102n, and if the package is not specified, a package 103 is used as a representative among the packages 103a1–103n2.

Figures 23, 24:
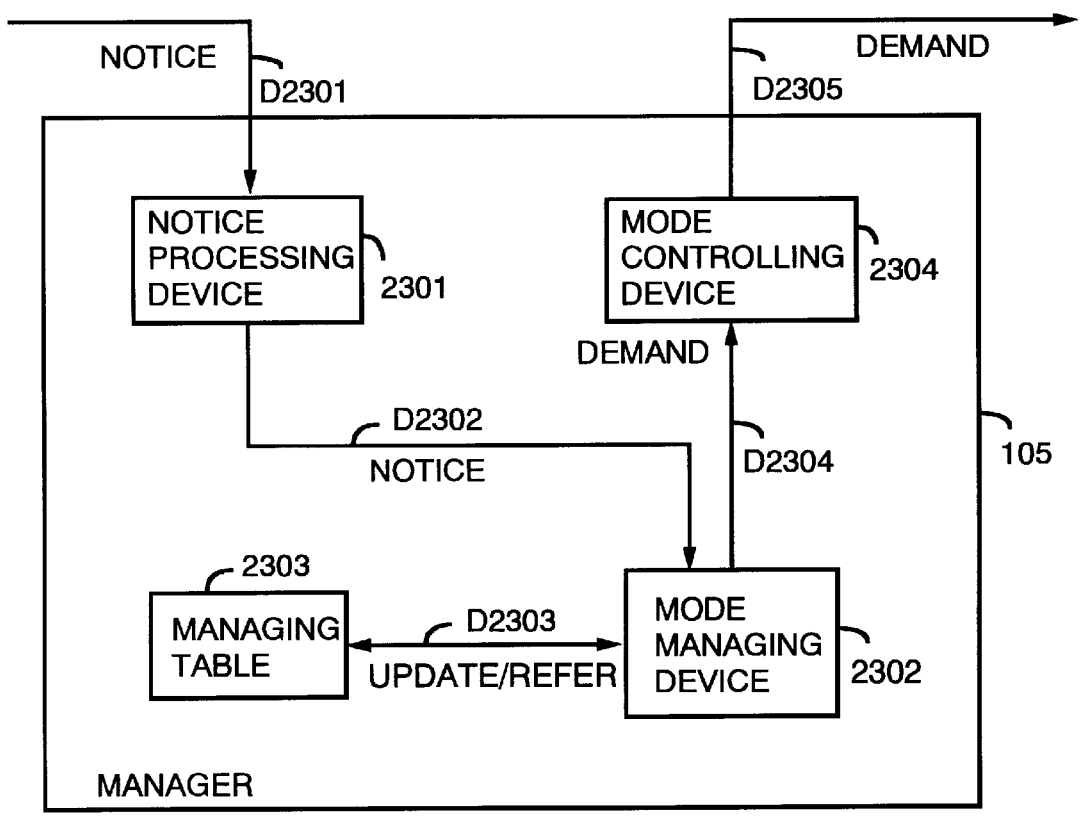
FIG. 23 shows a manager according to a ninth embodiment of the present invention.
FIG. 24 shows an example of contents of a managing table according to the ninth embodiment of the present invention.

A manager according to the ninth embodiment is illustrated in FIG. 23. In FIG. 23, a notice processing device 2301 receives a resource state change notice (D2301) from the cluster daemon 102, and transmits the resource state change notice (D2302) to a mode managing device 2302.

The mode managing device 2302 receives a resource state change notice (D2302) from the notice processing device 2301, refers and update a managing table 2303, and transmits a mode controlling demand (D2304) to a mode controlling device 2404.

The mode controlling device 2404 receives the mode controlling demand (D2304), and transmits a mode controlling demand (D2305) to the cluster daemon 102 or to the package 103.

Figure 25:
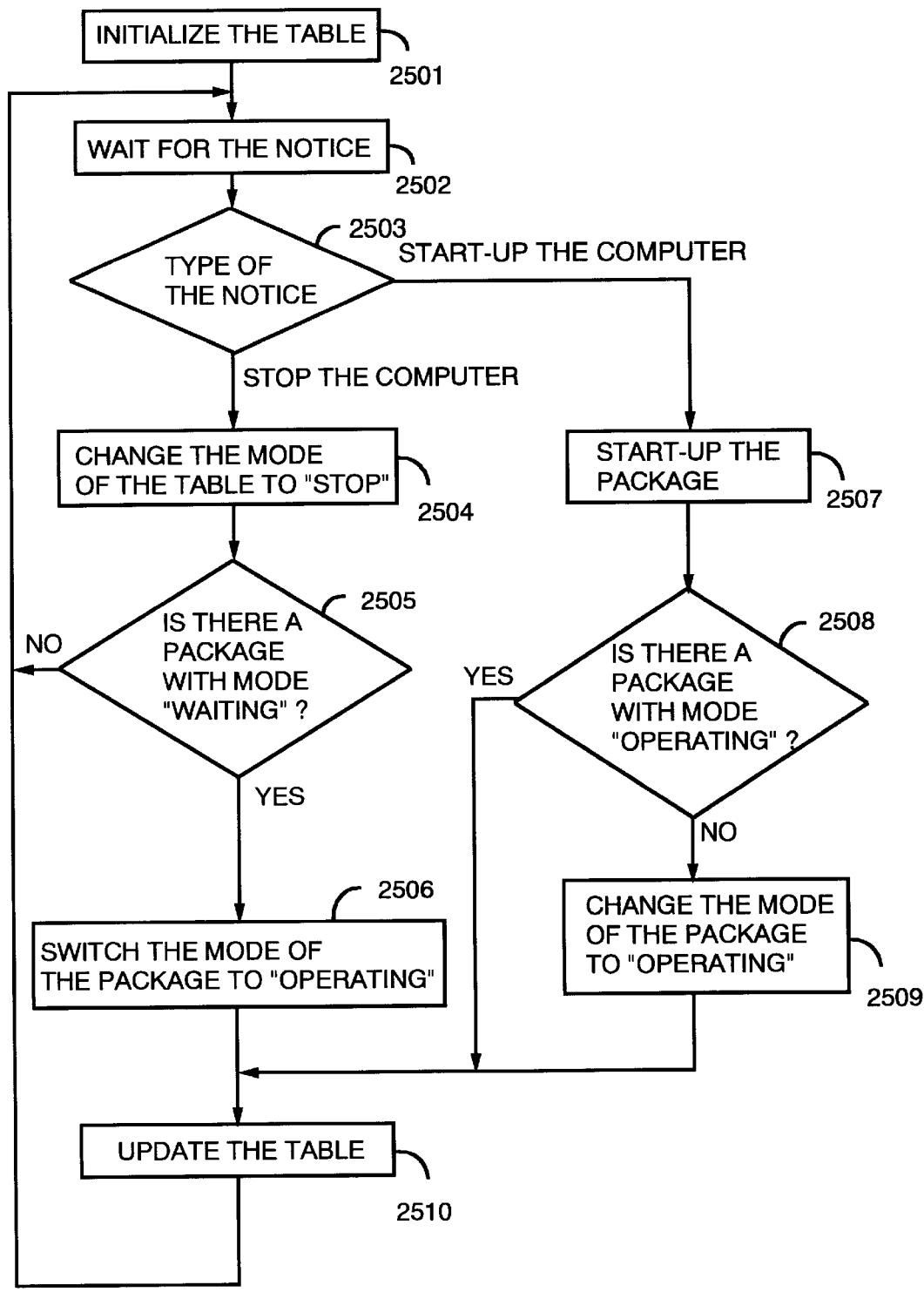
FIG. 25 is a flow chart explaining processes performed by the manager in the ninth embodiment of the present invention.

FIG. 24 illustrates an example of contents stored in the managing table 2303. The managing table 2303 stores package names and mode states such as "operating", "waiting", and "stop". FIG. 25 is a flow chart explaining the processes performed by the manager 105 of FIG. 23.

The operation of the manager 105 is explained using FIG. 25. In a step 2501, the mode managing device 2302 initializes the managing table 2303.

In a step 2502, the notice processing device 2301 waits for a resource state change notice (D2301) from the cluster daemon 102, and transmits the resource state change notice (D2302) to the mode managing device 2302 when received.

In a step 2503, the mode managing device 2302 determines the type of the received resource state notice (D2302). If the resource state change notice (D2302) is "start-up the computer 101", the process jumps to a step 2507, and if the resource state change notice (D2302) is "stop the computer 101", the process goes to a step 2504. When the resource state change notice (D2302) is "stop the computer 101", the mode managing device 2302 updates the managing table 2303, and changes the modes of all packages operating or waiting on the stopped computer 101 to "stop" in the step 2504.

In a step 2505, the mode managing device 2302 examines if there are any packages 103 with the mode "waiting". At this time, if multiple kinds of packages 103 are being executed on the computers, the mode managing device 2302 further examines if there is any package 130 which is the same kind of package as the stopped package 103, with a mode "waiting". For this purpose, information regarding the computers performing the packages 103, and information regarding kinds of the packages 103 may be added in the managing table 2303, as illustrated in FIG. 24.

When there is no package 103 with the mode "waiting", the process returns to the step 2502. Moreover, when there is no package 103 with the mode "waiting", the same kind of package as the stopped package 103 may be started-up on the other computers 101.

If there is a package 103 with the mode "waiting", the mode managing device 2302 transmits the mode controlling demand (D2304) for representing "operating" to the mode controlling device 2304, in a step 2506. The mode controlling device 2304 transmits the mode control demand (D2304) to the package 103, which is found at the step 2503, via the cluster daemon 102 to operate the waiting package 103.

In a step 2510, the mode managing device 2302 updates the managing table 2303. That is, the mode managing device 2302 changes the mode of the managing table 2303 regarding the package 103 to a mode "operating", which is represented as "operating" in the managing table 2303 in the step 2506. When the step 2510 is completed, the process returns to the step 2502.

If it is determined that the type of the notice is "start-up the computer 101"in the step 2503, the mode managing device 2302 transmits the mode controlling demand (D2304) to the mode controlling device -2304, and starts-up the package 103, which has been stopped on the started computer 101, by the waiting state in a step 2507.

Next, in a step 2508, the mode managing device 2302 refers to the managing table 2303, and examines if there is any package 103 with the mode "operating". If there are multiple kinds of packages 103 with the mode "operating", the mode managing device 2302 examines if there is any package 103, which is the same package as those started-up in the step 2507, with the mode "operating".

If there is a package 103 with the mode "operating", the mode managing device 2302 updates the managing table 2303 in the step 2510. That is, the mode managing device 2302 changes the mode of the managing table 2303 regarding the package 103, which is started-up in the step 2507, to "waiting". When the step 2510 is completed, the process returns to the step 2502.

If there is no package 103 with the mode "operating", the mode managing device 2302 transmits the mode controlling demand (D2304) representing "operating" to the mode controlling device 2304 in a step 2509. The mode controlling device 2304 transmits the mode controlling demand (D2305) to the package 103, which is found at the step 2508, to operate the package 103 which has been waiting.

In a step 2510, the mode managing device 2302 updates the managing table 2303. That is, the mode managing device 2302 updates the mode of the managing table 2303 regarding the package 103 to an "operating", which represents the 44operating", in the step 2509. When the step 2510 is completed, the process returns to the step 2502.

FIGS. 26A–26D illustrate one example of the operation according to the ninth embodiment. In FIGS. 26A–26D, the elements having the same numbers as those in FIG. 1 correspond to the same portions of FIG. 1.

Figure 26C:
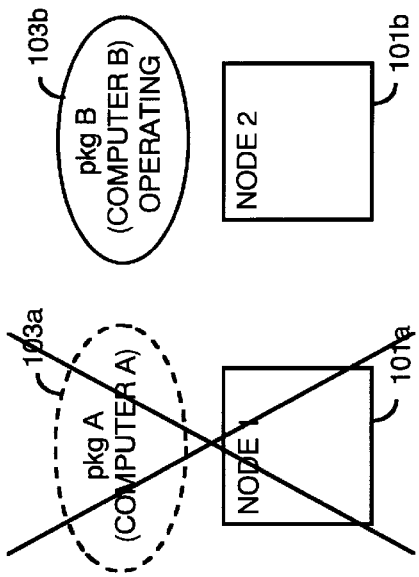
FIGS. 26A–26D show an example of system operations according to the ninth embodiment of the present invention.
Figure 26D:
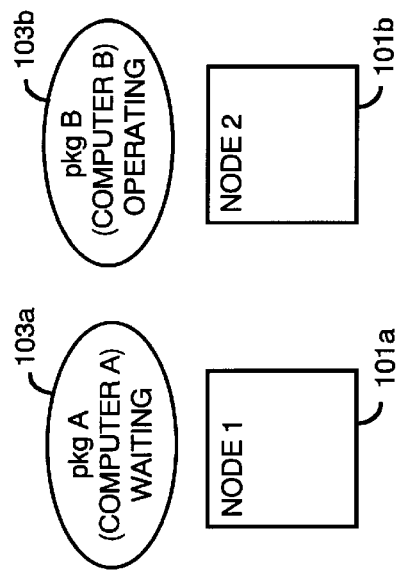
Figure 26A:
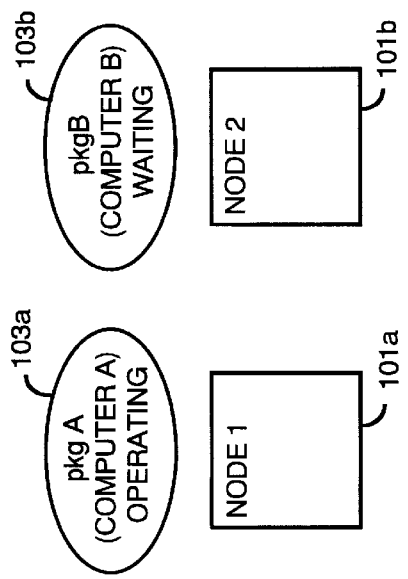
Figure 26B:
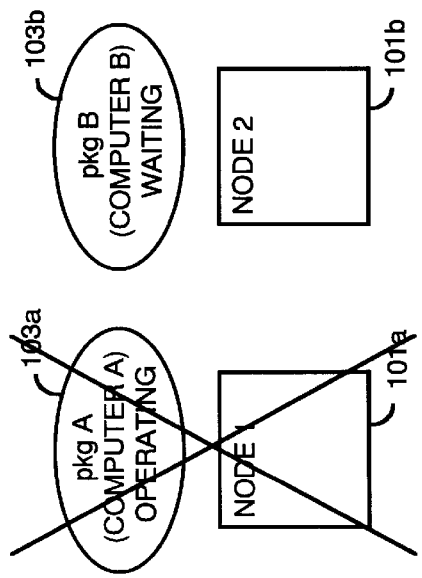

First of all, as illustrated in FIG. 26A, a first computer A 101a is executing a first package A 103a, a second computer B 101b is waiting on a second package B 103b. When the computer A 101a stops due to a fault or failure, as illustrated in FIG. 6B, the manager 105 starts to operate in the above-explained manner, and the computer B 101b executes the package B 103b which has been waiting to operate as illustrated in FIG. 26C. At this time, package A 103a can be changed to package B 103b at high speed, which reduces the time necessary for starting-up, since package B 103b has been waiting. Once computer A 101a recovers from the stop state and starts to operate normally, package A 103a, which had been stopped, is started-up on computer A 101a, and assumes the "waiting" state as illustrated in FIG. 26D.

Even after the computer A 101a is recovered from the failure, the package B 103b is not switched immediately to the package A 103a, but the package A 103 is held in "waiting7' state. Therefore, since another switching process is not necessary, the processing can be performed at high speed.

According to the ninth embodiment, it is possible to construct a dual system which is managed by operating/waiting modes in the cluster, and to switch packages faster, other than just restarting a package from the beginning.

Embodiment 10

Figures 27, 28:
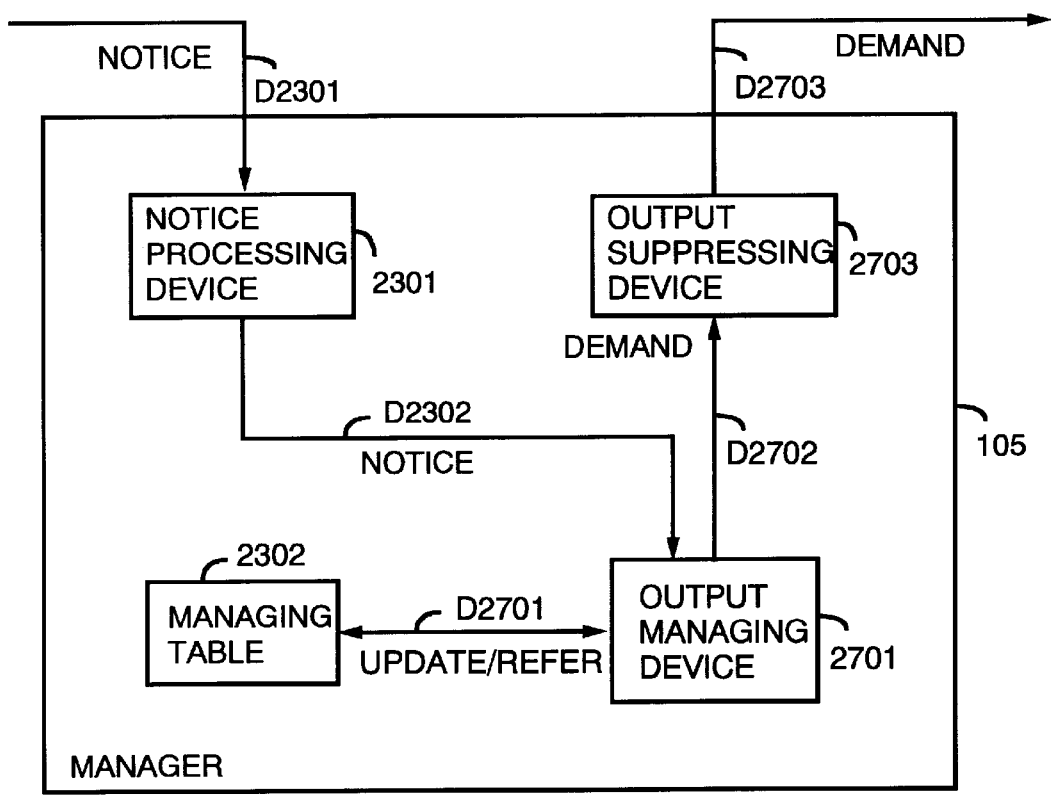
FIG. 27 shows a manager according to a tenth embodiment of the present invention.
FIG. 28 shows an example of contents of a managing table according to the tenth embodiment of the present invention.
Figure 30A:
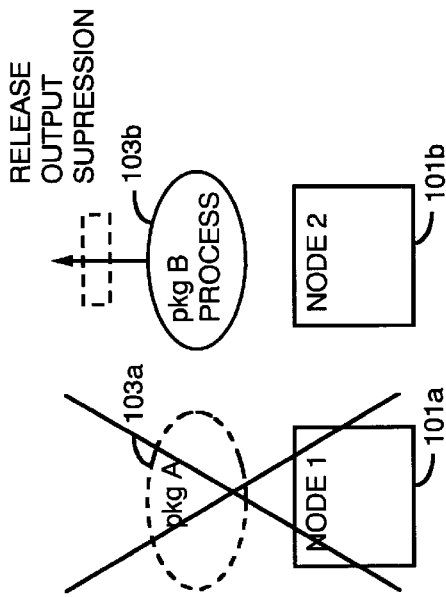
FIGS. 30A–30D show an example of system operations according to the tenth embodiment of the present invention.
Figure 30B:
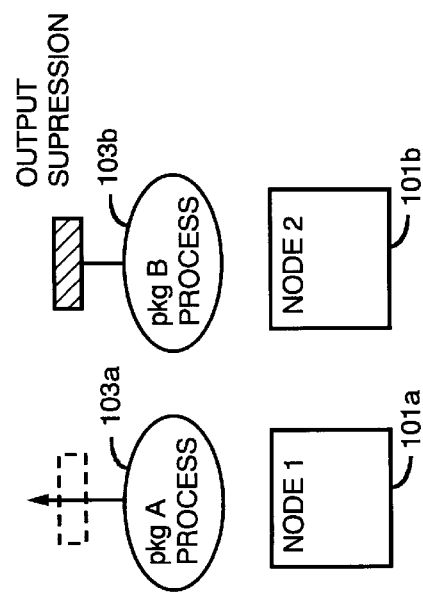
Figure 30C:
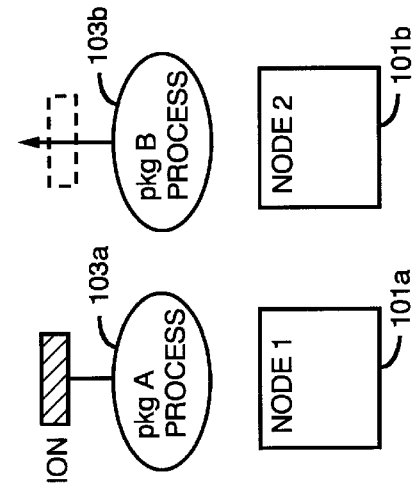
Figure 30D:
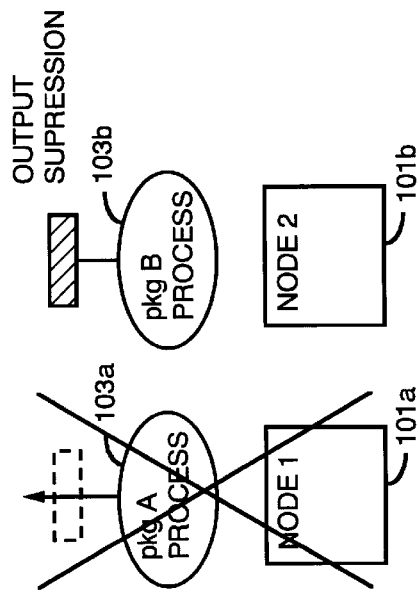

A tenth embodiment of the present invention is explained using FIGS. 27 30D. According to the tenth embodiment, a manager is used instead of the manager 105 of FIG. 1, and it manages an output of the respective packages.

FIG. 27 shows the manager according to the tenth embodiment of the present invention. In FIG. 27, the elements having the same numbers as those in FIG. 23 correspond to the same portions of FIG. 23.

An output managing device 2701 receives a resource state change notice (D2302) from a notice processing device 2301, refers and updates a managing table 2702, and transmits an output suppression/release demand (D2702) to an output suppressing device (2703).

The output suppressing device (2703) receives the output suppression/release demand (D2702) from the output managing device 2701, and transmits the output suppression/release demand (D2703) to a cluster daemon 102 or to a package 103.

FIG. 28 shows an example of contents stored in the managing table 2702. The managing table 2702 stores the package names and the state of the. output suppression such as "suppress" or "release".

Figure 29:
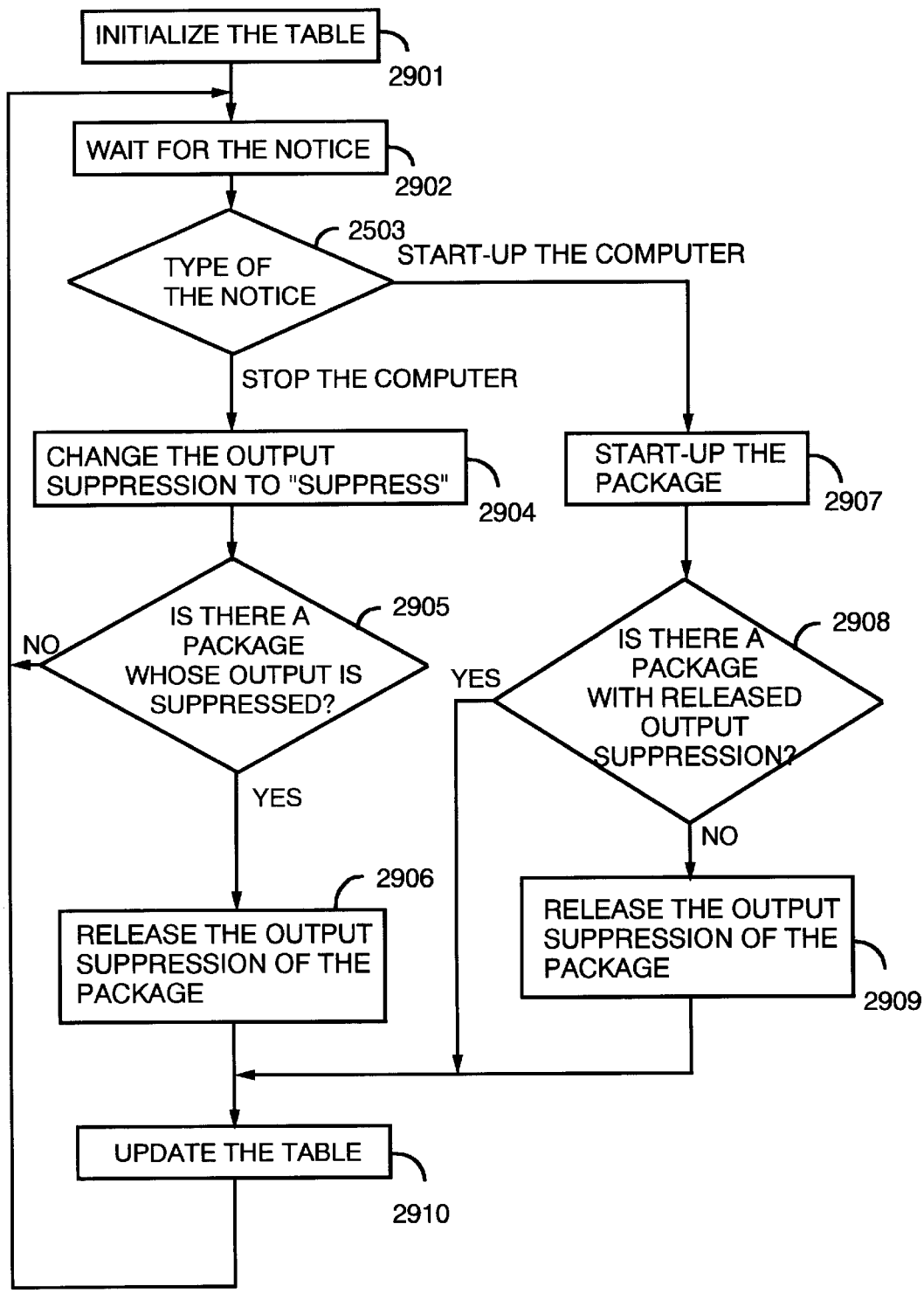
FIG. 29 is a flow chart explaining processes performed by manager according to the tenth embodiment of the present invention.

FIG. 29 is a flow chart explaining the process performed by the manager 105 illustrated in FIG. 27.

This operation of the manager 105 according to the tenth embodiment is explained using FIG. 29. In a step 2901, the output managing device 2701 initializes the managing table 2702.

In a step 2902, the notice processing device 2301 waits for a resource state change notice (D2301) from the cluster daemon 102, and transmits the received notice to the output suppressing device 2703, when a resource state change notice (D2301) is received.

In a step 2903, the output managing device 2701 determines the type of the resource state notice (D2301). If the resource state change notice (D2301) is "start-up the computer 101", the process goes to a step 2907. If the resource state change notice (D2301) is "stop the computer 101", the process goes to a step 2904.

If the resource state change notice (D2301) is "stop the computer 101", the output managing device 2701 updates the managing table 2702, changes the output suppression states of all the packages 103 on the stopped computer 101 to "suppress", in the step 2904.

In a step 2905, the output managing device 2701 examines if there is any package 103 whose output suppression state is "suppression". At this time, if multiple packages 103, whose output suppression state is "suppression", are being executed on the computers, the output managing device 2701 further examines if there is any package 103 which is the same kind of package as the suppressed package 103 and whose output suppression state is "suppression". For this purpose, the managing table 2702 of FIG. 28 may be added by information regarding the computers on which the packages 103 are executed, and information regarding the kind of packages 103.

In the step 2905, if there is no package 103 whose output suppression state is "suppression", the process returns to the step 2902. At this time, if there is no package 103 whose output suppression state is "suppression", a package which is the same kind as the suppressed package 103 in a step 2904 may be started-up in the other operating computers.

If there is a package 103 whose output suppression state is "suppression", the output managing device 2701 transmits the output suppression releasing demand (D2702) to instruct the output suppressing device 2703 to release the suppression. The output suppressing device 2703 transmits the output suppression/release demand (D2703) to the package 103 which has been found at the step 2905 via the cluster daemon 102, so that the package 103, whose output has been suppressed up to this point, starts outputting.

In a step 2910, the output managing device 2701 updates the managing table 2702. In other words, the output managing device 2701 changes the output suppression state of the managing table 2702, which is instructed to release the output suppression in a step 2906, to "release". When the step 2910 is completed, the process returns to the step 2902.

If the type of the notice is determined as "start-up the computer 101" in the step 2903, the output managing device 2701 transmits the output suppression releasing demand (D2702) to the output suppressing device 2703, and the package 103 is started on the started-up computer 101 in a suppressed state, in the step 2907.

In a step 2908, it is examined if there is any package 103 whose output suppression state is "release". At this time, if multiple kinds of packages 103 have the output suppression state of "release", it is examined further if there is any package 103 which is the same package as the started-up package 103 in a step 2907, and whose output suppression state is "release".

If there is a package 103 whose output suppression state is "release", the output managing device 2701 updates the managing table 2702 in a step 2910. In other words, the output managing device 2701 changes the output suppression state of the managing table corresponding to the package 103 which has been started-up in the step 2907 to "suppress". When the step 2910 is completed, the process returns to the step 2902.

If there is no package 103 whose output suppression state is "release", the output managing device 2701 transmits an output suppression releasing demand (D2702) to the output suppressing device 2703 in a step 2909. The output suppressing device 2703 transmits the output suppression releasing demand (D2702) to the package 103 found at the step 2908 via the cluster daemon 102, so that the output of the package 103, whose output has been suppressed, start outputting.

In the step 2910, the output managing device 2701 updates the managing table 2702. In other words, the output managing device 2701 changes the output suppression state of the managing table 2702, corresponding to the package 103 which has been instructed to release the output suppression in a step 2909, to "release". When the step 2910 is completed, the process returns to the step 2902.

FIGS. 30A–30D explain an example of the operation according to the tenth embodiment of the present invention. In FIGS. 30A–30D, the elements having the same numbers as those in FIG. 1 are the same portions as those in FIG. 1.

In the beginning, as illustrated in FIG. 30A, assuming that a first computer A 101a is executing a first package A 103a, a second computer B 101b is executing a second package B 103b, and the package A 103a is outputting an output. That is, the output suppression of the package A 103a is released, and the output of the package B 103b is suppressed, that is, in the output suppression state. The package A 103a and the package B 103b receive same input data, and are operating in the same manner.

If assuming the computer A 101a is stopped due to a fault or failure in the manner illustrated in FIG. 30B, after the state illustrated in FIG. 30A, the manager 105 in FIG. 27 starts to operate as explained above, and the package B 103b, whose output has been suppressed on the computer B 101b, starts outputting immediately in the manner illustrated in FIG. 30C. At this time, since the package B 103b has been operating in the same manner as in the package A 103a, the package A 103a changes to the package B 103b in an instant, and the recovery time is shorter than the normal recovery time in the system according to the ninth embodiment.

Once the computer A 101a is recovered from the stop state and starts to operate normally, the computer A 101a, which had been stopped, starts-up the package A 103a, and the package A 103a starts to operate again with "suppressed" state, as shown in FIG. 30D.

Even after the computer A 101a recovers from the failure, the operating package B 103b is not switched immediately to the package A 103a, but the package A 103 is held in the "suppress" state. Therefore, since another switching process is not necessary, the processes in the entire system can be performed at high speed.

The output controller suppresses the output, and releases the suppression of the output. This output controller may be provided with the package program, a separate program from the package program, or a program which is executed by a thread. When the package 103 communicates with a process of another package 103, such as a thread, (hardware controllers such as peripheral devices), communication may be achieved via this output controller.

In the manner explained above, according to the tenth embodiment, it is possible to construct a free run dual system on the cluster system, and to switch packages in a shorter time than the time required for re-starting package itself.

Embodiment 11

Figure 31:
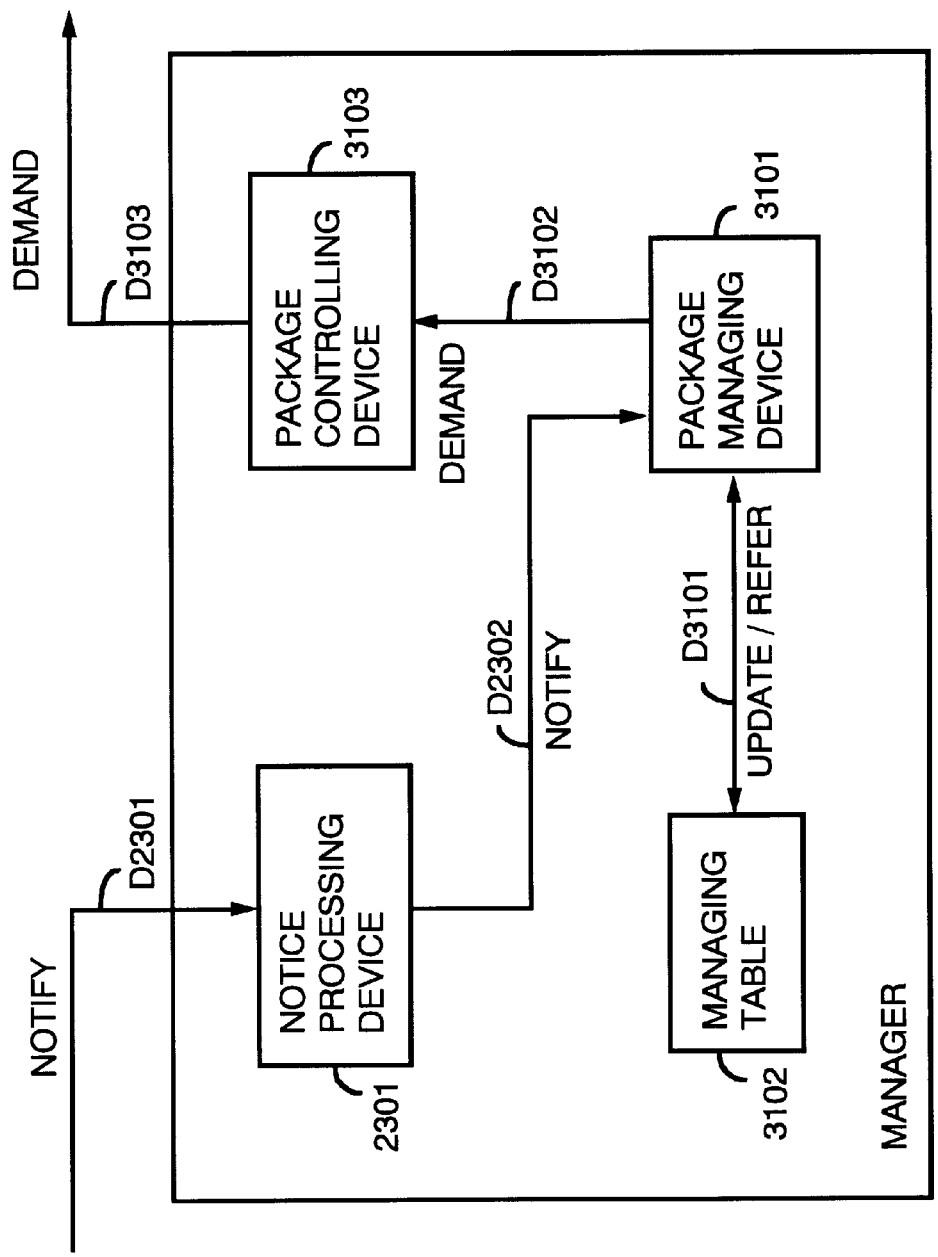
FIG. 31 shows a manager according to an eleventh embodiment of the present invention.
Figure 34A:
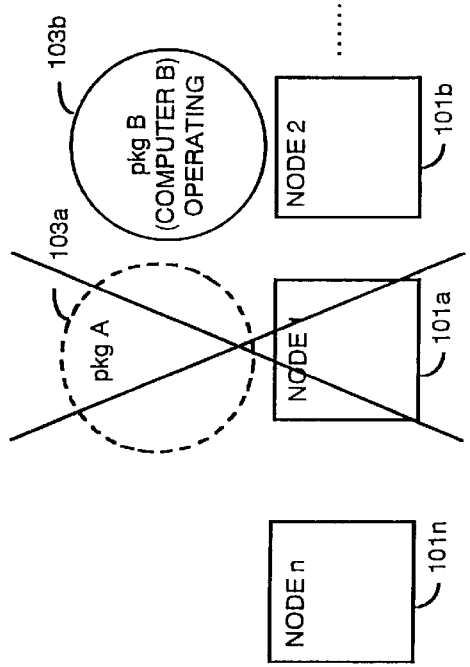
FIGS. 34A–34D show an example of system operations according to the eleventh embodiment of the present invention.
Figure 34C:
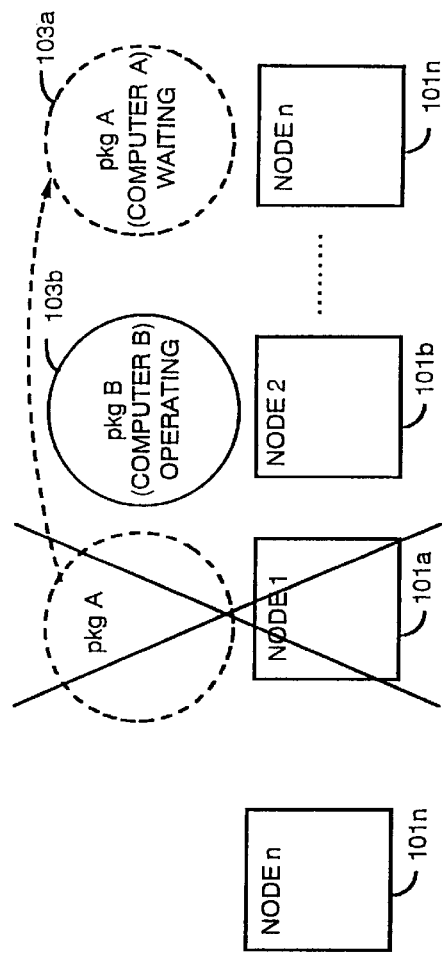
Figure 34B:
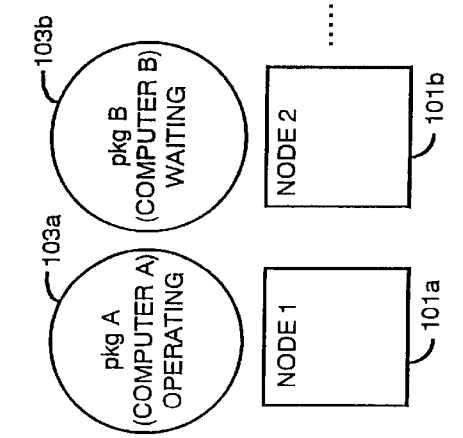
Figure 34D:
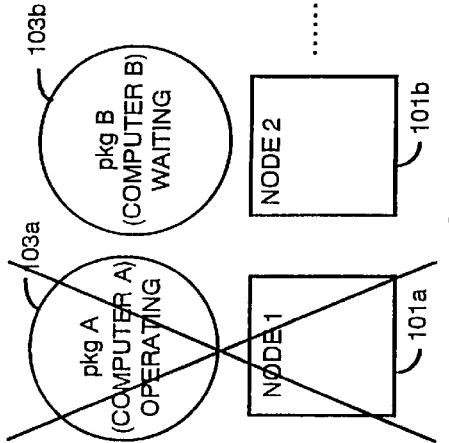

An eleventh embodiment of the present invention is explained using FIGS. 31 34D. According to the eleventh embodiment, a manager is used instead of the manager 105 of FIG. 1, and it has manages respective packages by modes.

FIG. 31 shows a manager according to the eleventh embodiment. In FIG. 31, a package managing device 3101 receives a resource state change notice (D2302) from the notice processing device 2301, refers and updates a managing table 3102, and transmits a package controlling demand (D3102) to a package controlling device 3103.

The package controlling device 3103 receives the package controlling demand (D3102) from the package managing device 3101, and transmits a package controlling demand (D3103) to a cluster daemon 102 or to a package 103.

FIGS. 32A and 32B illustrate an example of contents stored in the managing table 3102. The managing table 3102 comprises a first table, which stores packages names, mode states, executing computers, and group names, as illustrated in FIG. 32A, and a second table, which stores operation state of the respective computers such as "operating" and "stop", as illustrated in FIG. 32B. The information regarding the mode state includes "operating", "stop", and "waiting". The information regarding the executing computers indicates which computer 101 is executing the package 103 specified by a package name. The group name indicates types of the packages. The packages which has the same group name may take over the process of another package with the same group name.

Figure 33:
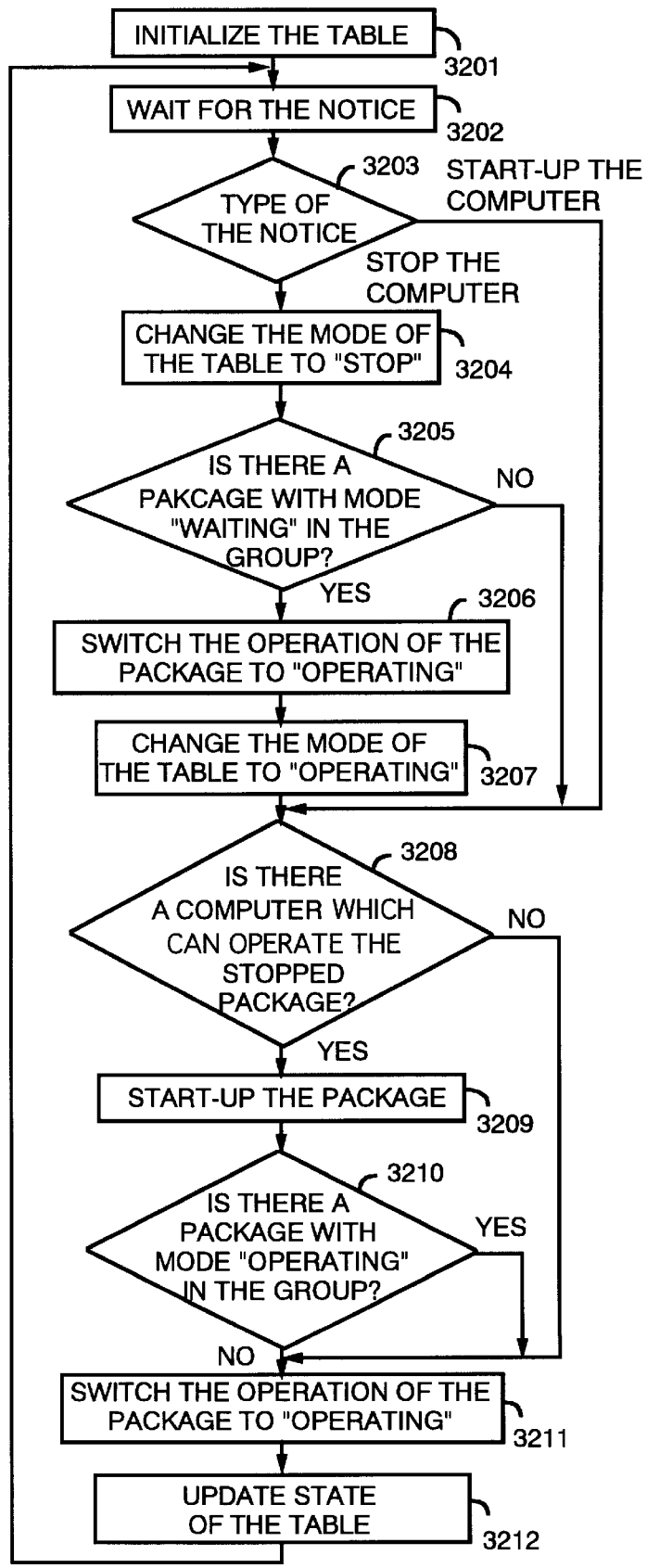
FIG. 33 is a flow chart explaining the processes performed by manager according to the eleventh embodiment of the present invention.

FIG. 33 is a flow chart explaining the process performed by the manager 105 of FIG. 31. The operation of the manager 105 is explained using FIG. 33. In a step 3201, the package managing device 3101 initializes the managing table 3102.

In a step 3202, the notice processing device 2301 waits for a resource state change notice (D2301) from the cluster daemon 102, and transmits the resource state change notice (D2302) to the package managing device 3101, when the resource state change notice (D2301) is received.

In a step 3203, the package managing device 3101 determines the type of the resource state change notice (D2302). If the resource state change notice (D2302) is "start-up the computer 101", the process goes to a step 3208.

If the resource state change notice (D2302) is "stop the computer 101", the package managing device 3101 updates the managing table 3102, and changes the modes of all packages which have been operating or waiting on the stopped computer 101 to "stop", in the step 3204.

In a step 3205, the package managing device 3101 examines if there is any package 103 with the mode "waiting" in the same group in which the stopped package belongs to. If there is no package 103 with the mode "waiting" in the step 3205, the process jumps to a step 3208.

If there is an package 103 with the mode "waiting", the package managing device 3101 transmits a package controlling demand (D3102), instructing the "operating", to the package controlling device 3103 in a step 3206. The package controlling device 3103 transmits a package controlling demand (D3103) to the package 103 found at the step 3205 via the cluster daemon 102, so that the waiting package 103 starts to operate.

In a step 3207, the package controlling device 3101 updates the managing table 3102. In other words, the package controlling device 3101 changes the mode of the managing table 3102 corresponding to the package 103, which is instructed to operate in the step 3206, to "operating". If the step 3210 is completed, the process returns to the step 3202.

In a step 3208, the package managing device 3101 refers to the managing table 3102, and determines whether there is a computer 101 which can execute the package with the mode "stop". If the package managing device 3101 determines that there is a computer 101 which can execute the package with the mode "stop", the process goes to a following step 3209, and when not, the process jumps to a step 3212.

In the step 3209, the package managing device 3101 transmits a package controlling demand (D3102) instructing the "waiting" to the package controlling device 3103. Then, the package controlling device 3103 transmits the package controlling demand (D3103) to the cluster daemon 102 of the computer 101 found at the step 3208. If the package controlling demand (D3103) instructing the "waiting" is received, the cluster daemon 102 starts-up the target package 103 in the waiting state.

In a step 3210, the package managing device 3101 refers to the managing table 3102, examines whether there is a package with the mode "operating" in the same group in which the package started at the step 3209 belongs. If the package with the mode "operating" is found, the process jumps to a step 3212. When not, the process goes to a following step 3211.

In the step 3211, the package managing device 3101 transmits a package controlling demand (D3102) instructing the "operating" to the package controlling device 3103. Then, the package controlling device 3103 transmits the package controlling demand (D3103) to the cluster daemon 102 which is managing the package 103 started-up at the step 3209. If the package controlling demand (D3103) instructing the "operating" is received, the cluster daemon 102 releases the waiting state of the target package 103, so that the package 103 starts to operate.

In the step 3212, the package controlling device 3101 updates the managing table 3102. In other words, the managing table 3102 is changed to the state of the package 103, which has been modified in the steps 3209 and 3211. If the step 3212 is completed, the process returns to the step 3202.

FIG. 34 shows an example of the operation according to the eleventh embodiment of the present invention. In FIG. 34, the elements having the same numbers as those in FIG. 1 correspond to the same portions of FIG. 1.

In the beginning, as shown in FIG. 34A, assuming that a first computer A 101a is executing a first package A 103a, a second computer B 101b is executing a second package B 103b, and the package A 103a and the package B 103b belong to a same group.

If the computer A 101a stops due to a fault or failure in the manner illustrated in FIG. 34B, after the state illustrated in FIG. 34A, the manager 105 starts to operate as explained above, and the package B 103b, which has been waiting on the computer B 101b, is executed, that is, starts to operate, and takes over the operation of the package A 103a as shown in FIG. 34C. At this time, the package A 103a is switched to the package B 103b at high speed, since the package B 103b has been waiting. Therefore, the time required to start-up the package B 103b is reduced.

The same package 103 which had been stopped until now is started on a third computer C101n, and kept in the "waiting" state.

According to the eleventh embodiment, it possible to construct a dual system which is managed under modes such as operating/waiting in the cluster, and to switch the packages faster than just restarting the package from the beginning.

In addition, according to the eleventh embodiment, it is possible to shorten the degenerating operation time. In other words, in a conventional dual systems, if one of the computers stops due to failure, the entire system becomes single operation during the time the stopped computer is being recovered. If the other computer stops due to a fault or failure during this time period, the entire system goes down. However, in the eleventh embodiment of the present application, even if the operation of one of the packages stops, since the stopped package is started-up on another computer, the system is operated in the single operation mode only during the period the package is being re-started. Therefore, it is possible to prevent the above entire system down time caused by multiple failures, and to provide greater reliability of the systems.

Embodiment 12

A twelfth embodiment is explained using FIGS. 35A–37D. A manager 105 according to the twelfth embodiment is basically the same as that in FIG. 31, however, the following processes are different in the respective devices.

First of all, a managing table 3102 is explained. FIGS. 35A and 35B illustrate examples of contents stored in the managing table 3102. The managing table according to the twelfth embodiment comprises a first table, which stores package names and computers names executing the packages, as illustrated in FIG. 35A, and a second table, which stores operation states of the respective computers such as "operating" and "stop" as illustrated in FIG. 35B.

Figure 36:
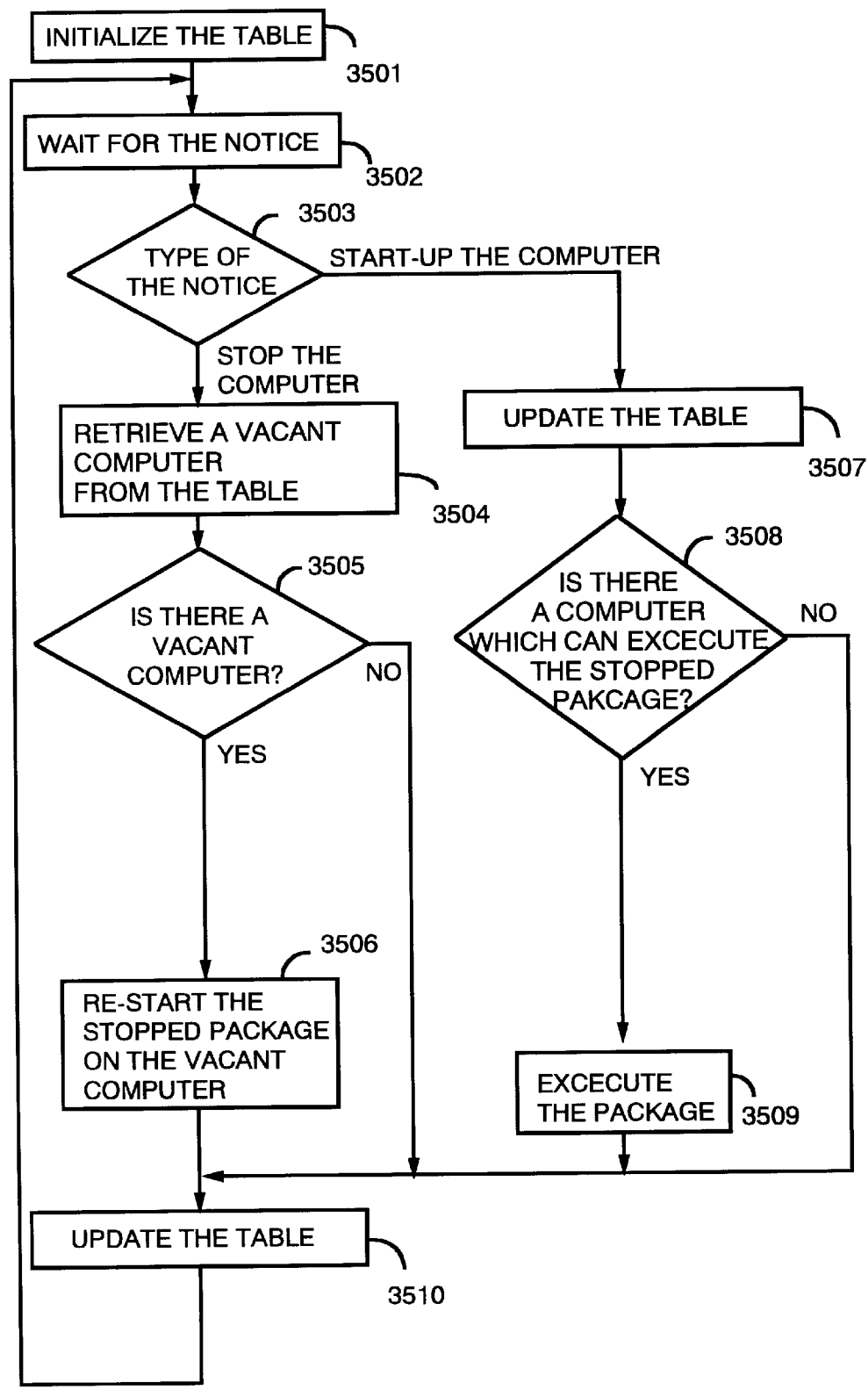
FIG. 36 is a flow chart explaining processes performed by a manager according to the twelfth embodiment of the present invention.

The operation of the manager 105 is explained using FIG. 36. FIG. 36 is a flow chart explaining processes performed by the manager of FIG. 31. In a step 3501, the package managing device 3101 initialize the managing table 3102.

In a step 3502, the notice processing device 2301 waits for a resource state change notice (D2301) from the cluster daemon 102, and transmits the resource state change notice (D2302) to the package managing device 3101 when the resource state change notice (D2301) is received.

In a step 3503, the package managing device 3101 determines the type of the received resource state notice (D2302). If the resource state change notice (D2302) is "start-up the computer 101", the process goes to a step 3507. If the resource state change notice (D2302) is "stop the computer 101", the process goes to a step 3504.

If the resource state change notice (D2302) is "stop the computer 101", the package managing device 3101 refers to the managing table 3102, and retrieves an vacant computer 101. If an vacant computer 101 is found, the process goes to the a step 3506. If not, the process jumps to the a step 3510.

In the step 3506, the package managing device 3101 transmits the package controlling demand (D3102) instructing the "operating7 to the package controlling device 3103. The package controlling device 3103 transmits the package controlling demand (D3103) instructing the "operating" to the cluster daemon 102 of the computer 101 found in the step 3505. The cluster daemon receives this package controlling demand (D3103) and starts-up the package 103 which is the same package as that executed on the stopped computer 101, and starts operating the package 103.

In the step 3510, the package managing device 3101 updates the contents of the managing table 3102 to a state of the current computer, and the process returns to the step 3502.

If the notice is determined as "start-up the computer 101" in the step 3503, the package managing device 3101 updates the contents of the managing table 3102 to the state of the current computer 101, that is, the item corresponding to the computer 101 in the managing table 3102 is changed to "operating", in a step 3507.

In a step 3508, the package managing device 3101 examines if there is any stopped package 103, for example, by referring to the first table in FIG. 32A of the eleventh embodiment. If there is an stopped package 103, the package managing device 3101 examines if there is any computer 101 which can operate the stopped package. If there is no stopped package 103, or if there is no computer 101 which can operate the stopped package 103, the process jumps to the step 3510. If there is a stopped package and there is a computer 101 which can operate the stopped package, the process goes to a following step 3509.

In the step 3509, the package managing device 3101 transmits a package controlling demand (D3102), instructing the "operating", to the package controlling device 3103. Then, the package controlling device 3103 transmits the package controlling demand (D3103), instructing the "operating", to the cluster daemon 102 of the computer 101 found at the step 3508, so that the package 103 found at the step 3508 is started to operate on the computer 101 also found at the step 3508. When the step 3509 is completed, the process goes to the step 3510.

FIGS. 37A–37D explains an example of the operation according to the twelfth embodiment. In FIGS. 37A–37D, the elements having the same numbers as those in FIG. 1 correspond to the same portions of FIG. 1.

In the beginning, as shown in FIG. 37A, assuming that a first computer A 101a is executing a first package A 103a, and a second computer B 101b is executing a second package B 101b. And assuming that the package A 103a and the package B 103b are different kinds of packages 103.

If the computer A 101a stops due to a fault or failure in the manner illustrated in FIG. 37B, after the state illustrated in FIG. 34A, the manager 105 starts operating in the manner explained above, then the package A 103a starts-up to operate on the computer A101n having being vacant until now.

As shown in FIG. 37C, if the computer A 101a starts-up, the computer A 101a becomes a vacant computer, that is, a back-up computer A 101a.

As illustrated in FIG. 37D, if the computer B 101b breaks down and stops operating, the manager 105 starts to operate in the above explained manner, and the package B 103b starts to operate on the computer A 101a, which has been a vacant computer.

As explained above, according to the twelfth embodiment, it possible to construct a multiple system for transferring the package according to a state of the cluster system.

In addition, in the twelfth embodiment, even when the stopped computer A 101a is recovered in the manner illustrated in FIG. 37C, the recovered computer A 101a backs up the computer N 101n, which has backed up the computer A 101a, and continues to perform the package A 103a. The recovered computer A 101a backs up other computers at this time. Therefore, comparing with a system where the recovered computer A 101a operates the package A 101a and the computer N 101n becomes a back-up computer, according to the twelfth embodiment, the number for switching the computer can be reduced and the total processing performance can be improved for the system. This means that the processes can be performed in a high speed.

Embodiment 13

A thirteenth embodiment is explained using FIGS. 38A and 38B and FIGS. 39A and 39B. A manager according to the thirteenth embodiment is basically the same as that illustrated in FIG. 31, and the process is also basically the same as that in the twelfth embodiment explained using FIG. 36. However, the processes of the thirteenth embodiment are different from those of the twelfth embodiment in that a computer 101 for operating the package 103 is searched, that is, the processes of the step 3504 and step 3508 in FIG. 36 are different.

First of all, a managing table 3102 according to the thirteenth embodiment is explained. Examples of the memory contents stored in the managing table 3102 are illustrated in FIGS. 38A and 38B. The managing table 3102 comprises a first table, which stores the package names and the executing computer for executing the packages, and group names of the packages as illustrated in FIG. 38A, and a second table, which stores the operation state of the respective computers such as "operating7 and "stop" as illustrated in FIG. 38B.

The operation of the manager 105 according to the thirteenth embodiment is explained. The operation of the manager 105 according to the thirteenth embodiment is basically the same as that in the twelfth embodiment. Therefore, only the different processes, that is, the step 3504 and the step 3508 are explained using FIG. 36.

In the step 3504, the package managing device 3101 refers to the managing table 3102, and retrieves a computer 101 which is not performing the same group of package 103 which has been operated on the stopped computer, instead of an vacant computer. When a computer which is not performing the same group of package is found, the process goes to the following step 3506, and if not, the process jumps to the step 3510.

In the step 3508 in the thirteenth embodiment, the package managing device 3101 examines whether there is any stopped package nor not by referring to the first table in FIG. 38A. If there is any stopped package, the package managing device 3101 examines whether there is a computer 101 which can execute the stopped package 103. Where, the package managing device 3101 retrieves a computer 101 which is not operating the same group of package as the stopped package 103, but not an vacant computer 101. If there is no package 103 being stopped, or if there is no computer 101 which can operate the stopped package 103, the process jumps to the step 3510. If there is a package 103 being stopped, and there is a computer 101 which can operate the stopped package 103, the process goes to the following step 3509.

Figure 39B:
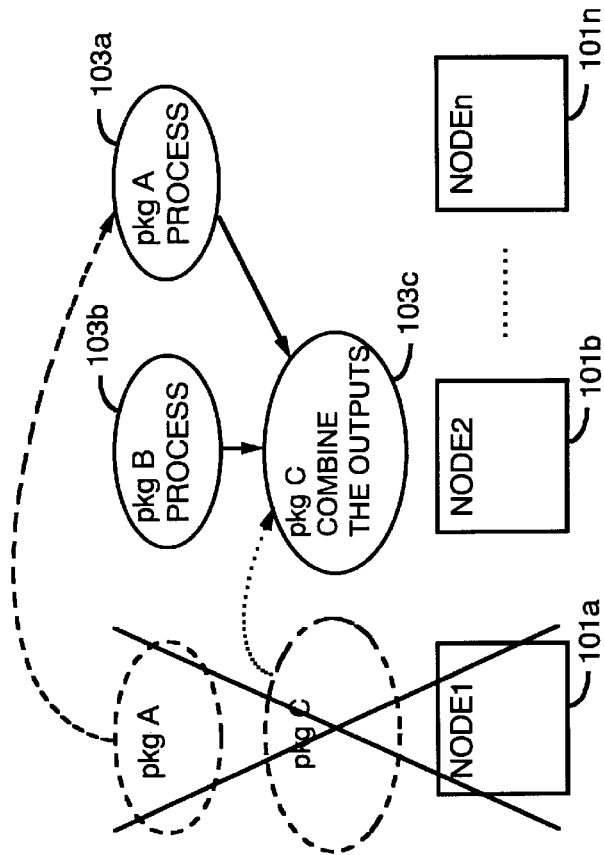
FIGS. 39A and 39B show an example of system operations according to the thirteenth embodiment of the present invention.
Figure 39A:
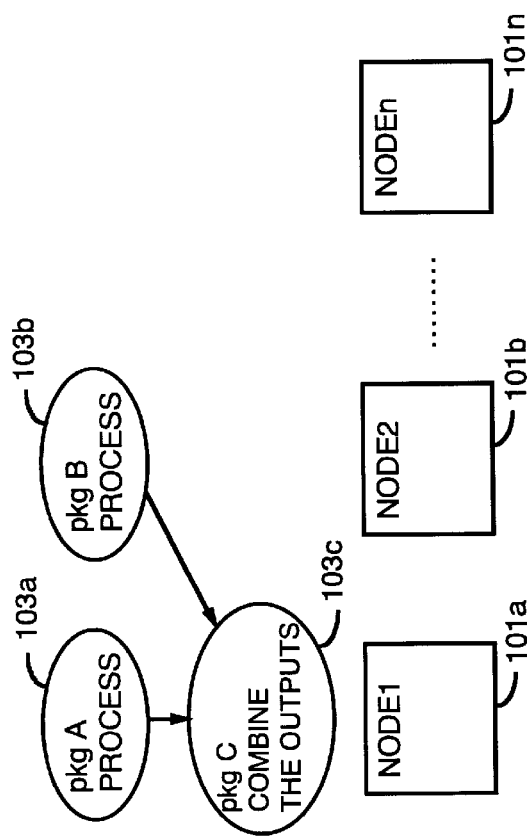

FIGS. 39A and 39B explains an example of the operation according to the thirteenth embodiment. In FIGS. 39A and 39B, the elements having the same numbers as those in FIG. 1 correspond to the same portions of FIG. 1.

In the beginning, assuming that the computer A 101a is operating the package A 103a, and the computer B 101b is operating the package B 103b, as illustrated in FIG. 39A. The package A 103a and the package B 103b are assigned to a same group, and perform one process distributively, that is, perform one process in parallel. The package C 103c performed on the computer A 101a, combines the two outputs from the package A 103a and the package B 103b.

If the computer 101a stops due to a fault or failure in a state illustrated in FIG. 39B, after the state illustrated in FIG. 39A, the manager 105 starts to operate, then the package A 103a is started-up and operates on the computer N 101n, which is not operating the package B 103b of the same group as the package A 103a, but not on the computer B 101b which is operating the package B 103b of the same group as the package A 103a.

As explained above, according to the thirteenth embodiment, it possible to construct a load sharing system on the cluster system, and to distribute the load. In other words, it is possible to maintain a high speed processing in parallel even after the switching has taken place, by not starting-up a plurality of same group of packages on the same computer 101.

Embodiment 14

A fourteenth embodiment is explained using FIGS. 40A–42F. A manager 105 according to the fourteenth embodiment is basically the same as that in FIG. 31 of the eleventh embodiment. However, the processes of the fourteenth embodiment is different from those of the eleventh embodiment in the manner explained below.

First of all, a managing table 3102 is explained. FIGS. 40A and 40B show an example of contents stored in the managing table 3102. The managing table 3102 comprises a first table, which stores package names, executing computers for executing the packages, an d priority orders of the packages, as illustrated in FIG. 40A, and a second table, which stores operation states of the respective computers such as "operating" and "stop" as illustrated in FIG. 40B.

Figure 41:
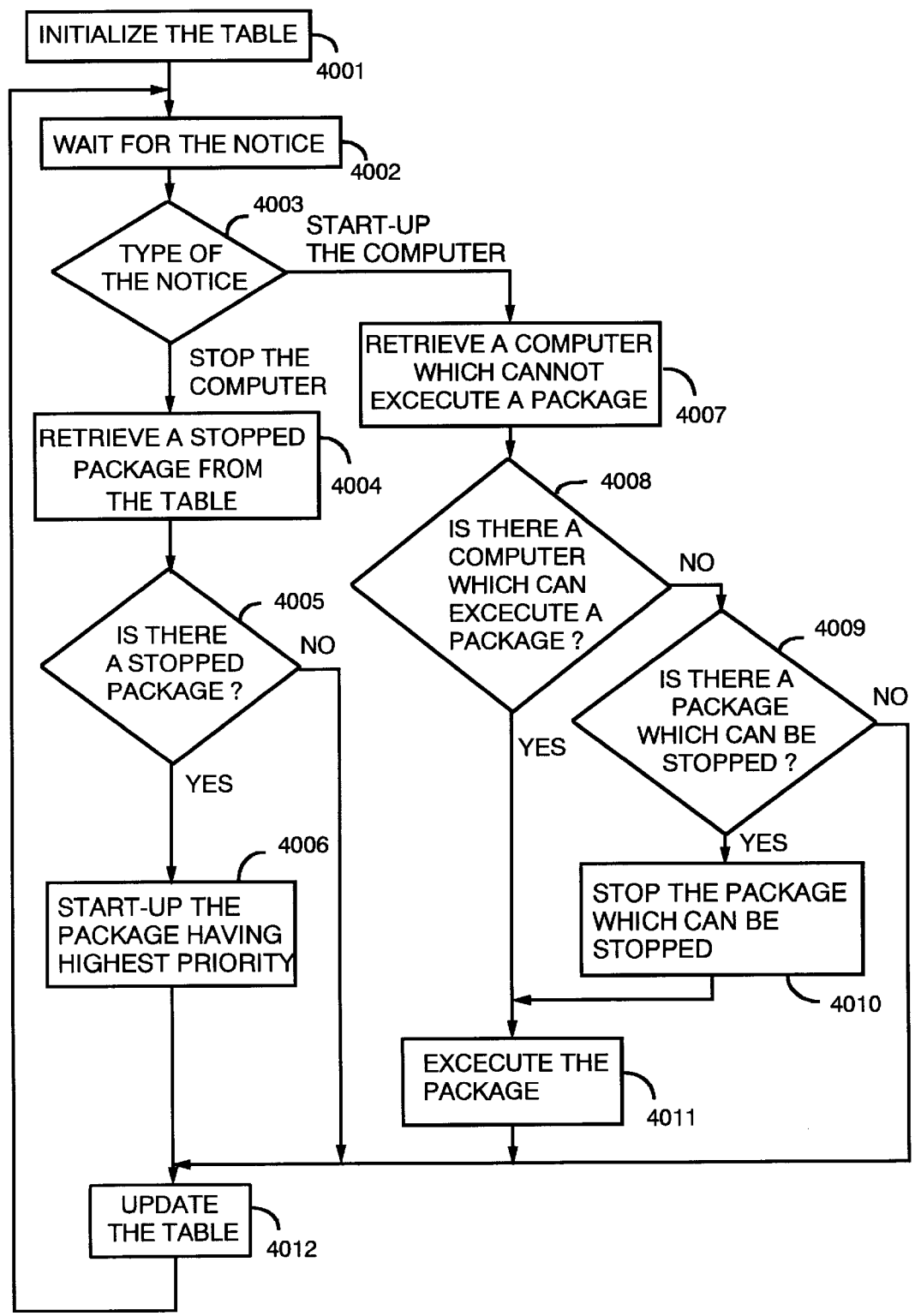
FIG. 41 is a flow chart explaining the processes performed by a manager according to the fourteenth embodiment of the present invention.

The operation of the manager 105 according to the fourteenth embodiment is explained using FIG. 41. FIG. 41 is a flow chart explaining the process preformed by the manager in FIG. 31. In a step 4001, a package managing device 3101 initializes the managing table 3102.

In a step 4002, a notice processing device 2301 waits for a resource state change notice (D2301) from the cluster daemon 102, and transmits the resource state change notice (D2302) to the package managing device 3101, when the resource state change notice (D2301) is received.

In a step 4003, the package managing device 3101 determines the type of the resource state change notice (D2302). If the resource state change notice (D2302) is "start-up the computer 101", the process jumps to a step 4007. If the resource state change notice (D2302) is "stop the computer 101", the process goes to a step 4004.

If the resource state change notice (D2302) is determined as "start-up the computer 101", the package managing device 3101 refers to the managing table 3102, and retrieves a stopped package 103, in a step 4004. There are some exemplary methods for retrieving the stopped package 103. In one method, the executing computer assigned in the first table of FIG. 40A retrieves a package 103 representing "stop" in the second table of FIG. 40B. In the other method, the executing computer assigned in the first table of FIG. 40A retrieves a package 103 which is not assigned to any computers in the items of the executing computer, although its package name and priority order are assigned in the first table of FIG. 40A.

In a step 4005, the package managing device 3101 determines whether there is a stopped package retrieved in the step 4004. If there is a stopped package retrieved, the process goes to a following step 4006, and if not, the process jumps to a step 4012.

In the step 4006, the package managing device 3101 retrieves the package with highest priority from all of the stopped packages 103, and transmits a package controlling demand (D3102), instructing the- "operating" of the package with the highest priority, to the package controlling device 3103. The package controlling device 3103 transmits the package controlling demand (D3103), instructing the "operating", to cluster daemon cluster 102 of the computer 101 which has been newly started-up. Then, the package 103 with the highest priority of all stopped packages is executed on the computer 101 which has been newly started-up.

If the step 4006 is completed, the process goes to the following step 4012.

In a step 4012, the package managing device 3101 updates the contents of the managing table 3102 according to the state of the current computer and package, and the process returns to the step 4002.

If the resource state change notice (D2302) is "start-up the computer 101" in the step 4003, the package managing device 3101 refers to the managing table 3102, and retrieves a computer 101 which can execute the package which has been operating on the stopped computer 101, in a step 4007. If there is a computer 101 which can execute the package, the process goes to the following step 4011. If not, the process jumps to a step 4009.

The package controlling device 3101 determines whether the package 103 is executable or not by comparing the resource required for the operation of the package and the remaining resources of the target computer 101. If there are enough resources left in the computer 101 for execution of the package 103, the package controlling device 3101 determines that the package 103 can be executed, and if not, the package controlling device 3101 determines that the package 103 can not be executed.

If there is no package 103 that is executable, the package managing device 3101 refers to the managing table 3102, and examines whether there is a package 103, which can be stopped and has a lower priority than the stopped package 103, in a step 4009. If there is a stoppable package, the process goes to a step 4010, and if not, the process jumps to the step 4012, which is explained above.

If there is a stoppable package, the package managing device 3101 transmits a package controlling demand (D3102), instructing the "stop", to the package controlling device 3103, in the step 4010. The package controlling device 3103 transmits the package controlling demand (D3103), instructing the "stop", to the cluster daemon 102. In receiving this package controlling demand (D3103), the cluster daemon 102 stops the package 103 retrieved at the step 4009, and releases the resources, which have been used in the package.

If the step 4010 is completed, the process goes to a step 4011.

In a step 4011, the package managing device 3101 transmits the package controlling demand (D3102), instructing the "operating" of the stopped package 103, to the package controlling device 3103. The package controlling device 3103 transmits the package controlling demand (D3103), instructing the "operating", to the cluster daemon 102 of the computer 101 which has been found at the step 4008, or of the computer 101 which has stopped the package 103 in the step 4010. Receiving the package controlling demand (D3103), the cluster daemon 102 starts-up the stopped package 103, and starts its operation.

If the step 4011 is completed, the process returns to the 4012, which has been explained above.

FIGS. 42A–42F explain an example of the operation according to the fourteenth embodiment. In FIGS. 42A–42F, the elements having the same numbers as those in FIG. 1 are the same portions as those in FIG. 1.

In the beginning, assuming that the respective computers A 101a–N 101n operate packages A 103a–N 103n, respectively, as illustrated in FIG. 42A, and the respective packages A 103a–N 103n are different kinds of types. And assuming that the highest priority is given to the package A 103a, the second highest priority is given to the package B 103b, and the lowest priority is given to the package N 103n.

If the computer A 101a stops due to a fault or failure in the manner illustrated in FIG. 42B, after the state illustrated in FIG. 42A, the manager 105 starts operating as explained above, and stops the package N 103n, whose priority order is lower than that of the package A 103a, on the computer N 101n, and starts and operates the stopped package A 103a on the computer N 101n.

When the computer A 101a recovers and starts-up as illustrated in FIG. 42C, the computer A 101a operates the stopped package N 101n.

If the computer B 101b breaks down and stops as illustrated in FIG. 42D, the manager 105 starts operating in the manner explained above, and stops the package N 103n with lower priority, and starts and operates the package B 103b with higher priority on the computer A 101a.

If the computer N 101n also breaks down as illustrated in FIG. 42E, the package B 103b stops operating on the computer A 101a, since the package A 103a has higher priority than the package B 103b. Instead, the package A 103a is started-up and operated on the computer A101a.

If the computer B 101b recovers, as illustrated in FIG. 42F, the package B 103b with the highest priority of all remaining stopped packages starts-up and operates on the computer B 101b.

According to the fourteenth embodiment, it possible to construct a multiplex degenerated system on the cluster, and to perform the most important process by giving it a highest priority, even in case of multiple failures.

Embodiment 15

A fifteenth embodiment is explained using FIGS. 43A–46D. A manager according to a fifteenth embodiment is the same as the manager illustrated in FIG. 31, however, the processes performed in the respective processes are different in the manner explained below.

First of all, a managing table 3102 is explained. FIG. 43A and 43B show contents stored in the managing table 3102. The managing table 3102 according to the fifteenth embodiment comprises a first table, which stores packages names, executing computer operating those packages, package priority orders, and load required for executing those packages, as illustrated in FIG. 43A, and a second table which stores operation states of the respective computers, such as "operating", "stop", and maximum allowable load, illustrated in FIG. 43B. The loads are, for example, resources, such as memory and CPU time.

Figure 44:
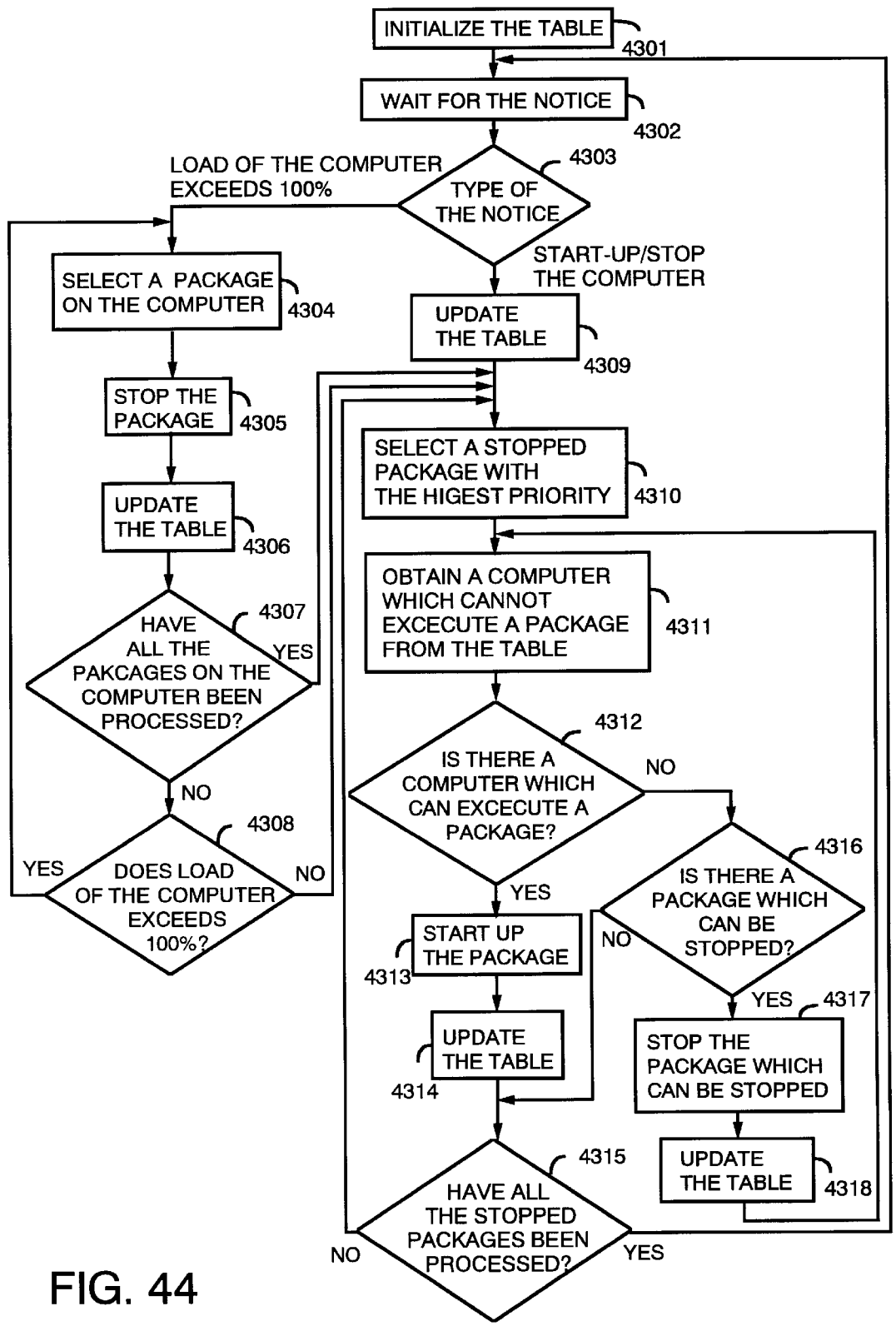
FIG. 44 is a flow chart explaining processes performed by a manager according to the fifteenth embodiment of the present invention.

The operation of the manager 105 is explained using FIG. 44. FIG. 44 is a flow chart explaining the processes performed by the manager 105 of FIG. 31. In a step 4301, the package managing device 3101 initializes the managing table 3102.

In a step 4302, the notice processing device 2301 waits for a resource state change notice (D2301) from the cluster daemon 102, and transmits the resource state change notice (D2302) to a package managing device 3101.

In a step 4303, the package managing device 3103 determines the type of the resource state change notice (D2302). If the resource state change notice (D2302) is "start-up the computer 101" or "stop the computer 101", the process goes to a step 4309. If the source state change notice (D2302) is a notice informing that the load of computer 101 is more than 100%, the process goes to a following step 4304.

In the step 4304, the package controlling device 3101 selects a package 103 (referred to as a selected package), which has been operating on an overloaded computer 101 whose load has become more than 100%, and has a lowest priority out of the packages 103 which are not currently processed. Then, the package controlling device 3101 performs succeeding steps 4305–4308 for the selected package 103.

In the step 4305, the selected package is stopped operating. That is, the package managing device 3101 transmits a package controlling demand (D3102), instructing the "stop" of the selected package, to the package controlling device 3103. The package controlling device 3103 transmits the package controlling demand (D3103) to the corresponding cluster daemon 102 which manages the selected package, so that the cluster daemon 102 stops the selected package when the cluster daemon 102 receives this package controlling demand (D3103). By stopping the operation of the selected package, the resource of the overloaded computer is released, and the load of the computer is reduced.

In a step 4306, the package managing device 3101 updates the item which corresponds to the selected package in the managing table 2303, that is, the item is changed to "stop".

In a step 4307, the package controlling device 3101 judges whether the above steps 4304–4306 are performed for all packages operating on the overloaded computer. If all packages are processed, the process jumps to a step 4310, and if not, the process goes to a following step 4308.

In the step 4308, the package controlling device 3101 examines if the load of the overloaded computer is more than 100%, by referring to the managing table 2303, and by comparing the sum of the package load operating and waiting on the overloaded computer, and the maximum allowable load of the overloaded computer. If it is equal to or more than 100%, the process returns to the step 4304. If it is less than 100%, the process goes to the step 4310.

If it is judged that the type of the notice is "start-up the computer" or "stop the computer 101" in the step 4303, the package managing device 3101 updates the corresponding item of the managing table 2303 to "operating" or "stop", according to the contents of the notice, in a step 4309.

In the step 4310, the package managing device 3101 refers to the managing table 3102, and retrieves the package with the highest priority of the stopped package 103 (referred to as priority package).

In a step 4311, the package managing device 3101 refers to the managing table 2303, and selects a computer 101 which can execute the priority package based on a load required for the execution of the priority package, a maximum allowable load of the respective computers 101, and a load of the packages being operating and waiting in the respective computers 101. If there is no computer which can execute the priority package, the result tells that there is no available computer.

In a step 4312, the package controlling device 3101 determines whether the computer 101 is available or not in the step 4311. If the computer 101 is available, the process goes to a following step 4313, and if not, the process jumps to a step 4316.

In the step 4313, the priority package is started-up on the computer 101 which has been selected in the step 4311. In other words, the package managing device 3101 transmits a package controlling demand (D3102), instructing the "operating" of the priority package, to the package controlling device 3103. Then, the package controlling device 3103 transmits a package controlling demand (D3103), instructing the "operating", to the cluster daemon 102 of the computer 101 which has been selected in the step 4311, so that the corresponding computer 101 operates the package 103 with the highest priority of all stopped packages.

In a step 4314, the package managing device 3101 updates the managing table 2303, that is, the item of the corresponding to the priority package of the executing computer in the managing table 2303.

In a step 4315, the package managing device 3101 determines whether all the processes of the steps 4310–4318 have been performed on all the stopped package. If all the processes have been performed on all stopped packages, the process returns to the step 4302, and waits until a new resource state change notice (D2301) arrives. If not, the process returns to the step 4310.

If it is judged that there is- no computer 101 which can execute the priority package in the step 4312, the package managing device 3101 refers to the managing table 3102, and examines if there is a package 103 which has lower priority than the stopped package 103 and can be stopped, in the step 4316. If there is a package 103 which can be stopped, the process goes to the step 4317, and if there is not, the process goes to the step 4315.

If there is a package 103 which can be stopped, the package managing device 3101 transmits a package controlling demand (D3102), instructing the "stop", to the package controlling device 3103 in the step 4317. Then, the package controlling device 3101 transmits the package controlling demand (D3103), instructing the "stop", to the cluster daemon 102 which manages the package 103 found at the step 4316. Receiving this package controlling demand (D3103), the cluster daemon 102 stops the package 103 found at the step 4316, and releases the resources used by the package.

In a step 4318, the package managing controlling device 3101 updates the managing table 2303, and rewrites the item corresponding to the package which has been stopped in the step 4317 to a current state.

When the step 4318 is completed, the process returns to the step 4311, and the package controlling device 3101 releases new resources, or starts-up the priority package.

Figure 45C:
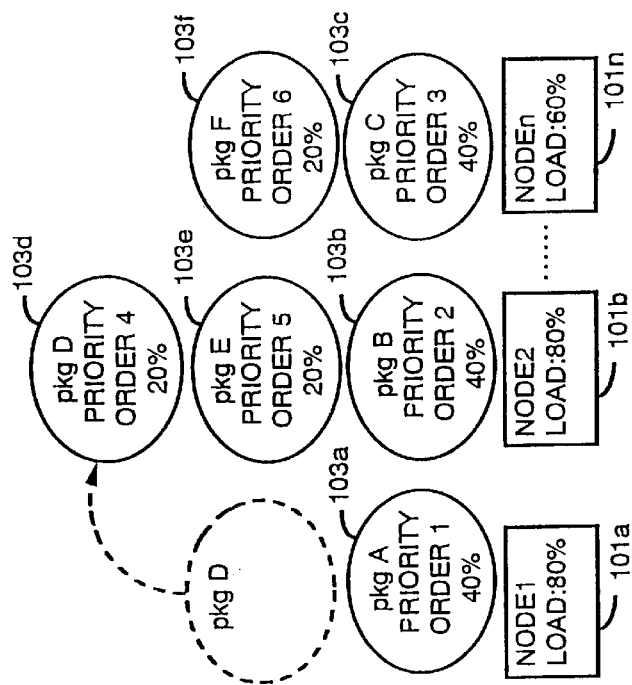
FIGS. 45A–45C show an example of system operations according to the fifteenth embodiment of the present invention.
Figure 45A:
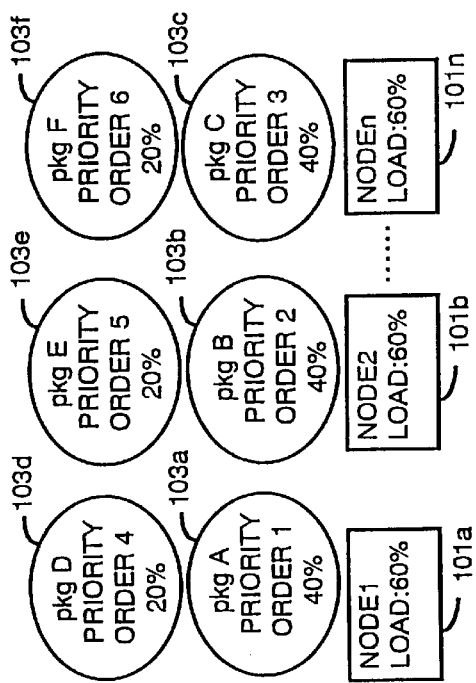
Figure 45B:
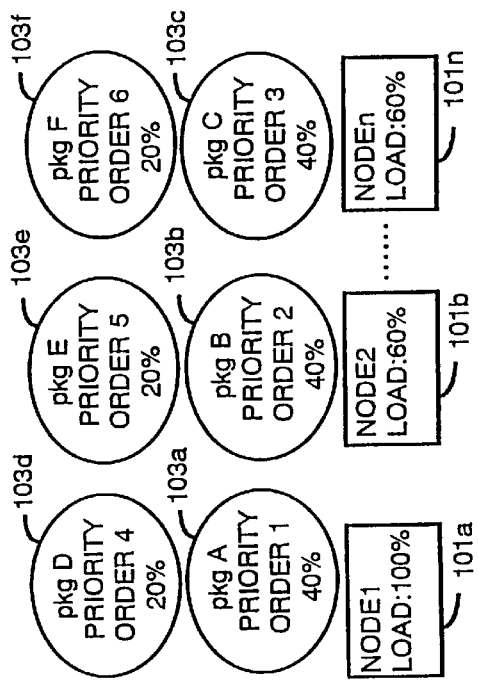

FIGS. 45A–45C explains an example of the operation according to the fifteenth embodiment. In FIGS. 45A–45C, the elements having the same numbers as those in FIG. 1 are the same portions as those in FIG. 1.

In the beginning, assuming that the respective computers A 101a–N 101n operate the packages A 103a–N 103n, as illustrated in FIG. 45A, and the respective packages A 103a–F 103f are different kinds of types. And also assuming that the highest priority is given to the package A 103a, the second highest priority is given to the package B 103b, and similar to the packages C 103c, D 103d, E 103e, and F 103f. It is also assumed that the package A 103a occupies 40% of the load of the computer A 101a, and the packages B 103b–F 103f occupy 40%, 40%, 20%, 20%, and 20% of the load of the executing computers, respectively.

If the load of the first computer A 101a becomes equal to or more than 100% as illustrated in FIG. 45B, after the state illustrated in FIG. 45A, the manager operates in the above-explained manner and stops the package D 103d with the lower priority on the computer A 101a, and the package D 103d is started-up on the computer B 101b with another room for the load instead, and starts operating, in the manner illustrated in FIG. 45C.

FIGS. 46A–46D explain another example of the operation according to the fifteenth embodiment. In FIGS. 46A–46D, the elements having the same numbers as those in FIGS. 45A–46C are the same portions as those in FIGS. 45A–46C.

Figure 46A:
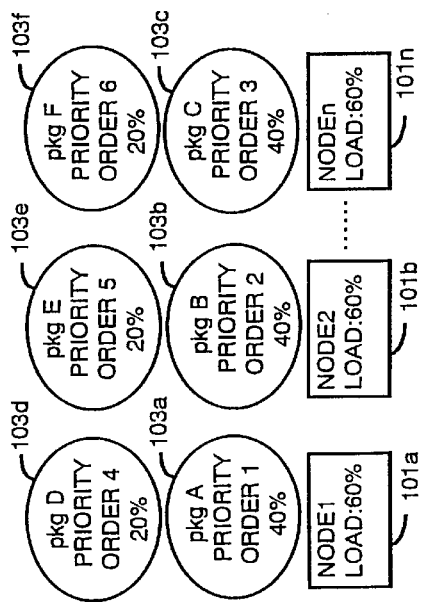
FIGS. 46A–46D show an example of system operations according to a sixteenth embodiment of the present invention.
Figure 46B:
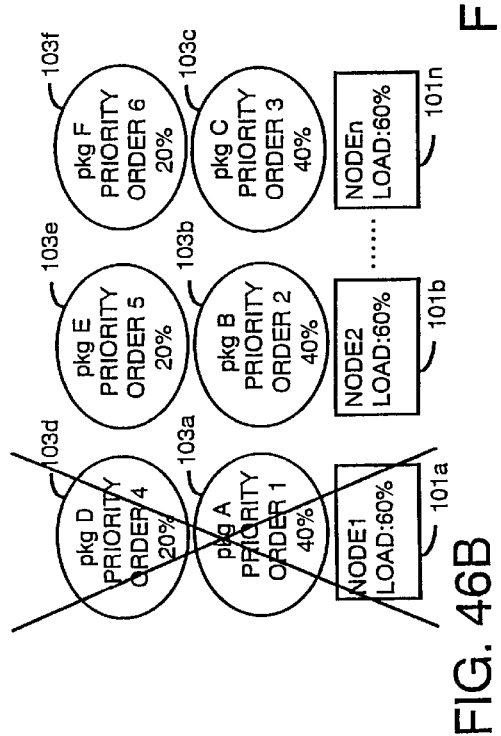
Figure 46C:
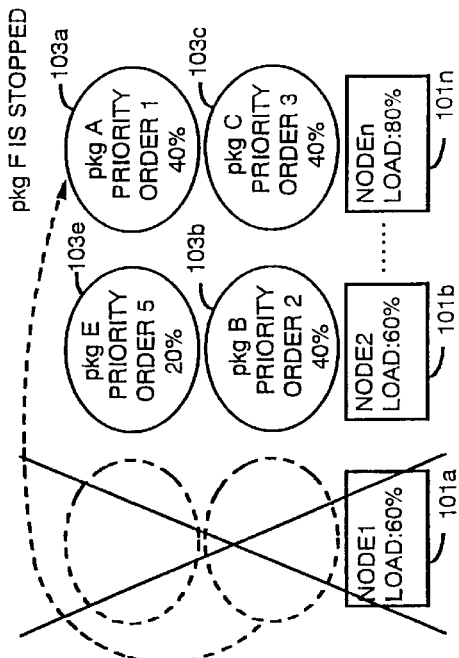

If the packages A 103a and D 103d on the computer A 101a stop due to a failure or fault as illustrated in FIG. 46B, after the state shown in FIG. 46A, the manager operates in the above explained manner and starts-up and executes the package A 103a with the highest priority of all stopped packages on the computer N 101n, as shown in FIG. 46C. The package F 103f with the lowest priority is stopped at this time.

Figure 46D:
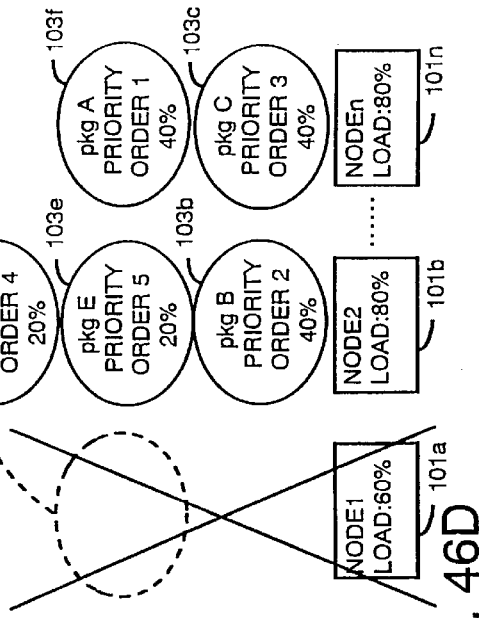

The package D 103d with the second higher priority on the stopped computer B 101b is started-up and executed on the computer B 101b having some room for the load, as shown in FIG. 46D. Since the priority of the package F 103f.is lower than other operating packages 103 and the computer 101 has no other room for the load, the package F 103f is not started-up.

As explained above, according to the fifteenth embodiment, it possible to construct an automatic load distribution system which distributes the load automatically and prevents the deterioration of the response for the important process.

Embodiment 16

Figures 47, 48:
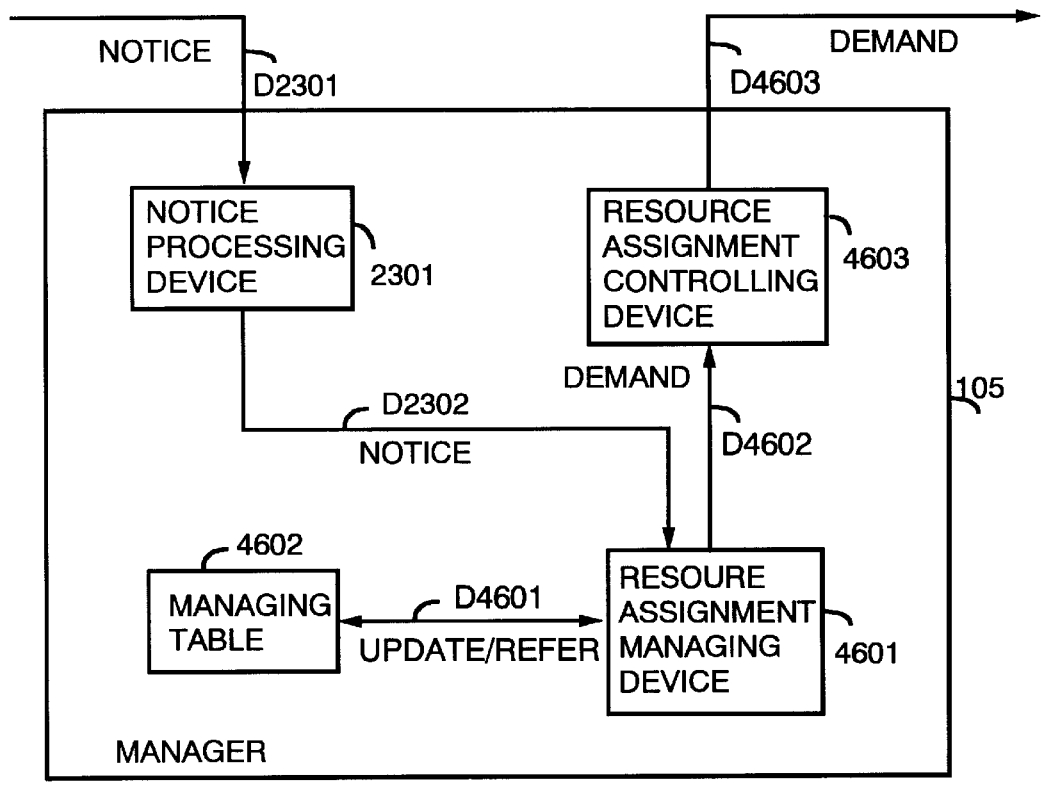
FIG. 47 shows a manager according to the sixteenth embodiment of the present invention.
FIG. 48 shows an example of contents of the managing table according to the sixteenth embodiment of the present invention.
Figure 49:
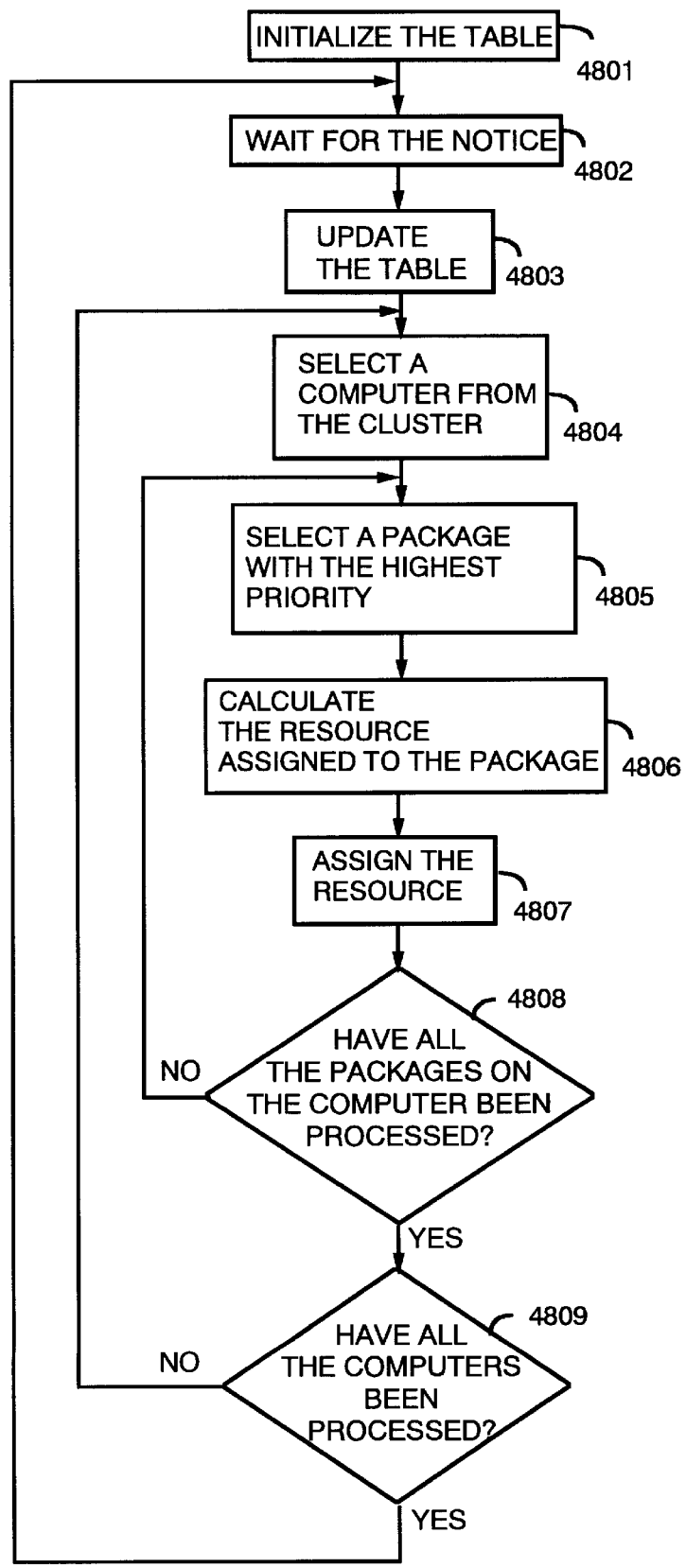
FIG. 49 is a flow chart explaining the processes performed by a manager according to the sixteenth embodiment of the present invention.
Figure 50:
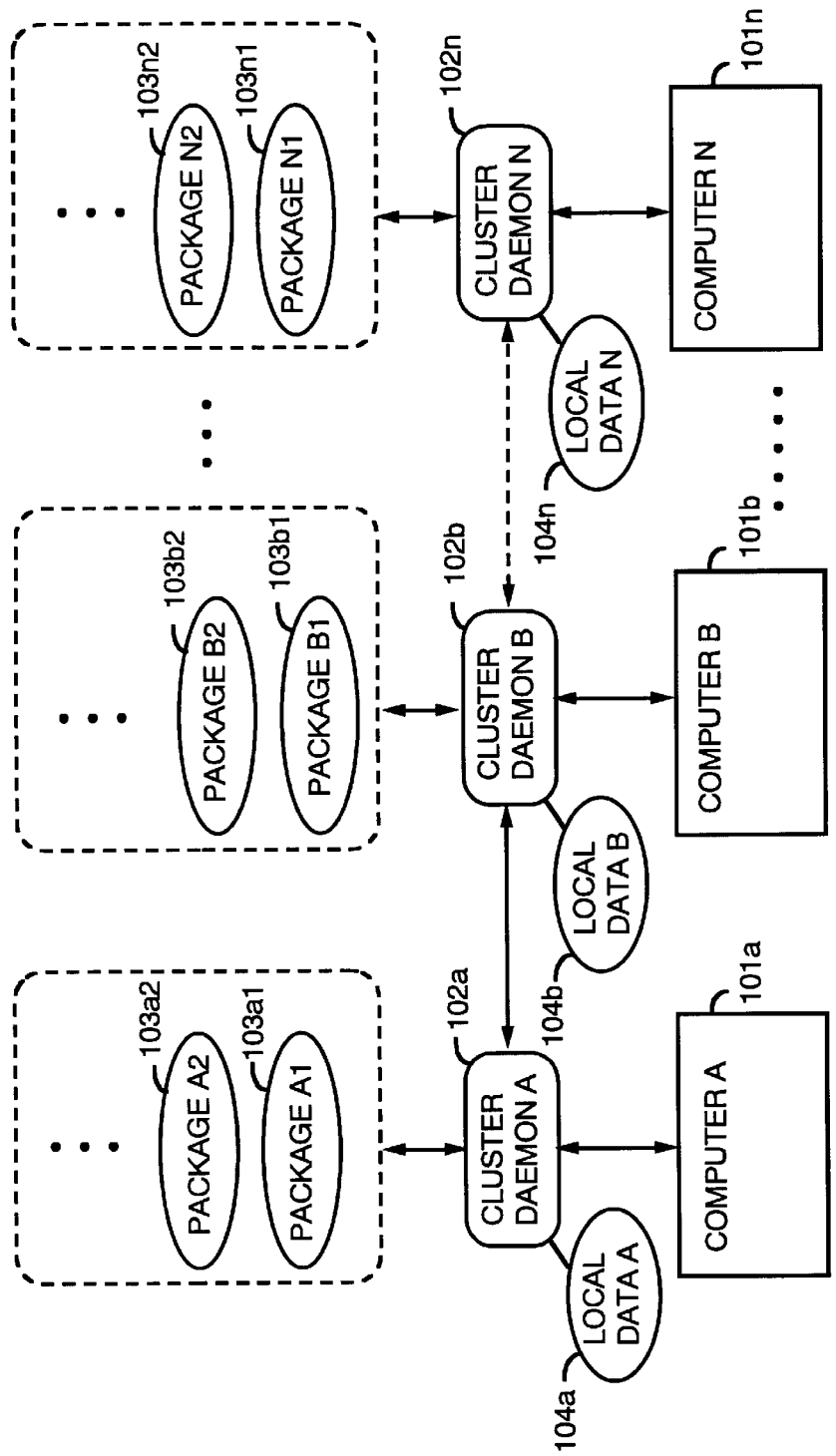
FIG. 50 shows a system configuration according to a prior art.
Figure 51:
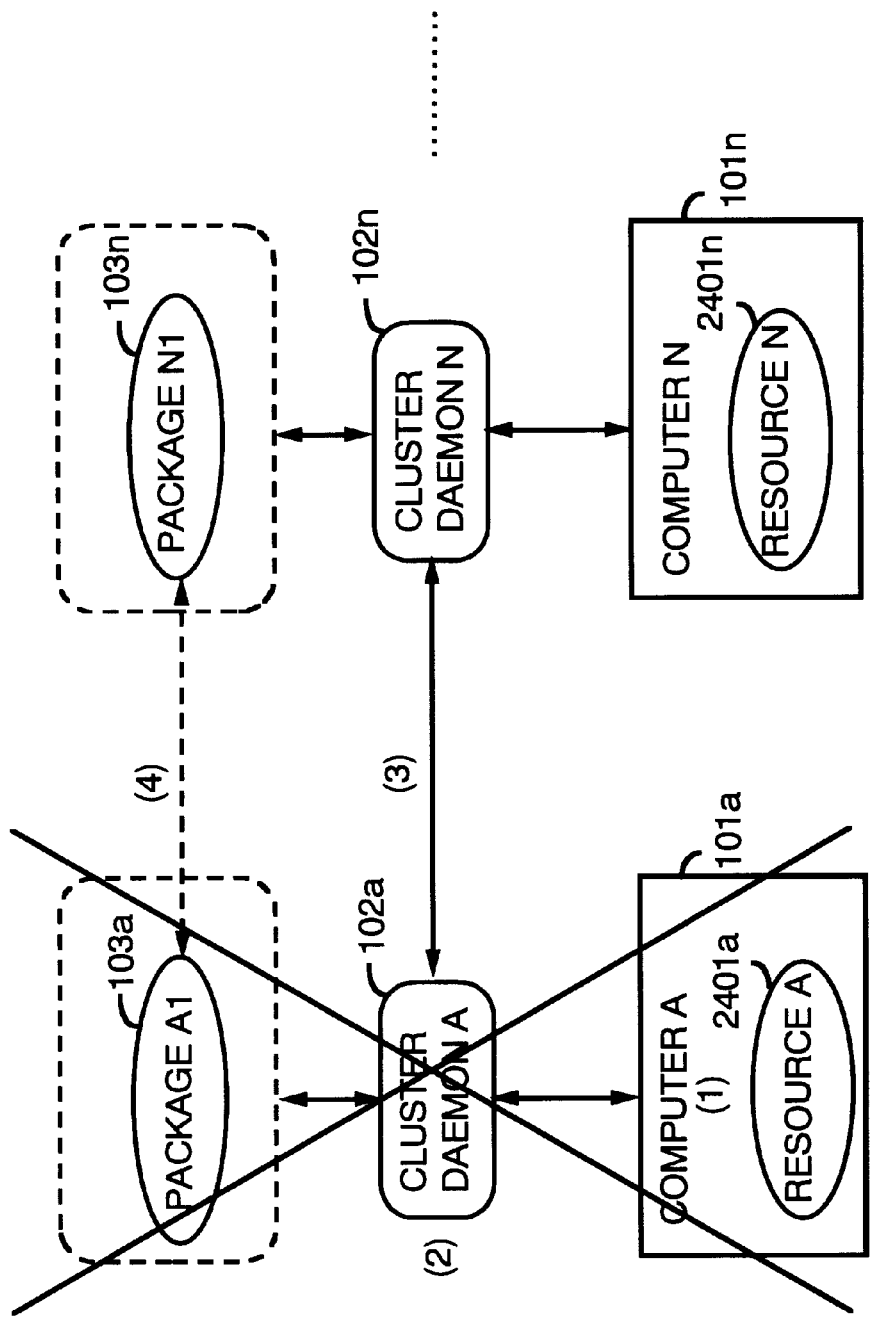
FIG. 51 shows an example of system operations according to the prior art.

A sixteenth embodiment is explained using FIGS. 47–49. The invention of the sixteenth embodiment substitutes for the manager 105 of the cluster system, which is illustrated in FIG. 1, and the manager of the sixteenth embodiment manages resources assigned to the respective packages, based on the priority order of the respective packages.

The manager according to the sixteenth embodiment is illustrated in FIG. 47. In FIG. 47, the elements having the same numbers as those in FIG. 23 are the same portions as those in FIG. 23. A resource assigning managing device 4601 receives a resource state change notice from the notice processing device 2301, refers and updates the managing table 4602, and transmits a package controlling demand (D4603) to a resource assignment controlling device 4603.

The resource assignment controlling device 4603 receives a package controlling demand (D4602) from the resource assigning managing device 4601 and transmits the packages controlling demand (D4603) to the cluster daemon 102 or to the package 103 to assign the remaining resources to the packages 103 corresponding to their priority order.

FIG. 48 shows contents stored in the managing table 4602. As shown in FIG. 48, the managing table 4602 comprises a table which stores package names, executing computers, and priority orders. The information regarding the executing computers indicate which computer is executing the packages 103 specified by the package names.

FIG. 49 is a flow chart explaining the processes performed by the manger 105 of FIG. 47. The operation of the manager 105 is explained using FIG. 49. In a step 4801, the resource assigning managing device 4601 initializes the managing table 4602.

In a step 4802, the notice processing process 2301 waits for a resource state change notice (D2301) from the cluster daemon 102, and transmits the resource state change notice (D2302) to the resource assigning managing device 4601 when the resource state change notice (D2301) is received.

In a step 4803, the resource assigning managing device 4601 updates the managing table 4602 according to the resource state change notice (D2302). In a step 4804, the resource assigning managing device 4601 selects one of the plural computers 101 (referred to as a selected computer), which have not yet processed steps 4805–4808, in the cluster system. Then, the resource assigning managing device 4601 executes steps 4805–4807 for the selected computer as explained below.

In a step 4805, a package with the highest priority is selected (referred to as the selected package) from the packages which are operating on the selected computer, but have not yet processed for the steps 4806 and 4807. The resource assigning managing device 4601 executes the steps 4806 and 4807 for the selected package.

In a step 4806, the resource assigning managing device 4601 calculates the resource which is to be assigned to the selected package based on the remaining resource. For example, the amount of the resource which is to be assigned is obtained in the following formula:

"resource to be assigned"="remaining resource×0.5".

Then, a new remaining resource is obtained in the following formula:

(new) "remaining resource"="remaining resource"—"resource to be assigned".

In a step 2807, the resource assigning managing device 4601 transmits the resource assignment controlling demand (D4602) to the resource assignment controlling device 4603, and the resource assignment controlling device 4603 transmits the resource assignment controlling demand (D4603) to the cluster daemon 102 of the selected computer. Receiving the resource assignment controlling demand (D4603), the cluster daemon 102 assigns the "resource to be assigned", which has been calculated in the step 4806, to the selected package to start-up and execute the selected package.

In a step 4808, the resource assigning managing device 4601 determines whether all the packages on the selected computer have been processed for the steps 4806 and 4807. If not, the process returns to the step 4805 and the steps above are repeated.

If all the packages on the selected computer have been processed for the steps 4806 and 4807, the resource assigning managing device 4601 determines whether all the computers have been. processed for the step 4804–4808 in a step 4809. If they are processed, the process returns to the step 4802, and is waits a next resource state change notice (D2301).

If this step 4809 is completed, the information that all the computers are processed for the steps 4804–4808 is cleared, and all the computers are treated as they have not been processed for the steps 4804–4808. If a new resource state change notice (D2301) is received in the step 4802, the processes of the step 4805–4807 are performed for the computers that have been processed for the step 4805–4807 before receiving of the resource state change notice (D2301). The same thing can be said to the selection of the package 103 in the step 4805. In this manner, the resources are dynamically assigned to the packages 103 according to the latest resource state in the cluster system.

Regarding the resource to be assigned in the step 4806, following formula may be used which assigns more resources to the packages according to the priority of the package. For example, "resources to be assigned"="remaining resource"×(1/"priority order")×0.8.

According to the above-explained construction, it possible to prevent the deterioration of the responses of important processes within the cluster system, at the same time, to continue less important processes having small priority.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cluster controlling system, comprising:
    cluster daemons for communicating with a plurality of computers, and for monitoring and controlling resources;
    local data memories for storing the monitoring result as local data; and
    one of said plurality of computers in the cluster system including:
        global data memory for storing data collected from the local data memories of the respective computers, and for being referred to from any of the computers; and
        a manager for communicating with the global data memory and the cluster daemons of the respective computers, and for monitoring and controlling the overall cluster system, wherein if a fault or failure occurs in the manager or the one computer in said plurality of computers, the same manager is re-started on another computer in said plurality of computers by its corresponding cluster daemon.

2. The cluster controlling system according to claim 1, wherein said manager comprises:
    a demand processing device for receiving demands from a user, and
    a resource controlling device for receiving a demand from the demand processing device and referring to a resource state data base in the global data memory to transmit a resource state corresponding to the demand to a cluster daemon.

3. The cluster controlling system according to claim 2, wherein said global data memory comprises:
    a resource setting file for storing process information, in response to a resource state change of one computer in the cluster system; and wherein
        said manager comprises
            an automatic controlling device for controlling resources according to a definition of the resource setting file when the resource state is changed.

4. The cluster controlling system according to claim 3, wherein said resource setting file defines priority order information regarding execution and correlation-ship between packages, and wherein said automatic controlling device operates packages on respective computers according to the information defined in the resource setting file.

5. The cluster controlling system according to claim 2, wherein said manager further includes a mode managing device for managing a package according to an operation mode representing "operating", "waiting" or "testing".

6. The cluster controlling system according to claim 2, wherein said manager further comprises a log managing device for collecting logs of resource state changes which occur in the cluster system.

7. The cluster controlling system according to claim 2, wherein
    said cluster daemons monitor a fault or failure and subsequent recovery of a corresponding computer, and control start-up and operations of a package; wherein
    a first computer in the plurality of the computers operates a first package; and
    a second computer waits for a second package to provide the same application or service as the first package; and wherein said manager includes
        a notice processing means for receiving a resource state change notice from the cluster daemons, and
        a mode controlling device for receiving the mode controlling demand from the notice processing means and then transmitting it to a cluster daemon,
    wherein the manager operates a second package on a second computer by controlling the cluster daemons when a fault or failure has occurred in a first computer, and forces the first package to wait until the first computer has recovered from the failure.

8. The cluster controlling system according to claim 2, wherein
    said cluster daemons monitor a fault or failure and the subsequent recovery of a corresponding computer, and control start-up and operation of a package; wherein
    a first computer in the plurality of the computers operates a first package; and
    a second computer is suppressed for a second package; and wherein
        said manager includes
            an output managing device for receiving a resource state change notice from the cluster daemons, and
            an output suppressing device for receiving an output suppression/release demand from the output managing device and for transmitting it to a cluster daemon,
        wherein the manager outputs a second package instead of a first package by controlling cluster daemons when a fault or failure occurs in a first computer operating the first package, maintains an output from the second package until a fault or failure occurs in the second computer, outputs the first package instead of the second package by controlling cluster daemons when a fault or failure occurs in the second computer operating the second package, and maintains an output from the first package until a fault or failure occurs in the first computer.

9. The cluster controlling system according to claim 2, wherein
    said cluster daemons monitor fault or failure and the subsequent recovery of a corresponding computer, and control start-up and operation of the packages; wherein
    a first computer in the plurality of the computers operates a first package; and
    a second computer is suppressed for a second package, and wherein
        said manager includes
            a package managing device for receiving and determining a type of resource state change notice from the cluster daemons, and
            a package controlling device for receiving a package controlling demand and transmitting it to cluster daemon,
        wherein the manager operates the second package on the second computer when a fault or failure occurs in the first computer, and places the first package in a waiting mode on a third computer.

10. The cluster controlling system according to claim 2, wherein
    said cluster daemons monitor a fault or failure and the subsequent recovery of a corresponding computer, and control start-up and operation of the packages; wherein
    a first computer in the plurality of the computers operates a first package;

a second computer waits for a second package; and wherein said manager includes a package managing device for receiving a monitored result from cluster daemons, a package controlling device for receiving a package controlling demand and transmitting it to the cluster daemon, a managing table for storing a priority order of the packages; and wherein the manager operates the second package on the second computer when a fault or failure occurs in the first computer, retrieves a third package with lower priority than the package being operated on the first computer, stops operation of the third package, and starts-up the first package on a third computer in a waiting state.

11. The cluster controlling system according to claim 2, wherein said cluster daemons monitor a fault or failure and the subsequent recovery of a corresponding computer, and control start-up and operation of the packages; wherein a first computer in the plurality of the computers operates a first group of package;

a second computer operates the same first group of packages in parallel with the first computer; and wherein said manager includes a package managing device for receiving a monitored result from cluster daemons of the respective computers, a package controlling device for receiving a package controlling demand and transmitting it to a cluster daemon, a managing table for storing group names of the packages operating in parallel, wherein the manager retrieves a third computer not operating the same first group of packages when a fault or failure occurs in the first computer, stops operation of the retrieved third package, and starts-up the first package on the third computer.

12. The cluster controlling system according to claim 2, wherein said cluster daemons monitor a fault or failure and the subsequent recovery of a corresponding computer, and control start-up and operation of the packages; wherein a first computer in the plurality of the computers operates a higher priority of package;

a second computer operates a second higher priority of package in parallel with the first computer;

and n-th computer operates an n-th priority of package in parallel; wherein said manager includes a package managing device for receiving a monitored result from the cluster daemons of the respective computers, a package controlling device for receiving a package controlling demand and transmitting it to the cluster daemon, a managing table for storing a priority order of respective packages on the plurality of the computers; and wherein the manager retrieves a third computer to stop a lower priority package operating on the third computer when a fault or failure occurs in the first computer, start-up a first priority package on the third retrieved computer, re-assign resources to the respective packages based on the priority orders of the packages.

13. The cluster controlling system according to claim 2, wherein said cluster daemons monitor a fault or failure and the subsequent recovery of a corresponding computer, and control start-up and operation of the packages; wherein a plurality of the computers operate respective packages in parallel, each package having a different priority; and wherein said manager includes a package controlling device for receiving a package controlling demand and transmitting it to a cluster daemon, a managing table for storing a priority order of the packages and load factors of the respective computers; and wherein the manager retrieves a third computer to operate a higher priority package when the load factor of the first computer exceeds a predetermined load by referring to a managing table, stops operation of a package with a lower priority that is operating on the third computer, and starts-up, on the retrieved third computer, a higher priority package operating on the first computer.

14. The cluster controlling system according to claim 2, wherein said cluster daemons monitor a fault or failure and the subsequent recovery of a corresponding computer, and control start-up and operation of the packages; wherein a plurality of the computers operate respective packages in parallel, each package having different kind of priority; and wherein said manager includes a resource assigning managing device for receiving a resource state change notice, a resource assignment controlling device for receiving a package controlling demand for allocating resources to the packages based on the package priority from the resource assigning managing device and transmitting it to a cluster daemon, a managing table for storing the priority orders of the respective packages; and wherein the manager selects a highest priority package by referring to the managing table, assigns resources to the corresponding package, and repeats this process with all lower priority packages.

15. The cluster controlling system according to claim 1, further comprising:

agents for communicating with the manager and cluster daemons.

16. The cluster controlling system according to claim 15, wherein said agent comprises:

a demand processing device for receiving resource control demands from the manager, and a resource controlling device for receiving a demand from the demand processing device and referring to a resource state data base to transmit a resource state corresponding to the demand to a cluster daemon.

17. A cluster controlling system, comprising:

cluster daemons for communicating with packages and a plurality of computers;

agents for communicating with a corresponding cluster daemon on each of the respective computers, a global data memory and other agents;

local data memories for storing results which are monitored and controlled by the cluster daemons as local data; and global data memory for storing data collected from the local data memories of the respective computers, and for being referred to from any of the computers via the agents, and one computer in said plurality of computers including a manager which communicates with each of the plurality of cluster daemons and with the global data memory to control the cluster system, wherein if a fault or failure occurs in the manager or the one computer in said plurality of computers, the same manager is re-started on another computer in said plurality of computers by its corresponding cluster daemon.

18. The cluster controlling system according to claim 17, wherein said manager comprises:

a demand processing device for receiving demands from a user, and a resource controlling device for receiving a demand from the demand processing device and referring to a resource state data base in the logbal data memory to transmit a resource state corresponding to the demand to a cluster daemon.

19. A cluster system comprising:

a plurality of computers corresponding to and communicating with a plurality of daemons;

local data memories for storing results which are monitored and controlled by the plurality of daemons;

wherein one computer in said plurality of computers further includes:

a manager which communicates with each of the plurality of daemons and with a global data memory, to control the cluster system; and wherein if a fault or failure occurs in the manager or the one computer in said plurality of computers, the manager is re-started on another computer in said plurality of computers by its corresponding daemon.

20. A manager comprising:

a demand processing device for receiving demands from a user;

a resource controlling device which receives a demand from the demand processing device, refers to a database in a global memory, and transmits a resource state corresponding to said demand to a first daemon of a first computer which controls resources, wherein if a fault or failure occurs in the manager or in the first computer operating the manager, the manager is re-started on a second computer by the second computer's corresponding daemon.

* * * * *